United States Patent
Rockwell et al.

(10) Patent No.: US 11,547,268 B2
(45) Date of Patent: Jan. 10, 2023

(54) ACOUSTICALLY INSULATED MACHINE

(71) Applicant: Owens Corning Intellectual Capital, LLC, Toledo, OH (US)

(72) Inventors: Anthony Lee Rockwell, Pickerington, OH (US); Phillip J. Johnson, Louisville, KY (US); Jeffrey S. Tilton, Powell, OH (US); Donald Hill, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1210 days.

(21) Appl. No.: 15/773,285

(22) PCT Filed: Nov. 4, 2016

(86) PCT No.: PCT/US2016/060439
§ 371 (c)(1),
(2) Date: May 3, 2018

(87) PCT Pub. No.: WO2017/079501
PCT Pub. Date: May 11, 2017

(65) Prior Publication Data
US 2018/0317739 A1 Nov. 8, 2018

Related U.S. Application Data

(60) Provisional application No. 62/251,914, filed on Nov. 6, 2015.

(51) Int. Cl.
*A47L 15/42* (2006.01)
*G10K 11/168* (2006.01)
(Continued)

(52) U.S. Cl.
CPC ....... *A47L 15/4209* (2016.11); *A47L 15/4274* (2013.01); *D06F 39/12* (2013.01);
(Continued)

(58) Field of Classification Search
CPC .. A47L 15/4209; A47L 15/4274; D06F 39/12; G10K 11/168; B32B 5/26;
(Continued)

(56) References Cited

U.S. PATENT DOCUMENTS 7,357,974 B2   4/2008   Rockwell
8,888,930 B2   11/2014  Jerg et al.
(Continued)

FOREIGN PATENT DOCUMENTS

WO   WO-0226100 A2 *  4/2002   ......... A47L 15/4209
WO   2002026100 A2    4/2004
(Continued)

OTHER PUBLICATIONS

International Search Report and Written Opinion from PCT/US2016/060439 dated Feb. 2, 2017.
(Continued)

*Primary Examiner* — Forrest M Phillips
(74) *Attorney, Agent, or Firm* — Calfee, Halter & Griswold LLP

(57) ABSTRACT

An acoustically insulated machine including a source of noise positioned within a housing, a first insulation member positioned within the housing and including a first porous sound absorbing layer and a first dense layer, and a second insulation member positioned within the housing and including a second porous sound absorbing layer and a second dense layer. The first insulation member being is positioned closer to the internal source of noise than the second insulation member and the first insulation member being spaced apart from the second insulation member such that an air gap is formed between the first insulation member and the second insulation member.

10 Claims, 38 Drawing Sheets

(51) Int. Cl.
*D06F 39/12* (2006.01)
*F25D 23/10* (2006.01)
*B32B 5/26* (2006.01)
*B32B 7/12* (2006.01)

(52) U.S. Cl.
CPC .............. *G10K 11/168* (2013.01); *B32B 5/26* (2013.01); *B32B 7/12* (2013.01); *B32B 2250/42* (2013.01); *B32B 2307/102* (2013.01); *B32B 2509/00* (2013.01); *F25B 2500/12* (2013.01); *F25D 23/10* (2013.01)

(58) Field of Classification Search
CPC . B32B 7/12; B32B 2250/42; B32B 2307/102; B32B 2509/00; F25B 2500/12; F25D 23/10
USPC ......................................................... 181/200
See application file for complete search history.

(56) References Cited

U.S. PATENT DOCUMENTS

| | | | |
|---|---|---|---|
| 2012/0298154 A1* | 11/2012 | Rockwell | A47L 15/4209 134/184 |
| 2014/0373885 A1* | 12/2014 | Beshears, Jr. | A47L 15/4274 134/57 D |
| 2015/0097472 A1 | 4/2015 | Rockwell | |
| 2015/0250375 A1 | 9/2015 | Rockwell et al. | |
| 2015/0359406 A1* | 12/2015 | Hering | A47L 15/0063 361/728 |
| 2016/0051123 A1* | 2/2016 | Gleixner | A47L 15/4257 134/113 |
| 2017/0070800 A1* | 3/2017 | Kauffman | H04R 1/086 |
| 2022/0104685 A1* | 4/2022 | Wolowicz | A47L 15/486 |

FOREIGN PATENT DOCUMENTS

WO 2007084860 A2 7/2007
WO WO-2007084860 A2 * 7/2007 ........... G10K 11/168

OTHER PUBLICATIONS

Communication pursuant to Article 94(3) EPC from EP Application No. 16808838.3 dated Nov. 5, 2021.
Office Action from MX Application No. MX/a/2018/005648 dated Jun. 30, 2022.
Communication pursuant to Article 94(3) EPC from EP Application No. 16808838.3 dated Aug. 25, 2022.

* cited by examiner

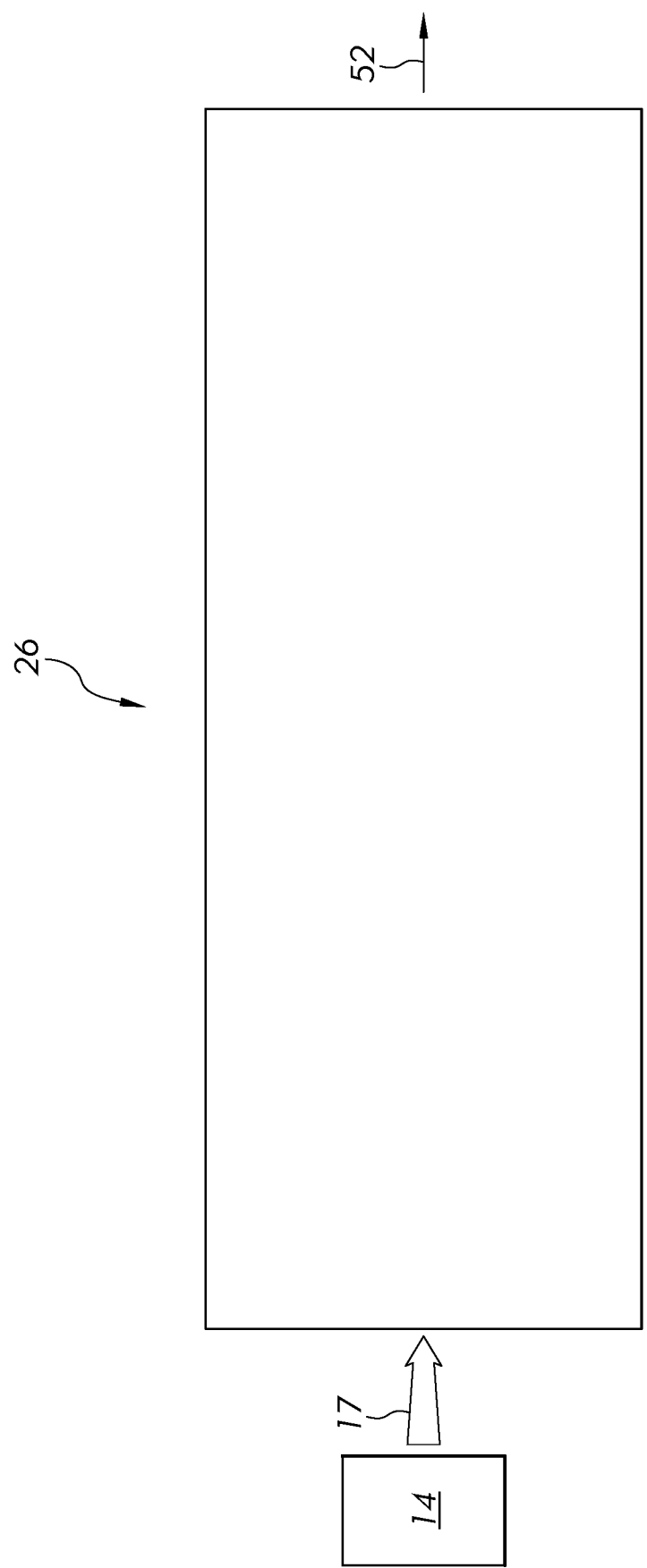

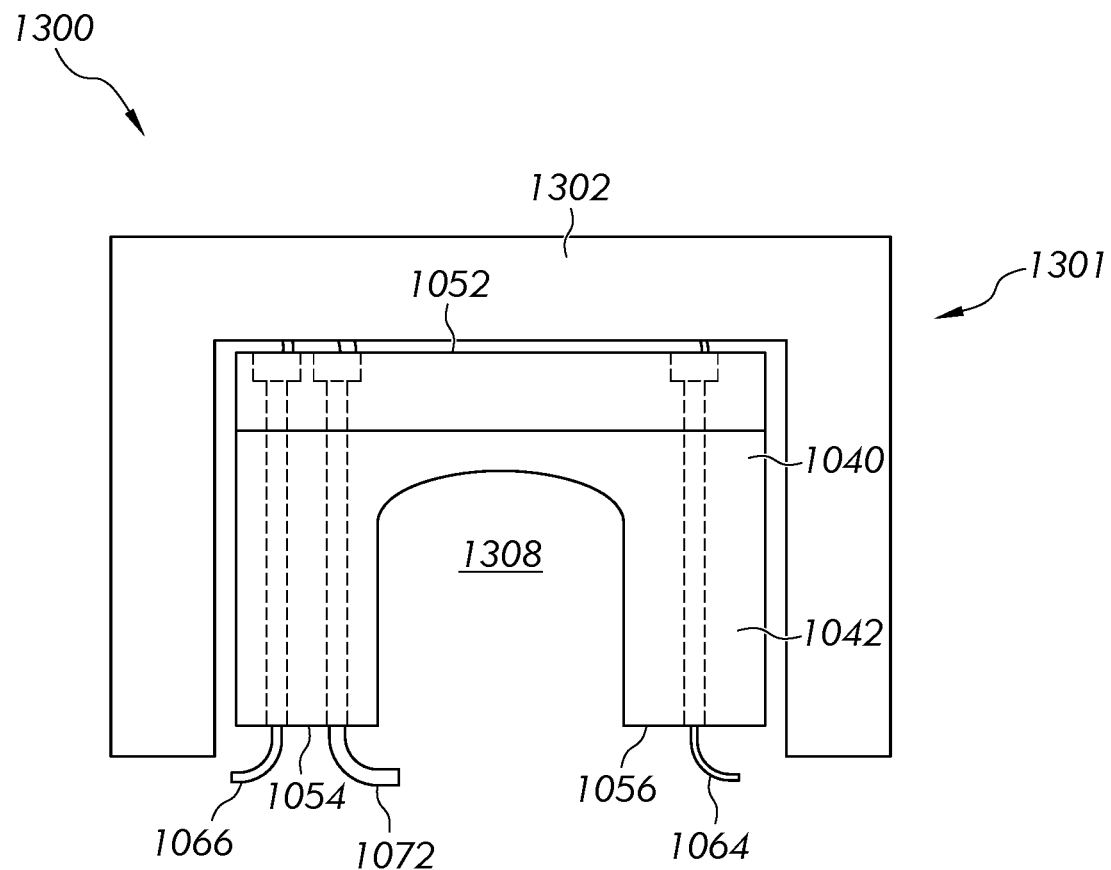
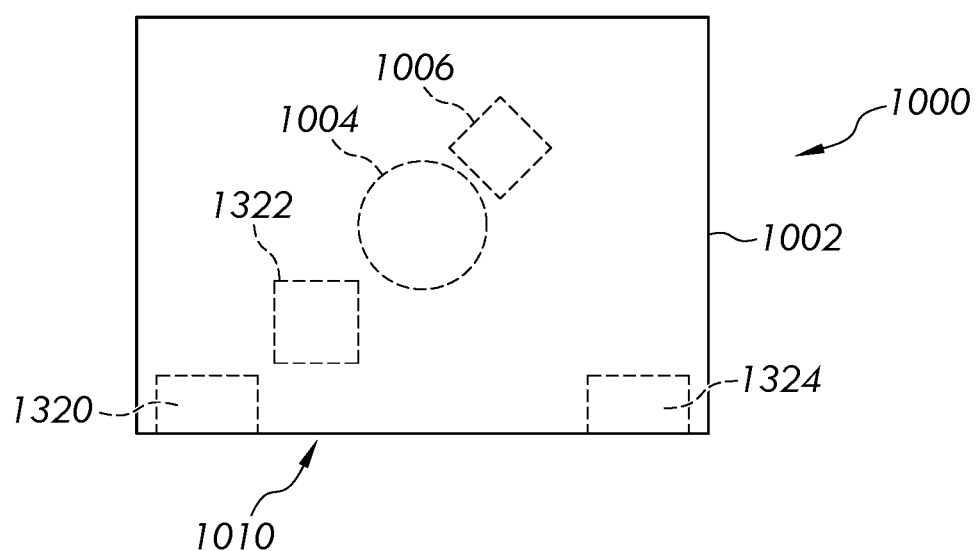
FIG. 15

ACOUSTICALLY INSULATED MACHINE

RELATED APPLICATIONS

This application is the U.S. national stage entry of PCT/US16/60439, filed on Nov. 4, 2016, which claims priority to and all benefit of U.S. Provisional Patent Application Ser. No. 62/251,914, filed on Nov. 6, 2015, for ACOUSTICALLY INSULATED MACHINE, the entire disclosures of which are fully incorporated herein by reference.

The present application relates generally to acoustically insulated machines, and more particularly to acoustically insulated machines having spaced apart multilayered sound absorbing members or sound absorbing member with integrated utility passages.

BACKGROUND OF THE INVENTION

Appliances and other machines that generate noise are usually provided with acoustical insulation to reduce the levels of emanating sound. The unwanted sound from these machines can be caused both by the mechanical operation of the motor or other mechanical component within the machine and by the vibration of the machine itself. In a residential dwelling, excessive noise may be generated by dishwashers, clothes washers, clothes dryers, refrigerators, freezers, and microwave ovens, which can be annoying to inhabitants of the dwelling.

Conventional acoustical treatments for machines generally comprises sound transmission barriers and sound absorption layers. One form of acoustical insulation involves enclosing the noise source in an insulation structure. A typical form of acoustical insulation is a layer of mineral fiber insulation, such as fiberglass insulation, wrapped around or positioned around the source of unwanted noise. For example, a fiberglass absorber is usually incorporated in the front door panel of an under-the-counter dishwasher. The blanket of glass fibers absorbs some of the sound energy entering the fiberglass absorber, thereby resulting in a reduced transmission of unwanted sound from the source of sound in the appliance. Further, it is known that the insertion of a reflecting sound barrier within the acoustical insulation also reduces the sound transmission through the insulation product.

Thermoplastic blanket materials are well known in the art. Such materials have been utilized as acoustical and thermal insulators and liners for application to appliances. These insulators and liners typically rely upon both sound absorption, i.e. the ability to absorb incident sound waves and transmission loss, i.e. the ability to reflect incident sound waves, in order to provide sound attenuation. An example of a multilayer thermoplastic blanket having densified layers is disclosed by U.S. Pat. No. 7,357,974, which is incorporated herein by reference in its entirety.

SUMMARY

An acoustically insulated machine is disclosed. In one embodiment, the acoustically insulated machine includes a source of noise positioned within a housing, a first insulation member positioned within the housing and including a first porous sound absorbing layer and a first dense layer, and a second insulation member positioned within the housing and including a second porous sound absorbing layer and a second dense layer. The first insulation member being positioned closer to the internal source of noise than the second insulation member and the first insulation member being spaced apart from the second insulation member such that an air gap is formed between the first insulation member and the second insulation member.

In another embodiment, the acoustically insulated machine is a dishwasher assembly including a housing having a front side, a rear side, and a washing chamber, a plurality of legs supporting the housing, a pump and drive motor provided in a cavity between the legs and below the housing and an insulation member provided in the cavity. The insulation layer having a plurality of passages extending through the insulation member for routing utilities through the insulation member.

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

BRIEF DESCRIPTION OF THE DRAWINGS

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

The accompanying drawings are incorporated in and form a part of this specification, illustrate several aspects of the present invention, and together with the description serve to explain certain principles of the invention. In the drawings:

FIG. 2C is a schematic illustration of a single-layer insulation member;

FIG. 15 is a top view of the acoustically insulated machine assembly of FIG. 13 in a partially connected state;

FIG. 36 is a top view of the acoustically insulated dishwasher of FIG. 35 in a second position.

DETAILED DESCRIPTION OF THE INVENTION

The embodiments disclosed herein will now be described by reference to some more detailed embodiments, in view of the accompanying drawings. These embodiments may, however, be embodied in different forms and should not be construed as limited to the embodiments set forth herein. Rather, these embodiments are provided so that this disclosure will be thorough and complete, and will fully convey the scope of the inventions to those skilled in the art.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

The present application discloses exemplary embodiments of acoustically insulated machines 10. The acoustically insulated machine 10 may take a wide variety of different forms. For example, the acoustically insulated machine 10 may be a clothes washing machine, a dishwasher, an air conditioner, a microwave oven, a refrigerator, a freezer, or any other household machine or appliance that makes noise. The acoustically insulated machines 10 include one or more insulation members that may have variety of configurations, orientations, and compositions. The insulation members may serve as acoustic insulation, such as for example, by reflecting or absorbing the energy of sound waves, and in some embodiments, also serve as thermal insulation.

Figure 1:
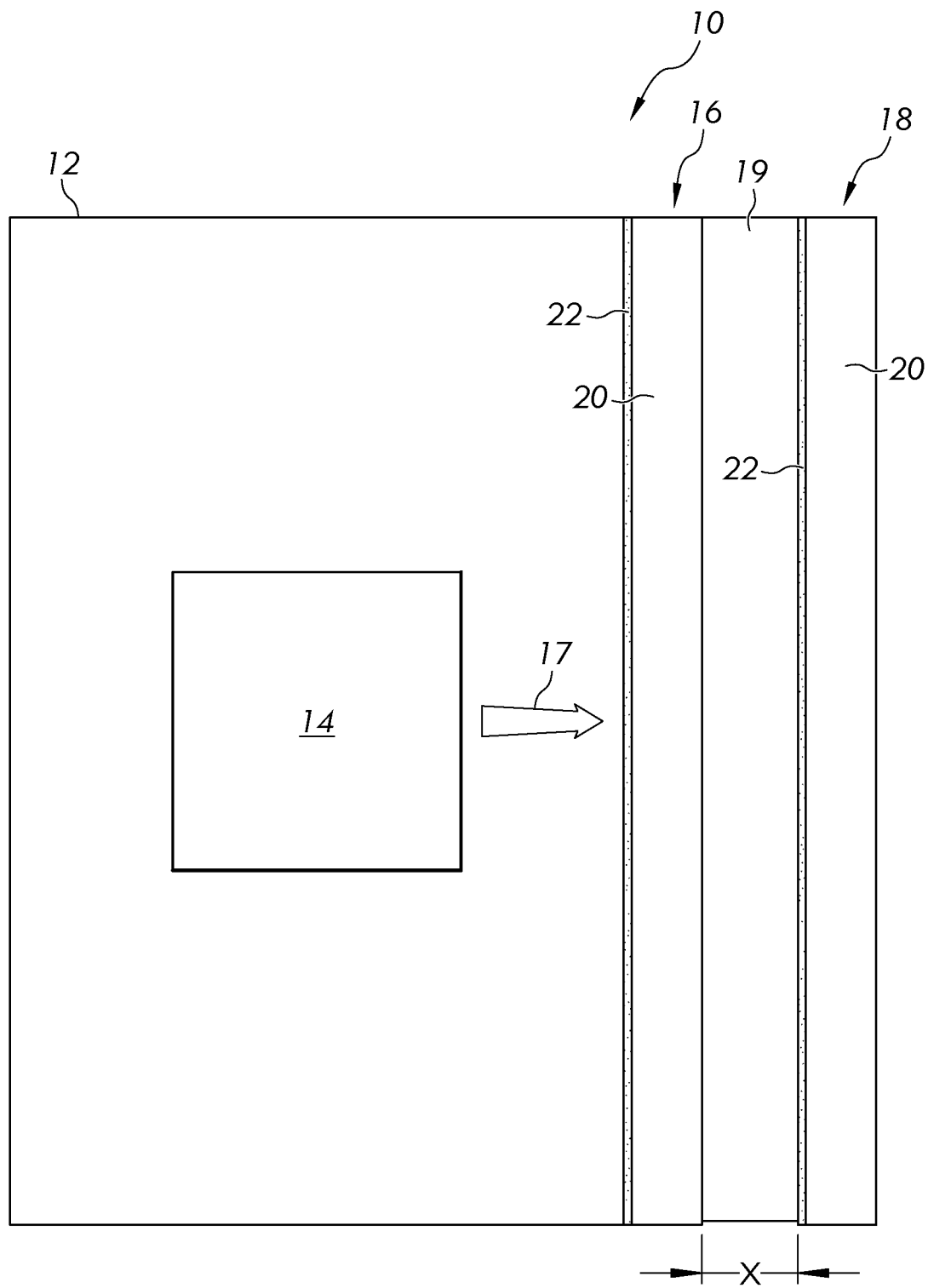
FIG. 1 is a schematic illustration of an exemplary embodiment of an acoustically insulated machine.

Referring to FIG. 1, an exemplary embodiment of an acoustically insulated machine 10 includes a cabinet 12 or housing, an internal source of noise 14, a first insulation member 16 and a second insulation member 18. The first insulation member 16 is spaced apart from the second insulation member 18. In the example illustrated by FIG. 1, the insulation members 16, 18 can be spaced apart a distance X that at least partially defines an air gap 19 between the insulation members.

The insulation members 16, 18 can absorb sound energy 17 generated by internal source of noise 14 to make the machine 10 quieter. In the illustrated example, the insulation members 16, 18 are disposed inside the cabinet 12. In other embodiments, however, the insulation members 16, 18 may be disposed outside of the cabinet 12. The number and location of insulation members may vary in different embodiments of the acoustically insulated machines 10. In some exemplary embodiments, the insulation members 16, 18 may also thermally insulate the machine 10 in addition to acoustically insulate the machine.

Figure 2A:
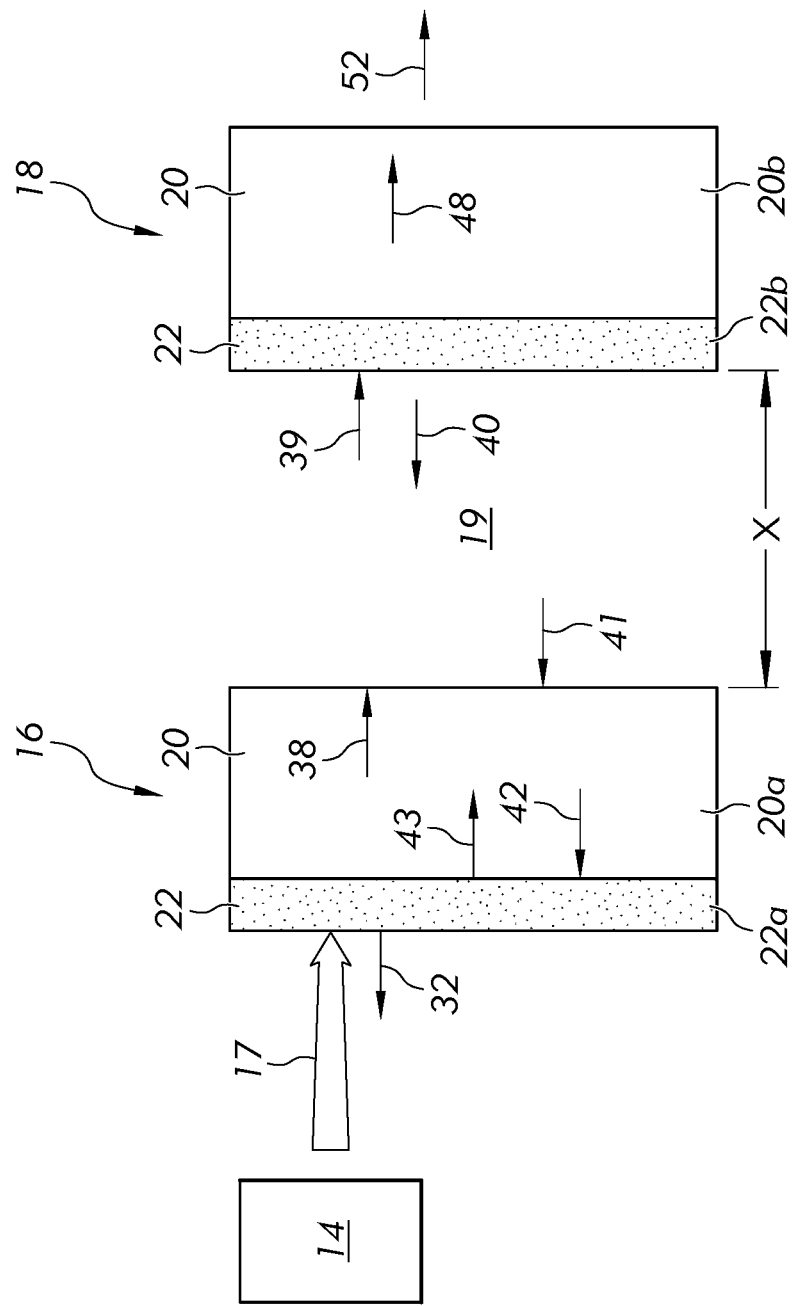
FIG. 2A is a schematic illustration of a pair of spaced apart, multi-layer insulation members.

The first and second insulation members 16, 18 may take a wide variety of different forms. In the exemplary embodiment illustrated by FIG. 1, each of the first and second insulation members 16, 18 includes one or more porous, sound absorbing layers 20 and one or more dense or facing layers 22 attached to a face of the one or more dense sound absorbing layers. The one or more dense or facing layers 22 can have a density that is greater than a density of the sound absorbing layers 20. Referring to FIG. 2A, the first insulation member 16 includes a first dense or facing layer 22a and a first porous, sound absorbing layer 20a and the second insulation member 18 includes a second dense or facing layer 22b and a second porous, sound absorbing layer 20b. The combination of porous, sound absorbing layers 20 and dense or facing layers 22 allows the thin first and second insulation members 16, 18 to provide the sound absorbing effectiveness of much thicker insulation members 26, as shown in FIG. 2C, that are made only from porous, sound absorbing material.

In the example of FIG. 2A, low frequency sound energy 17 from the source of noise 14 hits the first dense or facing layer 22a of the first insulation member 16. The low frequency sound energy may be sound energy in a frequency range of 100 to 800 Hz, a frequency range of 100 to 400 Hz, a frequency range of 100 to 200 Hz, a frequency range of 100 to 150 Hz, or a frequency range of 100 to 125 Hz. The wavelengths of the low frequency sound energy are long enough that a portion 32 of the low frequency sound energy 17 is reflected by the dense or facing layer 22*a* and the rest (i.e. a majority) of the low frequency sound energy passes into the first dense or facing layer 20*a*. A majority, and in some cases substantially all or all high frequency sound energy is reflected by the first dense or facing layer 22*a*. For example, the high frequency sound energy may be sound energy at a frequency that is higher than 800 Hz. This high frequency sound energy is reflected back into the machine 10 (FIG. 1) by the facing layer 22*a*. Since, however, the wavelength of the high frequency energy is short, the high frequency sound energy dissipates before it finds another path out of the machine.

In one exemplary embodiment, the reflected portion 32 of low frequency airborne acoustic energy or low frequency sound energy is less than fifty percent of the low frequency airborne acoustic energy or low frequency sound energy 17 that hits the first dense or facing layer 22*a*. For example, the reflected portion 32 may be 50%, less than or equal to 45%, less than or equal to 40%, less than or equal to 35%, less than or equal to 30%, less than or equal to 25%, less than or equal to 20%, less than or equal to 15%, or less than or equal to 10% of the low frequency airborne acoustic energy or low frequency sound energy 17. The reflected portion 32 may escape the cabinet 12 at other locations. As such, reducing the reflected portion 32 may reduce the overall low frequency sound energy that escapes from the cabinet 12 (FIG. 1).

Some of the low frequency sound energy that passes into the first dense or facing layer 22*a* may be absorbed by the first dense or facing layer. Low frequency sound energy that is not absorbed by the first dense or facing layer 22*a* passes into the first porous, sound absorbing layer 20*a*. Some of the low frequency sound energy that passes into the first porous, sound absorbing layer 20*a* is absorbed by the first porous, sound absorbing layer. A remaining portion 38 exits the first insulation member 16 and enters the air gap 19 between the first and second insulation members 16, 18. The air gap 19 can be at least partially defined by the distance X between the first and second insulation member 16, 18. The air gap 19 can act as a broad band sound absorber or acoustic barrier. Thus, some of the low frequency sound that enters the air gap 19 is absorbed by or dissipated by the air gap.

A remaining portion 39 of the low frequency energy not absorbed or dissipated by the air gap 19 hits the second dense or facing layer 22*b*. A portion 40 of the low frequency sound energy 39 that hits the second dense or facing layer 22*b* is reflected back into the air gap 19. The rest of the low frequency sound energy passes into the second dense or facing layer 22*b*. In one exemplary embodiment, the reflected portion 40 of low frequency sound energy is less than fifty percent of the low frequency sound energy 39 that hits the second dense or facing layer 22*b*. For example, the reflected portion 40 may be 50%, less than or equal to 45%, less than or equal to 40%, less than or equal to 35%, less than or equal to 30%, less than or equal to 25%, less than or equal to 20%, less than or equal to 15%, or less than or equal to 10% of the low frequency sound energy 39.

Some of the low frequency sound energy that passes into the second dense or facing layer 22*b* is absorbed by the second dense or facing layer. Low frequency sound energy 48 that is not absorbed by the second dense or facing layer passes into the second porous, sound absorbing layer 20*b*. Some of the low frequency sound energy 48 that passes into the second porous, sound absorbing layer 20*b* is absorbed by the second porous, sound absorbing layer 20*b*. A portion 52 of the low frequency sound energy that is not absorbed passes out of second insulation member 18. This low frequency sound energy 52 is much less than the low frequency sound energy 17 that initially hits the first insulation member 16.

As can be seen from FIG. 2A, the reflected sound energy portion 40 bounces back into the air gap 19. A portion of this low frequency sound energy 40 is absorbed or dissipated in the air gap 19. The remaining portion 41 enters the first porous sound absorbing layer 20*a*. A portion of the low frequency sound energy 41 is absorbed by the first porous, sound absorbing layer 20*a* and a remaining portion 42 hits the first dense or facing layer 22*a*. A portion 43 of the low frequency sound energy that hits the first dense or facing layer 22*a* is reflected back into the first porous, sound absorbing layer 20*a*. Thus, some low frequency sound energy may be bounced back and forth across the air gap 19 where it dissipates or is absorbed.

The arrangement of dense or facing layers and porous layers allow a majority of the low frequency sound energy 17 to enter the first insulation member 16, then trap a majority of the low frequency sound energy in the first and second insulation member 16, 18, and allow only a small portion 52 of the low frequency sound energy to pass through the insulation members 16, 18. Referring to FIG. 2C, the small portion of low frequency sound energy 52 is comparable to the portion of low frequency sound energy that passes through a much thicker insulation member that is made only of porous, sound absorbing material.

Figure 2B:
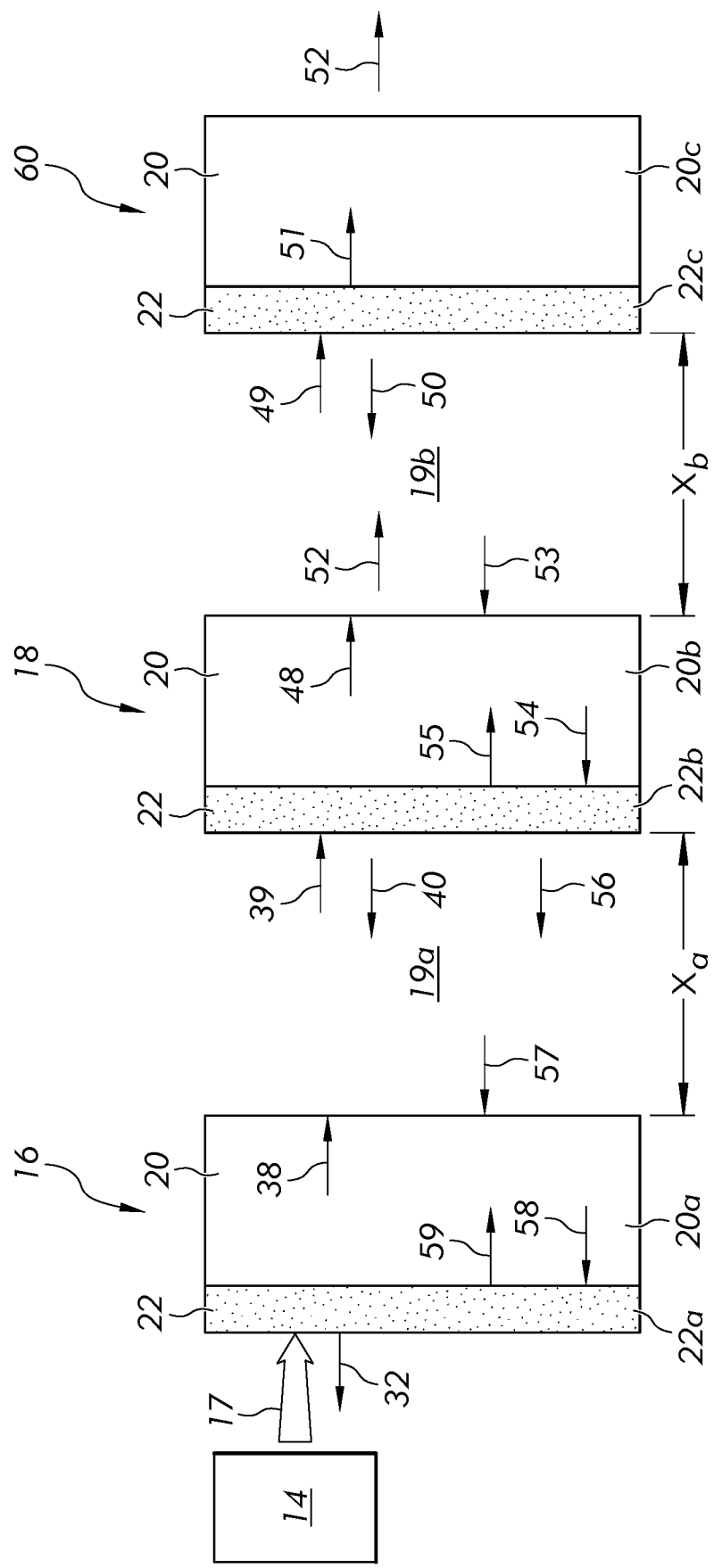
FIG. 2B is a schematic illustration of a plurality of spaced apart, multi-layer insulation members.

In the example of FIG. 2B, a third insulation member 60 having a third dense or facing layer 22*c* and a third porous, sound absorbing layer 20*c* is included. The third insulation member 60 is spaced apart from the second insulation member 18 by an air gap 19*b*. Low frequency sound energy 17 or low frequency airborne acoustic energy from the source of noise 14 hits the first dense or facing layer 22*a*. A portion 32 of the low frequency sound energy 17 is reflected by the dense or facing layer 22*a* and the rest of the low frequency sound energy passes into the first dense or facing layer 22*a*. In one exemplary embodiment, the reflected portion 32 of low frequency sound energy is less than fifty percent of the low frequency sound energy 17 that hits the first dense or facing layer 22*a*. For example, the reflected portion 32 may be 50%, less than or equal to 45%, less than or equal to 40%, less than or equal to 35%, less than or equal to 30%, less than or equal to 25%, less than or equal to 20%, less than or equal to 15%, or less than or equal to 10% of the low frequency sound energy 17. The reflected portion 32 may escape the cabinet 12 at other locations. As such, reducing the reflected portion 32 may reduce the overall low frequency sound energy that escapes from the cabinet 12 (FIG. 1).

Some of the low frequency sound energy that passes into the first dense or facing layer 22*a* is absorbed by the first dense or facing layer. The low frequency sound energy that is not absorbed by the first dense or facing layer passes into the first porous, sound absorbing layer 20*a*. Some of the low frequency sound energy that passes into the first porous, sound absorbing layer 20*a* is absorbed by the first porous, sound absorbing layer. A remaining portion 38 enters the air gap 19*a* between the first and second insulation members 16, 18. The air gap 19*a* can be at least partially defined by the distance Xa between the first and second insulation member 16, 18. The air gap 19*a* may act as a broad band sound absorber or acoustic barrier. Thus, some of the low frequency sound 38 that enters the air gap 19a is absorbed or dissipated by the air gap.

A remaining portion 39 hits the second dense or facing layer 22b and a portion 40 of the low frequency sound energy 39 is reflected back into the air gap 19a by the dense or facing layer 22b and the rest of the low frequency sound energy passes into the second dense or facing layer. In one exemplary embodiment, the reflected portion 40 of low frequency sound energy is less than fifty percent of the low frequency sound energy 39 that hits the second dense or facing layer 22b. For example, the reflected portion 40 may be 50%, less than or equal to 45%, less than or equal to 40%, less than or equal to 35%, less than or equal to 30%, less than or equal to 25%, less than or equal to 20%, less than or equal to 15%, or less than or equal to 10% of the low frequency sound energy 39.

Some of the low frequency sound energy that passes into the second dense or facing layer 22b is absorbed by the second dense or facing layer. Low frequency sound energy that is not absorbed by the second dense or facing layer 22b passes into the second porous, sound absorbing layer 20b. Some of the low frequency sound energy that passes into the second porous, sound absorbing layer 20b is absorbed by the second porous, sound absorbing layer 20b.

A remaining portion 48 enters the air gap 19b between the second and third insulation members 18, 60. The air gap 19b can be at least partially defined by the distance Xb between the second and third insulation members 18, 60. The air gap 19b acts may act a broad band sound absorber or acoustic barrier. Thus, some of the low frequency sound that enters the air gap 19b is absorbed or dissipated by the air gap.

A remaining portion 49 hits the third dense or facing layer 22c. A portion 50 of the low frequency sound energy 49 is reflected back into the air gap 19b by the dense or facing layer 22c. In one exemplary embodiment, the reflected portion 50 of low frequency sound energy is less than fifty percent of the low frequency sound energy 49 that hits the third dense or facing layer 22c. For example, the reflected portion 50 may be 50%, less than or equal to 45%, less than or equal to 40%, less than or equal to 35%, less than or equal to 30%, less than or equal to 25%, less than or equal to 20%, less than or equal to 15%, or less than or equal to 10% of the low frequency sound energy 49.

The rest of the low frequency sound energy 49 that is not reflected back into the air gap 19b passes into the third dense or facing layer 22c. Some of the low frequency sound energy that passes into the third dense or facing layer 22c is absorbed by the third dense or facing layer. The portion 51 of low frequency sound energy that is not absorbed by the third dense or facing layer 22c passes into the third porous, sound absorbing layer 20c. Some of the low frequency sound energy 51 that passes into the third porous, sound absorbing layer 20c is absorbed by the third porous sound absorbing layer. Low frequency sound energy 52 that is not absorbed by the third porous, sound absorbing layer 20c exits the third porous sound absorbing layer. This low frequency sound energy 52 is much less than the low frequency sound energy 17 that initially hit the first insulation member 16.

As can be seen from FIG. 2B, a portion of this low frequency sound energy 50 that is reflected back into the air gap 19b is absorbed or dissipated by the air gap. The remaining portion 53 hits the second porous sound absorbing layer 20b. A portion of the low frequency sound energy 53 is absorbed by the second porous sound absorbing layer 20b. A portion 54 of the low frequency sound energy 53 that is not absorbed or dissipated, hits the second dense or facing layer 22b. A portion 55 of the low-frequency sound energy 54 that hits the second dense or facing layer 22b is reflected back into the second porous sound absorbing layer 20b and a portion 56 may pass through the second dense or facing layer 22b and into the air gap 19a.

A portion of the reflected low frequency sound energy 40, 56 that is reflected back to the air gap 19a is absorbed or dissipated by the air gap. A remaining portion 57 of the low frequency sound energy hits the first porous sound absorbing layer 20a. A portion of the low frequency sound energy 57 is absorbed by the first porous sound absorbing layer 20a and a remaining portion 58 hits the first dense or facing layer 22a. A portion 59 of the low frequency sound energy 58 is reflected back into the first porous sound absorbing layer 20a. Thus, some low frequency sound energy may be bounced back and forth across the air gap 19a and 19b where it dissipates or is absorbed.

The arrangement of dense or facing layers, porous layers, and air gaps allow a majority of the low frequency sound energy to enter the insulation members, then trap a majority of the low frequency sound energy, and allow only a small portion 52 of the low frequency sound energy to pass through the insulation members. Referring to FIGS. 2B and 2C, the small portion of low frequency sound energy 52 may be comparable to or less than the portion of low frequency sound energy that passes through a much thicker insulation member that is made only of porous, sound absorbing material.

Figure 3:
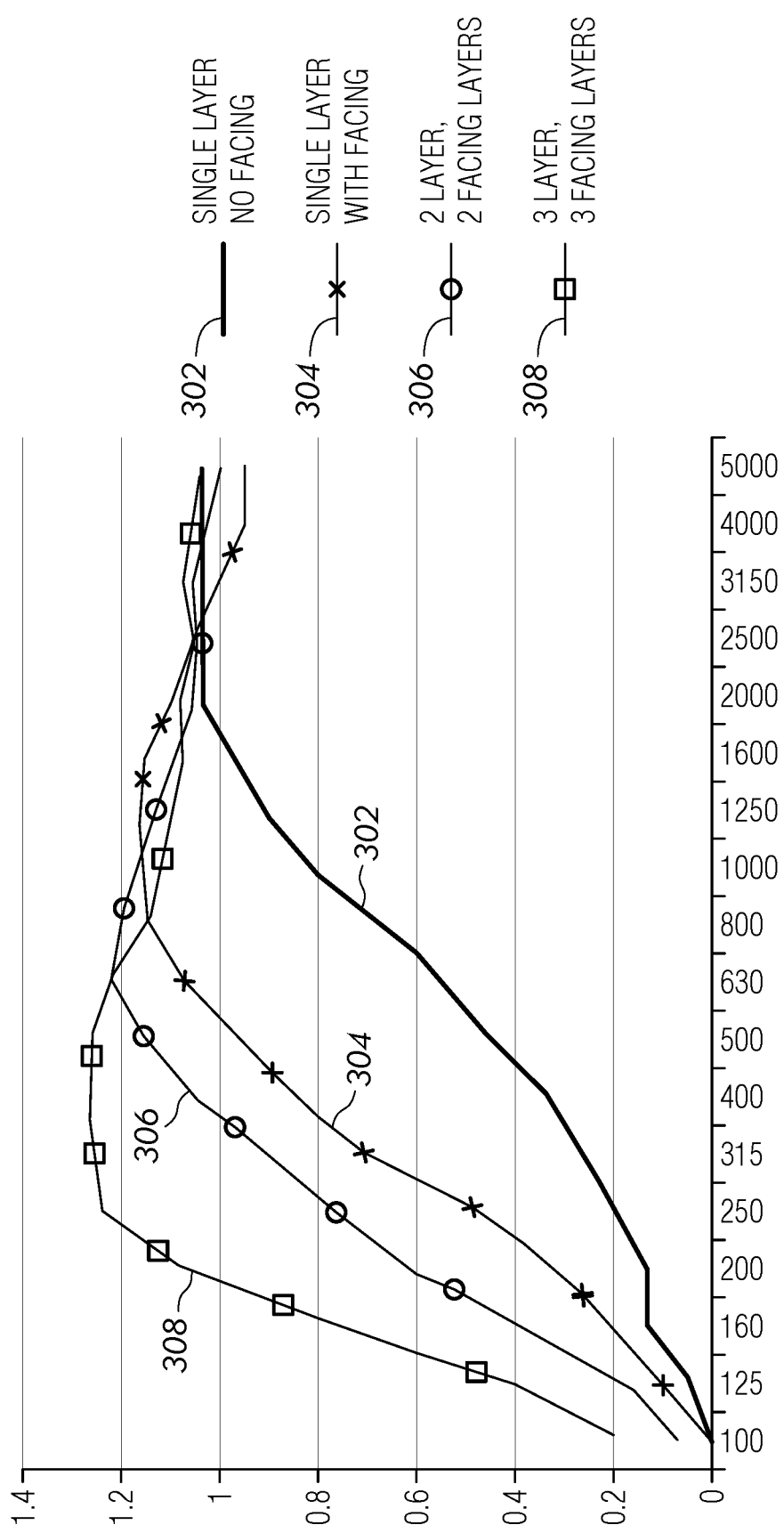
FIG. 3 is a graph illustrating sound absorption performance of non-spaced apart, insulation members.

The graph of FIG. 3 illustrates the effect of a multi-layer arrangement of the porous, sound absorbing layers 20 and dense or facing layers 22 when those layers are arranged as disclosed in U.S. Published Patent Application 2012/0298154, to Rockwell et. al, the disclosure of which is fully incorporated herein by reference. In FIG. 3, an absorption coefficient (y-axis), which is a measure of the absorptive effectiveness of the insulation member, is plotted vs. noise frequencies (x-axis) for four different insulation members. The first plot 302 represents the performance of an insulation member that comprises a porous, lofted sound absorbing layer 20 having a thickness T and single thin facing layer 22. The second plot 304 represents the performance of an insulation member that comprises a porous, lofted sound absorbing layer 20 having a thickness 2T and a single thin facing layer 22. The third plot 306 represents the performance of an insulation member 16 constructed with two porous, lofted sound absorbing layers 20 alternating with two thin facing layers 22 where the first porous, sound absorbing layer 20a has a thickness T and the second porous, sound absorbing layer 20b has a thickness 2T. The fourth plot 308 represents the performance of an insulation member 16 constructed with three porous, lofted sound absorbing layers 20 alternating with three thin facing layers 22 where the first sound absorbing layer 20a has a thickness T, the second sound absorbing layer 20b has a thickness 2T, and the third sound absorbing layer 20c has a thickness 2T.

As can be seen from the graph of FIG. 3 the multi-layer arrangements of multiple porous, sound absorbing layers 20 and multiple dense or facing layers 22 significantly enhances the performance of the insulation member 16, especially in a low frequency range of between 100 and 500 Hz, and most especially around 125 Hz. As can be seen from the graph of FIG. 3, the multi-layer arrangements have more than an additive effect on the absorption performance, especially in low frequency ranges, such as at frequencies between 100 Hz and 200 Hz. For example, at 125 Hz, the absorption performance coefficient of the 2 absorptive layer/2 facing layer insulation member (plot 306) is about 15-20% more than the absorption performance coefficients of the two 1 absorptive layer/1 facing layer (plots 302, 304) added together. In addition, at 125 Hz, the absorption performance coefficient of the 3 absorptive layer/3 insulation member (plot 308) is about 50% more than the absorption performance coefficient of the 2 absorptive layer/2 facing layer insulation member (plot 306) added to the 1 absorptive layer/1 absorptive layer (plot 304—i.e. 2T thickness plot). As such, adding the second and third absorptive/facing layers increases the absorptive performance coefficient in a substantially exponential manner. This substantially increased acoustical absorption performance is especially useful in machines having motors and pumps that generate noise in a low frequency range, such as frequencies around 125 Hz. For example, the increased acoustical performance is beneficial in a dishwasher or washing machine that generates noise in a low frequency range, such as frequencies around 125 Hz.

Introducing the air gap 19 between the first porous sound absorbing layer 20a and the second facing layer 22b, as shown in FIG. 2A, provides improved the absorptive effectiveness as compared to the absorptive effectiveness, shown in the third plot 306, of the two layer, two facing layer arrangement. Similarly, introducing the air gap 19a between the first porous sound absorbing layer 20a and the second facing layer 22b and the air gap 19b between the second porous sound absorbing layer 20b and the third facing layer 22c, as shown in FIG. 2B, provides improved absorptive effectiveness as compared to the absorptive effectiveness, shown in the fourth plot 308, of the three layer, three facing layer arrangement.

The porous, sound absorbing layers 20 may be made from a wide variety of different materials. For example, the porous, sound absorbing layers 20 may be made from thermoplastic polymers, such as polyester, polyethylene terephthalate (PET) polypropylene and the like. In one exemplary embodiment, the sound absorbing layer 20 is made from a fine fiber PET material, such as a 2 denier fiber size PET material. The porous, sound absorbing layers 20 may be formed with a variety of different densities and lofts, which can be selected to adjust the acoustic performance of the insulation member 16. In one exemplary embodiment, the porous, sound absorbing layer 20 is 15-300 grams per square foot and a thickness range of/8 inch to 3 inches. In other embodiments, the sound absorbing layer 20 may have a thickness range of ½ inch to 1½ inches. For example, in the embodiments illustrated by FIGS. 2A and 2B, the first sound absorbing layer 20a may be a PET material, such as VersaMat 2110 (available from Owens Corning) that is 20-25 grams per square foot with a thickness of about ¾ inch, the second sound absorbing layer 20b may be a PET material, such as VersaMat 2110 that is 60-80 grams per square foot with a thickness of about 1½ inch, and the third sound absorbing layer 20c (FIG. 2B) may be a PET material, such as VersaMat 2110 that is 60-80 grams per square foot with a thickness of about 1½ inch. However, any combination of materials, lofts, and densities may be selected or changed to achieve different acoustic performance characteristics.

The facing layers 22 can take a wide variety of different forms. In an exemplary embodiment, the facing 22 is a relatively permeable layer that allows noise and air to pass through the facing member. For example, the facing layers 22 may have an airflow resistance between about 600-1400 Rayls. In one exemplary embodiment, the facing layers 22 have an airflow resistance between 900-1400 Rayls. In other exemplary embodiment, the facing layers 22 have an airflow resistance between 600-1100 Rayls. The facing layers 22 may be selected to have an airflow resistance of about 700 Rayls, about 900 Rayls, about 1100 Rayls, about 1300 Rayls, or about 1400 Rayls. Other airflow resistances, however, can be selected. In one exemplary embodiment, the facing layers 22 in the embodiments illustrated by FIGS. 2A and 2B have an airflow resistance of about 900, 1100 and/or 1400 Rayls.

The facing layers 22 can be made from a wide variety of different materials and may have a variety of different thicknesses. For example, any material having the airflow resistance described above can be used. Examples of acceptable materials for the facing layers 22 include, but are not limited to polypropylene, PET, non-porous materials that are perforated to allow airflow, such as perforated metal foil, perforated polymer material, such as a Teflon sheet that has been perforated to allow airflow.

The facing layer 22 may have a wide variety of different densities and thicknesses. In an exemplary embodiment, the dense or facing layer 22 is much denser than the sound absorbing layer 20. For example, in the embodiments illustrated by FIGS. 2A and 2B, the dense or facing layers 22a, 22b, 22c may be a polypropylene material, such as a spunbond/meltblown/spunbond sheet that is 50 grams per square meter (gsm). The facing layer 22 can have any thickness. For example, the facing layer 22, when made from a polymer such as polypropylene or PET, may be between 0.01 and 0.1 cm thick.

The air gaps 19a, 19b may be a wide variety of different shapes and sizes. For example, the size of the air gaps 19 can at least partially be defined by the distance X between the insulation members. The distance between the insulation members and the orientation and configuration of each of the insulation members can vary in different embodiments. Thus, the size and shape of the air gaps may vary in different embodiments and at different locations along the length of the insulation members. In the schematic illustrations of FIGS. 1-2b, the insulation members are generally planar and arranged parallel to each other. The air gap between the first and second insulation members can be defined by the distance X between the insulation member and the length of each insulation member. In other embodiments, however, the distance between the insulation members may vary across the length of the insulation members. Thus, the air gap size can vary at different locations between the insulation members.

The facing layers 22 and the sound absorbing layers 20 can be assembled in a wide variety of different manners. In one exemplary embodiment, a facing layer 22 is bonded to one or both of the faces of the sound absorbing layer 20 to form a porous/dense laminate 21. The facing layer 22 may be bonded to the sound absorbing layer 20 in a wide variety of different ways. For example, the facing layer 22 may be laminated to the sound absorbing layer 20 using heat and/or pressure or the facing layer may be bonded to the sound absorbing layer with an adhesive.

The insulation members 16, 18 can take a wide variety of different forms, be made from a wide variety of different materials, and be made in a wide variety of different ways. The insulation members 16 18, may have any number of porous, sound absorbing layers 20 and dense or facing layers 22. For example, the insulation member 16 may include any number of alternating dense or facing layers 22 and porous, sound absorbing layers 20 with one porous, sound absorbing layer at one outer surface and one dense or facing layer at the other outer surface, any number of alternating dense or facing layers 22 and porous, sound absorbing layers 20 with porous, sound absorbing layers at the outer surfaces, and/or any number of alternating dense or facing layers 22 and porous, sound absorbing layers 20 with dense or facing layers at the outer surfaces. Any arrangement of porous, sound absorbing layers 20 and dense or facing layers 22 can be used.

Figure 4:
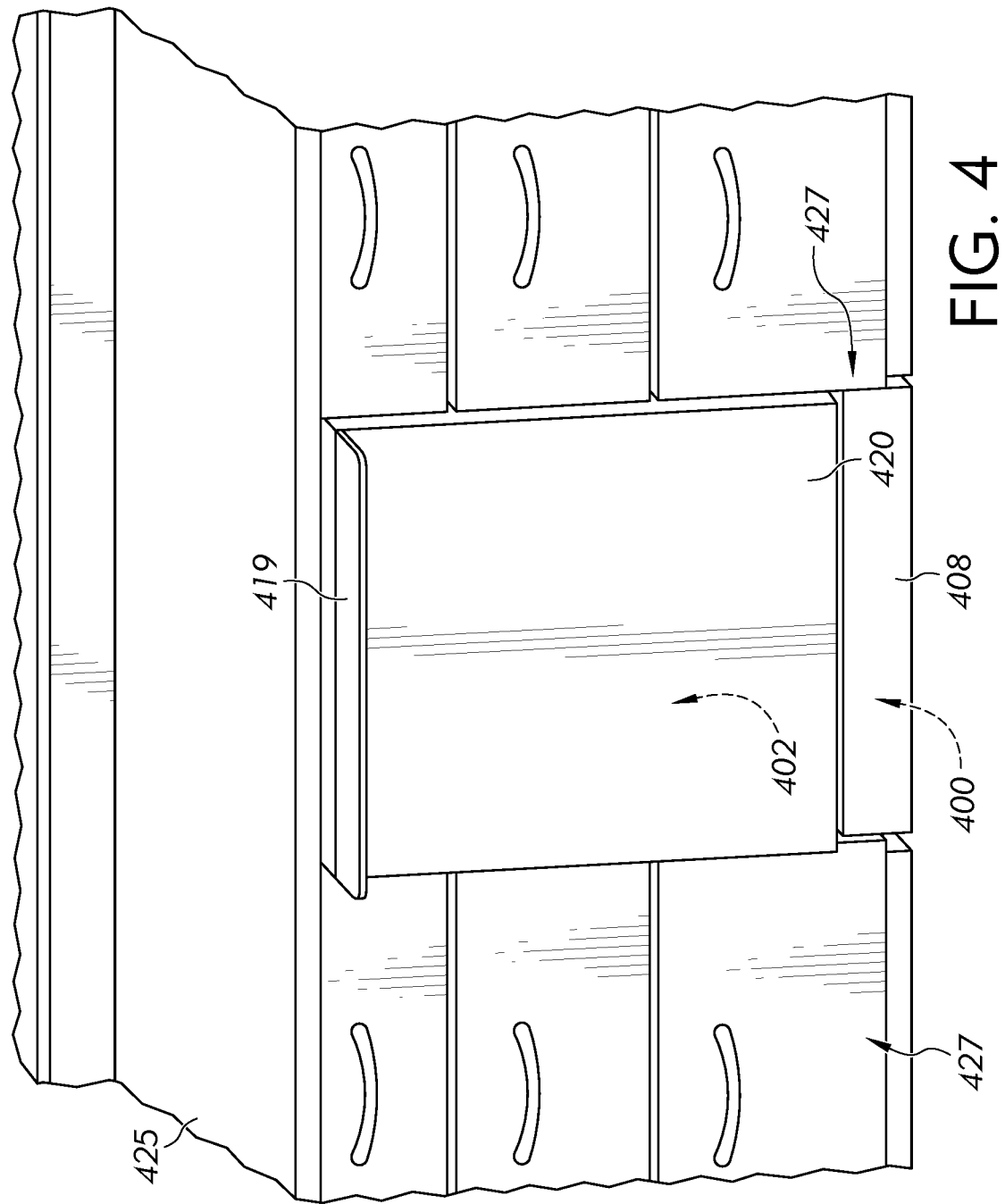
FIG. 4 is a perspective view of a dishwasher installed in kitchen cabinetry.
Figure 5:
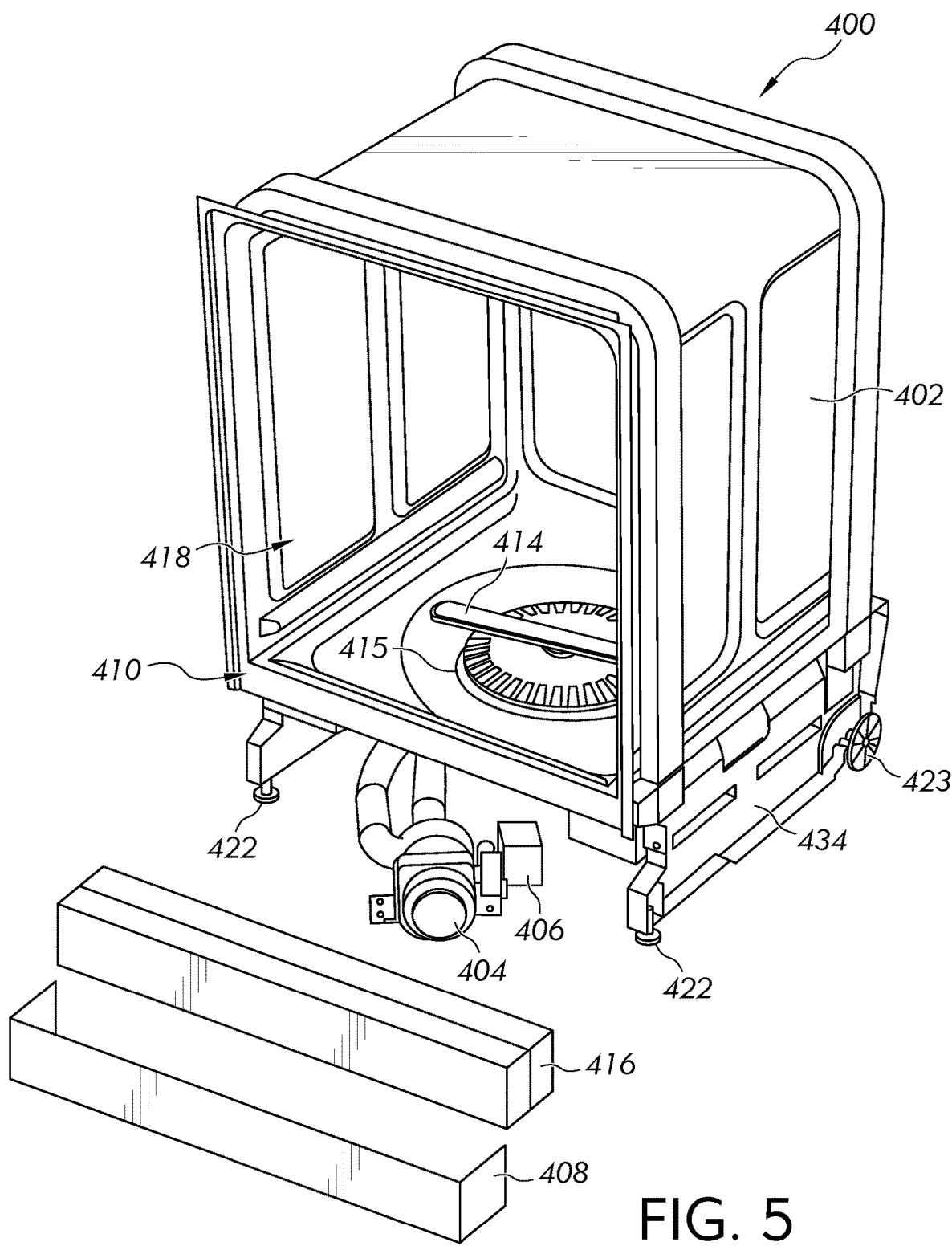
FIG. 5 is a perspective view of an exemplary embodiment of an acoustically insulated dishwasher.

Referring to FIGS. 4 and 5, an exemplary embodiment of an acoustically insulated machine is an acoustically insulated dishwasher 400. The following description of a dishwasher is provided for illustrative purposes only and is not intended to limit the scope of the application unless otherwise stated. The acoustically insulated dishwasher 400 illustrated by FIGS. 4 and 5 may include a housing 402, a pump 404, a drive motor 406, a plate 408 closing a front side 410 of the housing, and one or more insulation members 416. The housing 402 includes a washing chamber 418 (FIG. 5) and an access door 420 (FIG. 4).

The dishwasher 400 includes a base portion 434 that is provided with a plurality of legs 422 and/or wheels 423 that support the housing 402. The wheels 423 enable an installer to easily position the dishwasher 400 below the countertop 425 and legs 422 enable the installer to accurately position/level the dishwasher 400. The pump 404 and drive motor 406 are provided in a cavity 424 between the legs 422 and below the housing 402.

The dishwasher 400 illustrated by FIG. 5 includes a wash arm 414 that is arranged within the washing chamber 418 above a sump 415. The wash arm 414 selectively delivers jets of washing fluid onto kitchenware placed within dishwasher 400 in a manner known in the art. The pump 404 is connected to the sump 415. In operation, the pump 404 creates a circulating flow of washing fluid within the washing chamber 418 during a washing operation.

Referring to FIG. 4, the door 420 includes a handle 419 that selectively provides access to the washing chamber 418. The door 420 includes a plurality of control elements (not shown) for selecting particular operating parameters of a washing operation. In the embodiment shown in FIG. 4, the dishwasher 400 is arranged below a countertop 425 adjacent to cabinetry 427. The plate 408 extends below the door 420 to provide a finished, aesthetic appearance. In one exemplary embodiment, the one or more insulation members 416 may be provided between the plate 408 and the pump 404 (FIG. 6).

The insulation members 416 may take a wide variety of different forms. For example, the insulation members 416 may have any of the multi-layer configurations of the first and second insulation members 16, 18 described above. In one exemplary embodiment, at least one of the one or more insulation members 416 comprises a porous, sound absorbing layer 20 and a dense or facing layer 22 attached to a of the sound absorbing layer 20. The dense or facing layer 22 has a density that is greater than a density of the sound absorbing layer. In one exemplary embodiment, the one or more insulation members 416 are oriented such that the dense or facing layer 22 faces toward the pump 404 and motor 406 and at least two insulation members are separated by an air gap 19. The dense or facing layer 22 may be configured to allow a majority of low frequency sound energy from the pump 404 and motor 406 to pass into the dense or facing layer 22.

The one or more insulation members 416 may be positioned and oriented within the cabinet 12 of the machine 10 in a variety of ways to reduce the amount of sound energy generated by the internal source of noise 14 that leaves the cabinet. The insulation members 416 can be disposed inside any of the walls of the cabinet 12 or positioned within the cabinet in any suitable orientation. In other embodiments, however, one or more insulation members 416 may be disposed outside of the cabinet 12 and may be disposed on or outside any of the walls of the cabinet. The insulation members 416 can be oriented such that a dense or facing layer 22 faces toward the internal source of noise 14. In other embodiments, however, one or more insulation members 416 may be oriented such that a porous, sound absorbing layer 20 faces toward the internal source of noise 14.

Figure 6:
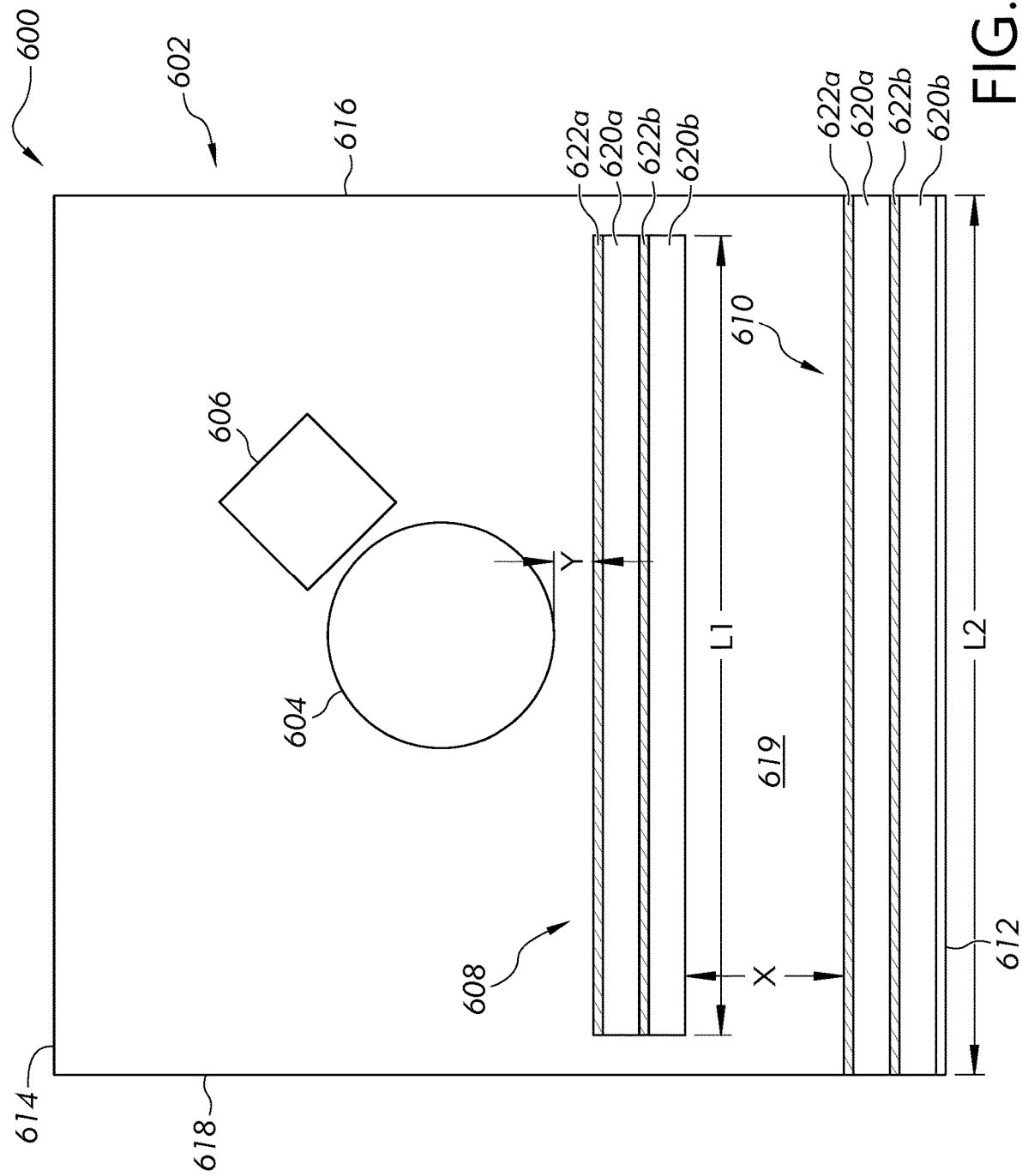
FIG. 6 is a schematic illustration of an exemplary embodiment of an acoustically insulated machine having spaced apart, multi-layer insulation members.

Referring to FIG. 6, an exemplary embodiment of an acoustically insulated machine is an acoustically insulated dishwasher 600. The dishwasher 600 may take a wide variety of different forms. For example, the dishwasher 600 may be configured as described above in relation to dishwasher 400. In other embodiments, however, the dishwasher 600 may be configured differently than the dishwasher 400.

The dishwasher 600 includes a cabinet or housing 602, a pump 604 and a drive motor 606 disposed within the cabinet, a first insulation member 608, and a second insulation member 610. The cabinet 602 includes a front wall 612, a rear wall 614 spaced apart and generally parallel to the front wall, a first side wall 616 generally perpendicular to and connecting the front wall to the back wall, and a second side wall 618 generally parallel to and spaced apart from the first side wall and connecting the front wall to the back wall.

The first insulation member 608 and the second insulation member 610 may take a wide variety of different forms. For example, the first and second insulation members 608, 610 may have any of the multi-layer configurations of the insulation members 16, 18, and 416 described above. In other embodiments, however, the insulation members 608, 610 may differ from the insulation members 16, 18, and 416. In the exemplary embodiment of FIG. 6, the first insulation member 608 and the second insulation member 610 are multilayered.

The first insulation member 608 includes a first dense or facing layer 622a that faces toward the pump 604 and the drive motor 606, a first porous sound absorbing layer 620a attached to the first dense or facing layer, a second dense or facing layer 622b attached to the first porous sound absorbing layer 620a, and a second porous sound absorbing layer 620b attached to the second dense or facing layer 622b. The first insulation member 608 has a first length L1, has a generally linear or planar configuration, and is a distance Y from the pump 604.

The second insulation member 610 includes a first dense or facing layer 622a that faces toward the pump 604 and the drive motor 606, a first porous sound absorbing layer 620a attached to the first dense or facing layer, a second dense or facing layer 622b attached to the first porous sound absorbing layer 620a, and a second porous sound absorbing layer 620b attached to the second dense or facing layer 622b. The second insulation member 608 has a second length L2, has a generally linear or planar configuration, and is a distance X from the first insulation member 608. In the exemplary embodiment of FIG. 6, the first length L1 is smaller than the second length L2 and the distance X is greater than the distance Y. In other embodiments, however, the first length L1 have be equal to or greater than the second length L2 and the distance X may be equal to or less than the distance Y.

The first insulation member 608 is arranged parallel, or generally parallel, to the second insulation member 610 and the front wall 612. In other embodiments, however, the first insulation member 608 may be other than parallel to the second insulation member 610 and/or the front wall 612.

The first insulation member 608 is spaced apart from the second insulation member 610 such that an air gap 619 is formed between the first and second insulation members 608, 610. The air gap 619 may be shaped and sized in a variety of ways. For example, the air gap 619 may be configured as described above regarding the air gaps 19, 19a, 19b of FIGS. 2A and 2B. The air gap 619 can be at least partially defined by the distance X that the first insulation member 608 is spaced apart from the second insulation member 610. In the exemplary embodiment, the distance X between the first and second insulation members 608, 610 is constant, or generally constant, along the length of the first insulation member. Thus, the size of the gap 619 is constant, or generally constant, along the length. In other embodiments, however, the size of the air gap between the first and second insulation members may vary along the length of the members.

Figure 7:
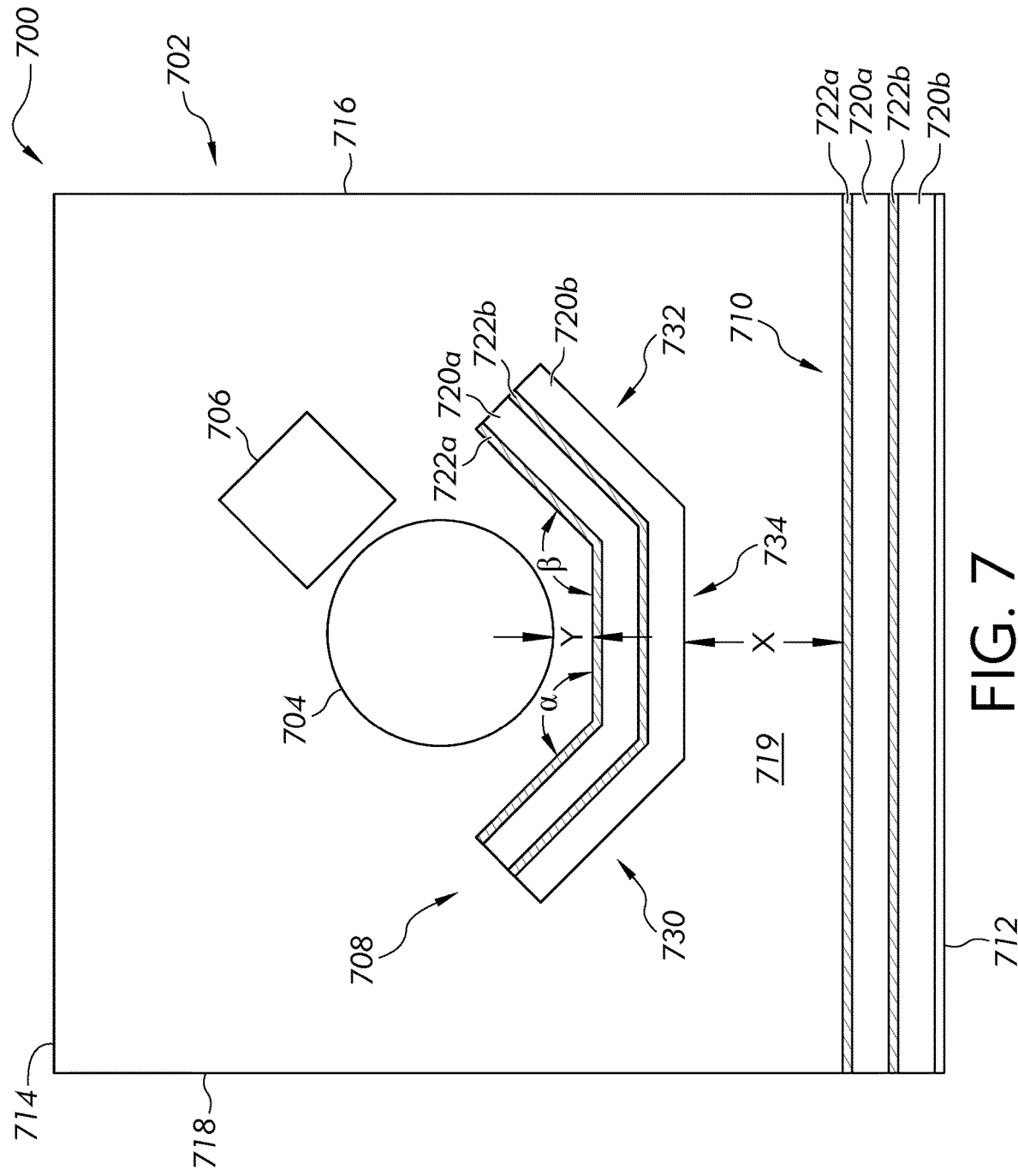
FIG. 7 is a schematic illustration of an exemplary embodiment of an acoustically insulated machine having spaced apart, multi-layer insulation members.

Referring to FIG. 7, an exemplary embodiment of an acoustically insulated machine is an acoustically insulated dishwasher 700. The dishwasher 700 is similar to the dishwasher 600 of FIG. 6 in that the dishwasher 700 includes a cabinet or housing 702, a pump 704 and a drive motor 706 disposed within the cabinet, a first insulation member 708, and a second insulation member 710. The cabinet 702 includes a front wall 712, a rear wall 714 spaced apart and generally parallel to the front wall, a first side wall 716 generally perpendicular to and connecting the front wall to the back wall, and a second side wall 718 generally parallel to and spaced apart from the first side wall and connecting the front wall to the back wall.

The first insulation member 708 and the second insulation member 710 are multilayered. The first insulation member 708 includes a first dense or facing layer 722a that faces toward the pump 704 and the drive motor 706, a first porous sound absorbing layer 720a attached to the first dense or facing layer, a second dense or facing layer 722b attached to the first porous sound absorbing layer 720a, and a second porous sound absorbing layer 720b attached to the second dense or facing layer 722b.

The second insulation member 710 includes a first dense or facing layer 722a that faces toward the pump 704 and the drive motor 706, a first porous sound absorbing layer 720a attached to the first dense or facing layer, a second dense or facing layer 722b attached to the first porous sound absorbing layer 720a, and a second porous sound absorbing layer 720b attached to the second dense or facing layer 722b. The second insulation member 708 has a generally linear or planar configuration and is arranged generally parallel to the front wall 712.

The first insulation member 708, however, differs from the first insulation member 608 of FIG. 6 in that the first insulation member 708 is curved or includes angled portions. In the illustrated embodiment of FIG. 7, the first insulation member 708 partially surrounds the pump 704 and/or the drive motor 706 and is a distance Y from the pump 704. In other embodiments, however, the first insulation member 708 may not surround, or partially surround, the pump 704 and/or the drive motor 706. In the illustrated embodiment, the first insulation member 708 includes a first angled portion 730, a second angled portion 732, and an intermediate portion 734 that connects the first angled portion to the second angled portion. The first angled portion 730, the second angled portion 732, and the intermediate portion 734 may be a single piece of multilayer insulation, or three separate portions that are connected or arranged adjacent to each other. In other embodiments, the first insulation member 708 may have more or less than two angled portions or may be curved.

In the exemplary embodiment of FIG. 7, the first angled portion 730 extends at an angle α from to the intermediate portion 734 and the second angled portion 732 extends at an angle β from to the intermediate portion 734. In one exemplary embodiment, the angle α and the angle β are both 45 degrees, or approximately 45 degrees. In other embodiments, however, the angle α may be different from the angle β. In addition, in other embodiments the angle α and/or the angle β may be greater than or less than 45 degrees.

The first insulation member 708 is spaced apart from the second insulation member 710 a distance X such that an air gap 719 is formed between the first and second insulation members 708, 710. In the embodiment of FIG. 7, the intermediate portion 734 is generally parallel to the second insulation member 710 and to the front wall 712. In other embodiments, however, the intermediate portion 734 may be other than parallel to the second insulation member 710 and/or the front wall 712. The distance X between the first and second insulation members 708, 710 may vary. In the illustrated embodiment, the distance between the second insulation member 710 and the intermediate portion 734 is less than the distance between the second insulation member and either the first angled portion 730 or the second angled portion 732. Likewise, the distance Y between the first insulation member 708 and the pump 704 may vary.

Figure 8:
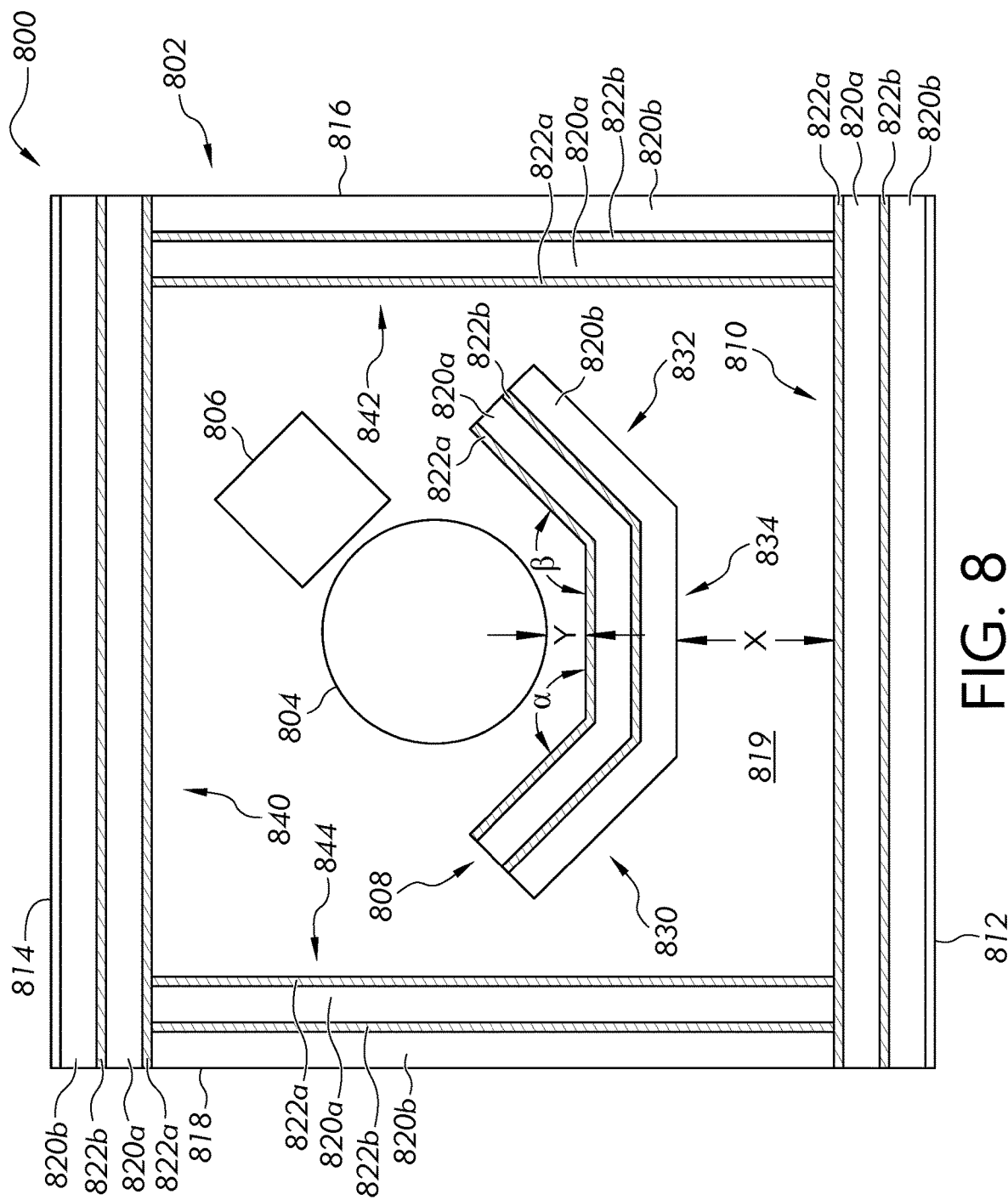
FIG. 8 is a schematic illustration of an exemplary embodiment of an acoustically insulated machine having spaced apart, multi-layer insulation members.

Referring to FIG. 8, an exemplary embodiment of an acoustically insulated machine is an acoustically insulated dishwasher 800. The dishwasher 800 is similar to the dishwasher 700 of FIG. 7 in that the dishwasher 800 includes a cabinet or housing 802, a pump 804 and a drive motor 806 disposed within the cabinet, a first insulation member 808, and a second insulation member 810. The cabinet 802 includes a front wall 812, a rear wall 814 spaced apart and generally parallel to the front wall, a first side wall 816 generally perpendicular to and connecting the front wall to the back wall, and a second side wall 818 generally parallel to and spaced apart from the first side wall and connecting the front wall to the back wall.

The first insulation member 808 and the second insulation member 810 may be multilayered. The first insulation member 808 includes a first dense or facing layer 822a that faces toward the pump 804 and the drive motor 806, a first porous sound absorbing layer 820a attached to the first dense or facing layer, a second dense or facing layer 822b attached to the first porous sound absorbing layer 820a, and a second porous sound absorbing layer 820b attached to the second dense or facing layer 822b.

The second insulation member 810 includes a first dense or facing layer 822a that faces toward the pump 804 and the drive motor 806, the first porous sound absorbing layer 820a attached to the first dense or facing layer, a second dense or facing layer 822b attached to the first porous sound absorbing layer 820a, and a second porous sound absorbing layer 820b attached to the second dense or facing layer 822b. The second insulation member 808 has a generally linear or planar configuration and is arranged generally parallel to the front wall 812.

The first insulation member 808 is curved or includes angled portions such that it partially surrounds the pump 804 and/or the drive motor 806 and is a distance Y from the pump 804. In the illustrated embodiment, the first insulation member 808 includes a first angle portion 830, a second angled portion 832, and an intermediate portion 834 that connects the first angled portion to the second angled portion and is generally parallel to the second insulation member 810 and to the front wall 812. The first insulation member 808 is spaced apart from the second insulation member 810 a distance X such that an air gap 819 is formed between the first and second insulation members 808, 810.

In the exemplary embodiment of FIG. 8, the first angled portion 830 extends at an angle α from to the intermediate portion 834 and the second angled portion 832 extends at an angle β from to the intermediate portion 834. In one exemplary embodiment, the angle α and the angle β are both 45 degrees, or approximately 45 degrees. In other embodiments, however, the angle α may be different from the angle β. In addition, in other embodiments the angle α and/or the angle β may be greater than or less than 45 degrees.

The acoustically insulated dishwasher 800, however, differs from the dishwasher 700 in that the dishwasher 800 includes one or more insulation members attached or adjacent the inside of one or more of the cabinet rear wall 814 or sidewalls 816, 818. In the exemplary embodiment of FIG. 8, a third insulation member 840 is attached to or adjacent the rear wall 816, a fourth insulation member 842 is attached to or adjacent the first sidewall 816, and a fifth insulation member 844 is attached to or adjacent the second sidewall 818. Collectively, the second insulation member 810, the third insulation member 840, the fourth insulation member 842, and the fifth insulation member 844 surround the pump 804 and the drive motor 806. The third insulation member 840, the fourth insulation member 842, and the fifth insulation member 844 may have the same multi-layer configuration of the first and/or second insulation members 808, 810. In other embodiments, however, the third insulation member 840, the fourth insulation member 842, and the fifth insulation member 844 may have different configurations than the first or second insulation members 808, 810. Furthermore, any of the insulation members may be configured differently than any other insulation member.

The third insulation member 840 includes a first dense or facing layer 822a that faces toward the pump 804 and the drive motor 806, a first porous sound absorbing layer 820a attached to the first dense or facing layer, a second dense or facing layer 822b attached to the first porous sound absorbing layer 820a, and a second porous sound absorbing layer 820b attached to the second dense or facing layer 822b. The third insulation member 840 has a generally linear or planar configuration and is arranged generally parallel to the rear wall 814.

The fourth insulation member 842 includes a first dense or facing layer 822a that faces toward the pump 804 and the drive motor 806, a first porous sound absorbing layer 820a attached to the first dense or facing layer, a second dense or facing layer 822b attached to the first porous sound absorbing layer 820a, and a second porous sound absorbing layer 820b attached to the second dense or facing layer 822b. The fourth insulation member 842 has a generally linear or planar configuration and is arranged generally parallel to the first sidewall 816.

The fifth insulation member 844 includes a first dense or facing layer 822a that faces toward the pump 804 and the drive motor 806, a first porous sound absorbing layer 820a attached to the first dense or facing layer, a second dense or facing layer 822b attached to the first porous sound absorbing layer 820a, and a second porous sound absorbing layer 820b attached to the second dense or facing layer 822b. The fifth insulation member 844 has a generally linear or planar configuration and is arranged generally parallel to the second sidewall 818.

A portion of the air gap 819 extends between the first insulation member 808 and the fourth insulation member 842 and another portion of the air gap 819 extends between the first insulation member 808 and the fifth insulation member 844. The distance X between the first insulation member 808 and the second insulation member 810 can vary. Likewise, the distance between the first insulation member 808 and the fourth insulation member 842 or the fifth insulation member 844 can vary. The air gap 819 can be at least partially defined by the distances between the first insulation member and the other insulation members 810, 840, 842, 844, thus the size of the air gaps 619 may vary.

Figure 9:
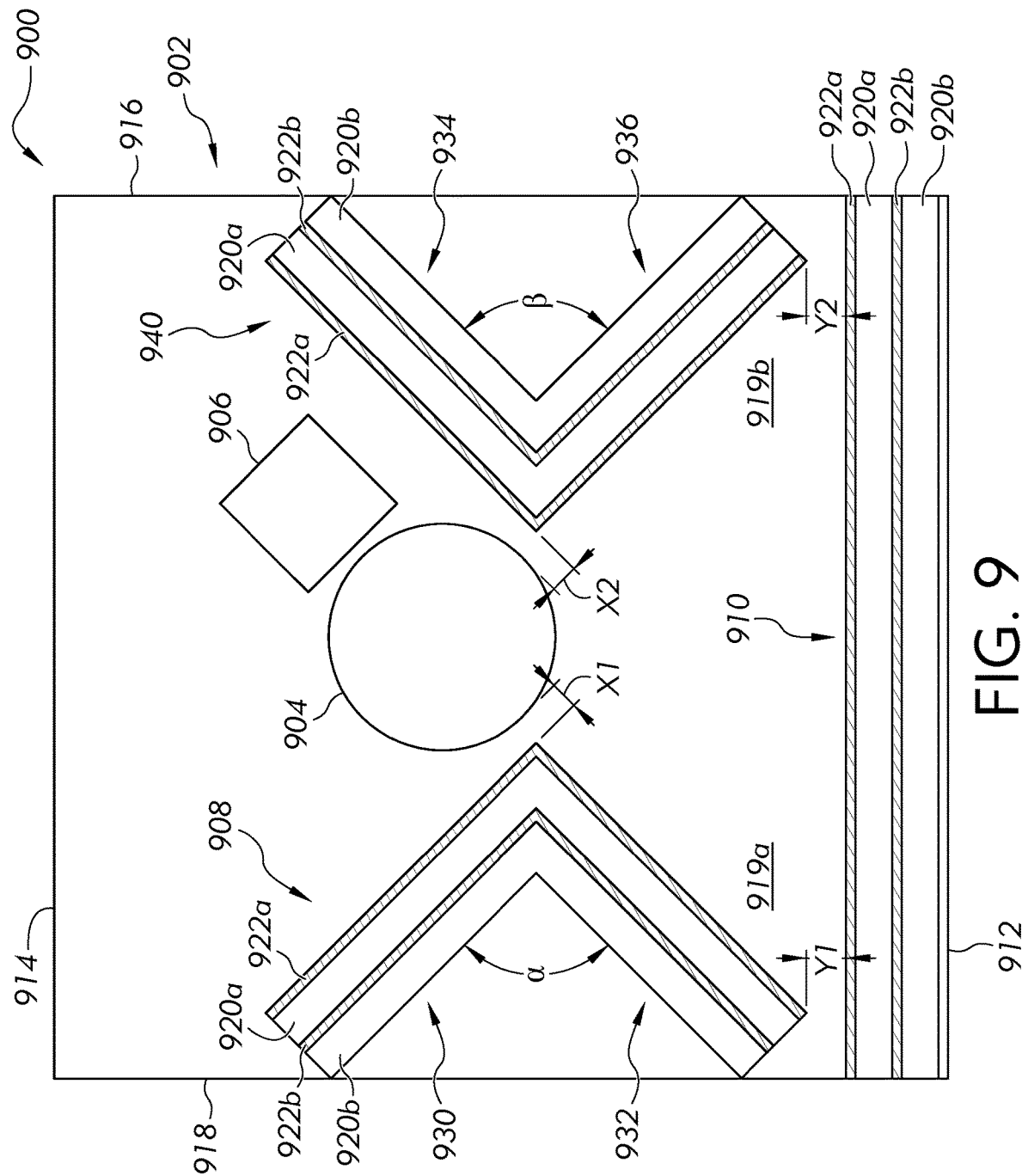
FIG. 9 is a schematic illustration of an exemplary embodiment of an acoustically insulated machine having spaced apart, multi-layer insulation members.

Referring to FIG. 9, an exemplary embodiment of an acoustically insulated machine is an acoustically insulated dishwasher 900. The dishwasher 900 is similar to the dishwasher 700 of FIG. 7 in that the dishwasher 900 includes a cabinet or housing 902, a pump 904 and a drive motor 906 disposed within the cabinet. The cabinet 902 includes a front wall 912, a rear wall 914 spaced apart and generally parallel to the front wall, a first side wall 916 generally perpendicular to and connecting the front wall to the back wall, and a second side wall 918 generally parallel to and spaced apart from the first side wall and connecting the front wall to the back wall.

The dishwasher 900 includes a first insulation member 908, a second insulation member 910, and a third insulation member 940. Each of the first insulation member 908, the second insulation member 910, and the third insulation member 940 can be multilayered. The first insulation member 908 includes a first dense or facing layer 922a, a first porous sound absorbing layer 920a attached to the first dense or facing layer, a second dense or facing layer 922b attached to the first porous sound absorbing layer 920a, and a second porous sound absorbing layer 920b attached to the second dense or facing layer 922b.

The second insulation member 910 includes a first dense or facing layer 922a that faces toward the pump 904 and the drive motor 906, the first porous sound absorbing layer 920a attached to the first dense or facing layer, a second dense or facing layer 922b attached to the first porous sound absorbing layer 920a, and a second porous sound absorbing layer 920b attached to the second dense or facing layer 922b. The second insulation member 908 has a generally linear or planar configuration and is arranged generally parallel to the front wall 912.

The third insulation member 940 includes a first dense or facing layer 922a, a first porous sound absorbing layer 920a attached to the first dense or facing layer, a second dense or facing layer 922b attached to the first porous sound absorbing layer 920a, and a second porous sound absorbing layer 920b attached to the second dense or facing layer 922b.

The first insulation member 908, however, differs from the first insulation member 708 of FIG. 7 in that the first insulation member 908 is V-shaped, including a first angled portion 930 and a second angled portion 932. The first insulation member 908 is positioned generally between the pump 904 and the second sidewall 918 with the first angled portion 930 and the second angled portion extending away from the pump 904. The first insulation member 908 is spaced apart from the second insulation member 910 such that an air gap 919a is formed between the first and second insulation members 908, 910. The first insulation member 908 is a distance X1 from the pump 904 and a distance Y1 from the second insulation member 910. The distance X1 and the distance Y1 may vary across the length of the first insulation member 908.

In the exemplary embodiment of FIG. 9, the first angled portion 930 of the first insulation member 908 extends at an angle α from the second angled portion 932. In one exemplary embodiment, the angle α is 90 degrees, or approximately 90 degrees. In other embodiments, however, the angle α may be greater than or less than 90 degrees. The first angle portion 930 and the second angled portion 932 may be formed from a single piece of multilayer insulation, or may be two separate portions that are connected or arranged adjacent to each other.

The third insulation member 940 may be similar to the first insulation member 908 in that the third insulation member is V-shaped, including a first angled portion 934 and a second angled portion 936. The third insulation member 940 is positioned generally between the pump 904 and the first sidewall 916 with the first angled portion 934 and the second angled portion 936 extending away from the pump 904. The third insulation member 940 is spaced apart from the second insulation member 910 such that an air gap 919*b* is formed between the third and second insulation members 940, 910. The third insulation member 940 is a distance X2 from the pump 904 and a distance Y2 from the second insulation member 910. The distance X2 and the distance Y2 may vary across the length of the first insulation member 908.

In the exemplary embodiment of FIG. 9, the first angled portion 934 of the third insulation member 940 extends at an angle β from the second angled portion 936. In one exemplary embodiment, the angle β is 90 degrees, or approximately 90 degrees. In other embodiments, however, the angle β may be greater than or less than 90 degrees. In the illustrated embodiment, the angle α of the first insulation member 908 is equal to the angle β of the third insulation member 940. In other embodiments, however, the angle α may differ from the angle β. The first angle portion 934 and the second angled portion 936 may be formed from a single piece of multilayer insulation, or may be two separate portions that are connected or arranged adjacent to each other.

As described with respect to the insulation members 16, 18, 60, the arrangement of dense or facing layers, porous layers, and air gaps of the embodiments of FIGS. 6-9 allow a majority of the low frequency sound energy to enter the insulation members, then trap a majority of the low frequency sound energy, and allow only a small portion of the low frequency sound energy to pass through the insulation members. The insulation members can be oriented to reflect much of the sound energy that is not absorbed toward the rear or side walls of the acoustically insulated machine or toward another insulating member.

Figure 10:
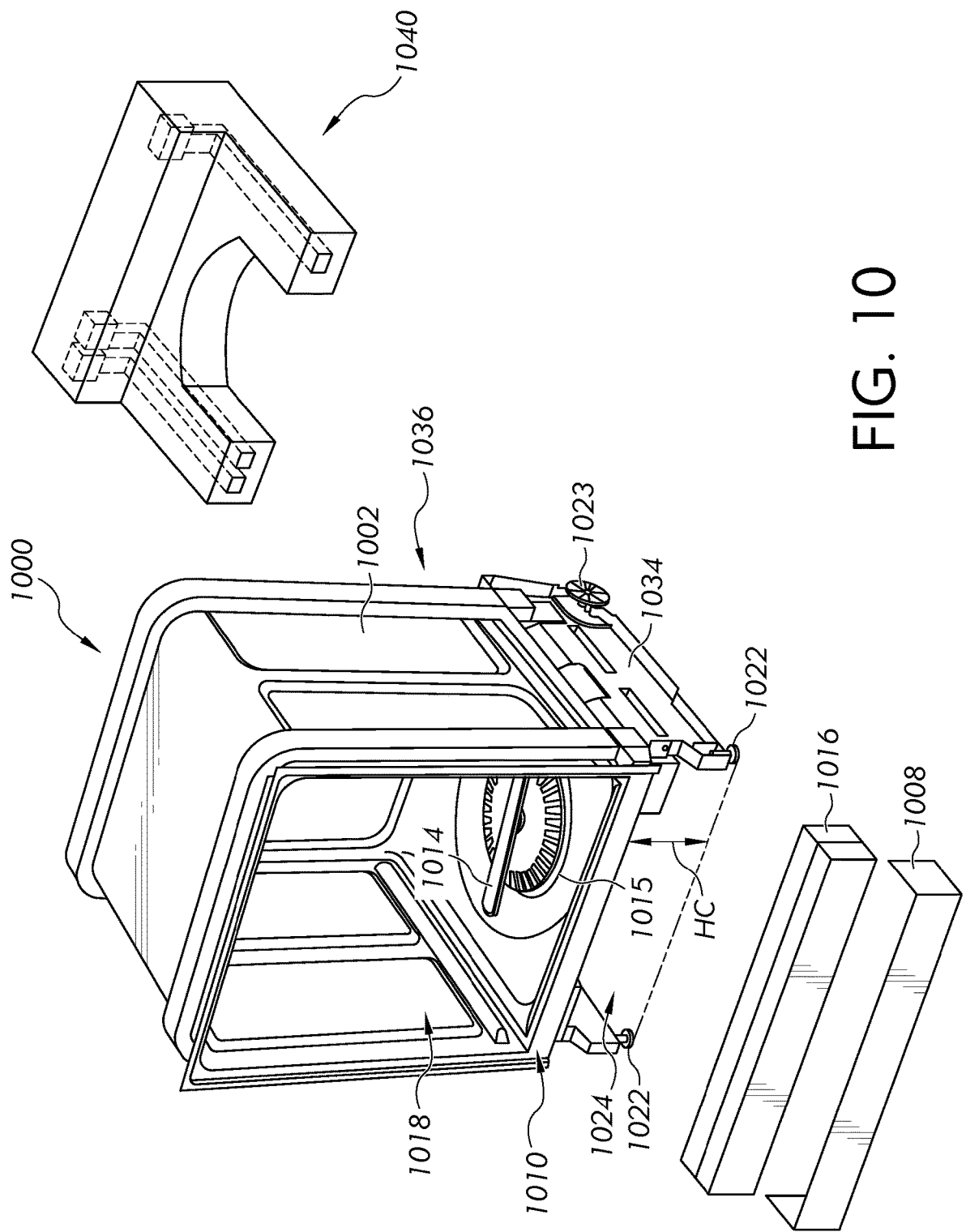
FIG. 10 is a perspective view of an exemplary embodiment of an acoustically insulated dishwasher.

Referring to FIG. 10, an exemplary embodiment of an acoustically insulated machine is an acoustically insulated dishwasher 1000. The acoustically insulated dishwasher 1000 illustrated by FIG. 10 is similar to the dishwasher 400 of FIG. 5 in that the dishwasher includes a housing 1002, a pump 1004 and a drive motor 1006 (See FIG. 13), a plate 1008 closing a front side 1010 of the housing, a washing chamber 1018, and one or more insulation members 1016.

The dishwasher 1000 includes a base portion 1034 that is provided with a plurality of legs 1022 and/or wheels 1023 that support the housing 1002. The wheels 1023 enable an installer to easily position the dishwasher 1000 and the legs 1022 enable the installer to accurately position/level the dishwasher. The pump 1004 and drive motor 1006 (FIG. 13) are provided in a cavity 1024 between the legs 1022 and below the housing 1002. The cavity 1024 has a height HC.

The dishwasher 1000 includes a wash arm 1014 that is arranged within the washing chamber 1018 above a sump 1015. The wash arm 1014 selectively delivers jets of washing fluid onto kitchenware placed within dishwasher 1000 in a manner known in the art. The pump 1004 (FIG. 13) is connected to the sump 1015. In operation, the pump 1004 creates a circulating flow of washing fluid within the washing chamber 1018 during a washing operation.

The dishwasher 1000 differs from the dishwasher 500 in that the dishwasher 1000 includes an insulation member 1040 with integrated utilities passages (e.g. water and electrical) capable of routing utilities through the insulation member 1040. The insulation member 1040 can be configured in a variety of ways, such as for example, different shapes, sizes, and materials used. Any configuration that may route utilities through the insulation member may be used. In some embodiments, the insulation member 1040 is multilayered similarly to the insulation members previously described (i.e. one or more dense or facing layers and one or more porous sound absorbing layers). In the exemplary embodiment illustrated in FIGS. 10 and 11, the insulation member 1040 is generally L-shaped having a first portion 1042 extending perpendicular to, or generally perpendicular to, a second portion 1044.

Figure 11:
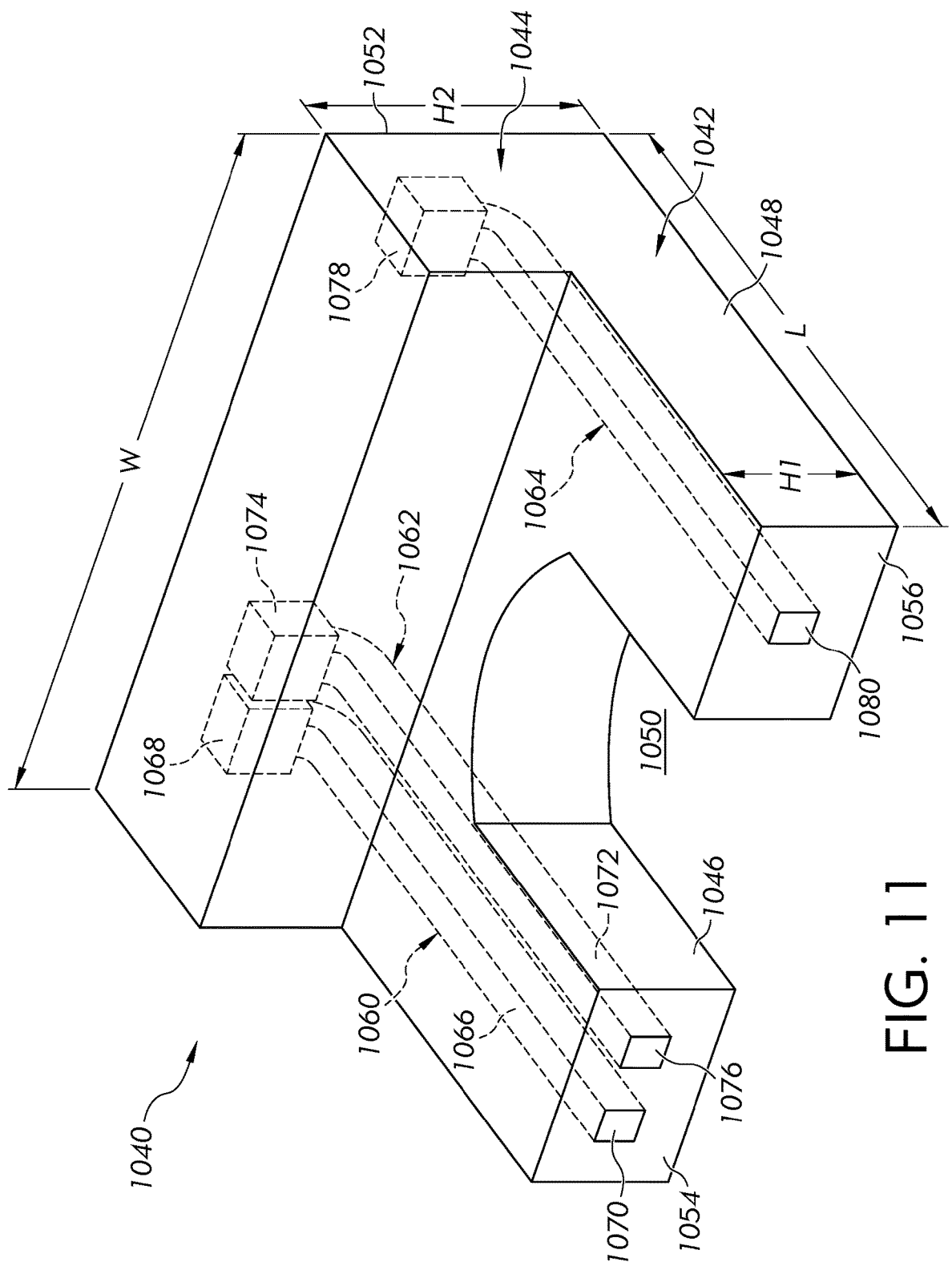
FIG. 11 is a perspective view of an exemplary embodiment of an insulation member with utility passages.

Referring to FIG. 11, the first portion 1042 includes a first leg 1046 and a second leg 1048 spaced apart from and extending parallel to, or generally parallel to, the first leg. The first leg 1046 is separated from the second leg 1048 by a recess 1050. The insulation member 1040 includes a rear surface 1052, the first leg 1046 includes a first front surface 1054, and the second leg 1048 includes a second front surface 1056. The insulation member has a length L, a width W, the first portion has a height H1, and the second portion has a height H2 that is greater than the height H1.

The insulation member 1040 also includes a first utility passage 1060, a second utility passage 1062, and a third utility passage 1064. The number of utility passages may vary in different embodiments of the insulation member 1040. The utility passages may be configured in a variety of ways. For example, in some embodiments, the utility passages may include fluid conduits suitable for fluid flow through the conduit. The fluid conduits can connect to other fluid conduits, such as for example, a water line or hose, to allow fluid from another fluid conduit to flow into the fluid conduit of the utility passage, or vice versa, and be directed to another location. In some embodiments, the utility passages may also include an electrical wire or wires that can connect to a source of electricity, such as another electrical wire or a power source, to allow electricity from the source of electricity to flow through the electrical wiring and be directed to another location. In some embodiments, the utility passages may be a bore or an enclosed or open channel extending through the insulation member. The bore or channel may be configured to receive a utility line, such as for example, a fluid conduit or electrical wiring, to allow the utility line to extend through the insulation member.

The insulation member 1040 can be made from a wide variety of different materials. Examples of suitable materials include, but are not limited to, a non-woven synthetic material, a non-woven natural material and mixtures thereof. The material may include thermoplastic fiber material, thermosetting fiber material, bi-component fiber material and mixtures thereof. Various polymers can be included in the insulation member 1040, such as for example, material or materials selected from a group consisting of polyolefin, polypropylene, polyethylene, polyester, nylon, rayon, polyethylene terephthalate, polybutylene terephthalate, cotton, kenaf, silk, cellulose, hemp, shoddy, fiberglass, and mixtures thereof. In one exemplary embodiment, the insulation member 1040 can include the same material used for the porous, sound absorbing layer 20 of the insulation members 16, 18 of FIGS. 1-2 In one exemplary embodiment, the insulation member 1040 is made from a fine fiber PET material, such as a 2 denier fiber size PET material.

In the exemplary embodiment of FIGS. 10 and 11, the first utility passage 1060 includes a first fluid conduit 1066 having an inlet 1068 at the rear surface 1052, and an outlet 1070 extending from the first front surface 1054 of the first leg 1046. In other embodiments, however, the inlet 1068 and the outlet 1070 may be reversed or may be located in surfaces other than the rear surface 1052 and first front surface 1054, respectively. The first utility passage 1060 may include a connection at the inlet 1068 capable of fluidly coupling to another fluid conduit, such as for example a water line or hose. For example, the connection may be a hose coupling or other suitable connector. The first fluid conduit 1066 may be a hose or pipe extending through the insulation member 1040 and may to used, for example, to route water to the dishwasher from a water source.

The second utility passage 1062 includes a second fluid conduit 1072 having an outlet 1074 at the rear surface 1052 and an inlet 1076 extending from the first front surface 1054 of the first leg 1046. In other embodiments, however, the outlet 1074 and the inlet 1076 may be reversed or may be located in surfaces other than the rear surface 1052 and first front surface 1054, respectively. The first utility passage 1062 may include a connection at the outlet 1074 capable of fluidly coupling to another fluid conduit, such as for example, a water line or hose. For example, the connection may be a hose coupling or other suitable connector. The second fluid conduit 1072 may be a hose or pipe extending through the insulation member 1040 and may to used, for example, to route water from the dishwasher to a drain.

The third utility passage 1064 includes an electrical conductor, such as for example electrical wiring, having an electrical connection 1078 at the rear surface 1052 and an electrical lead 1080 at or extending from the second front surface 1056 of the second leg 1048. The electrical connection 1078 may be configured in any suitable manner to electrically couple to an electrical source. The third utility passage 1064 may be used, for example, to route electrical power to the dishwasher 1000.

Figure 12:
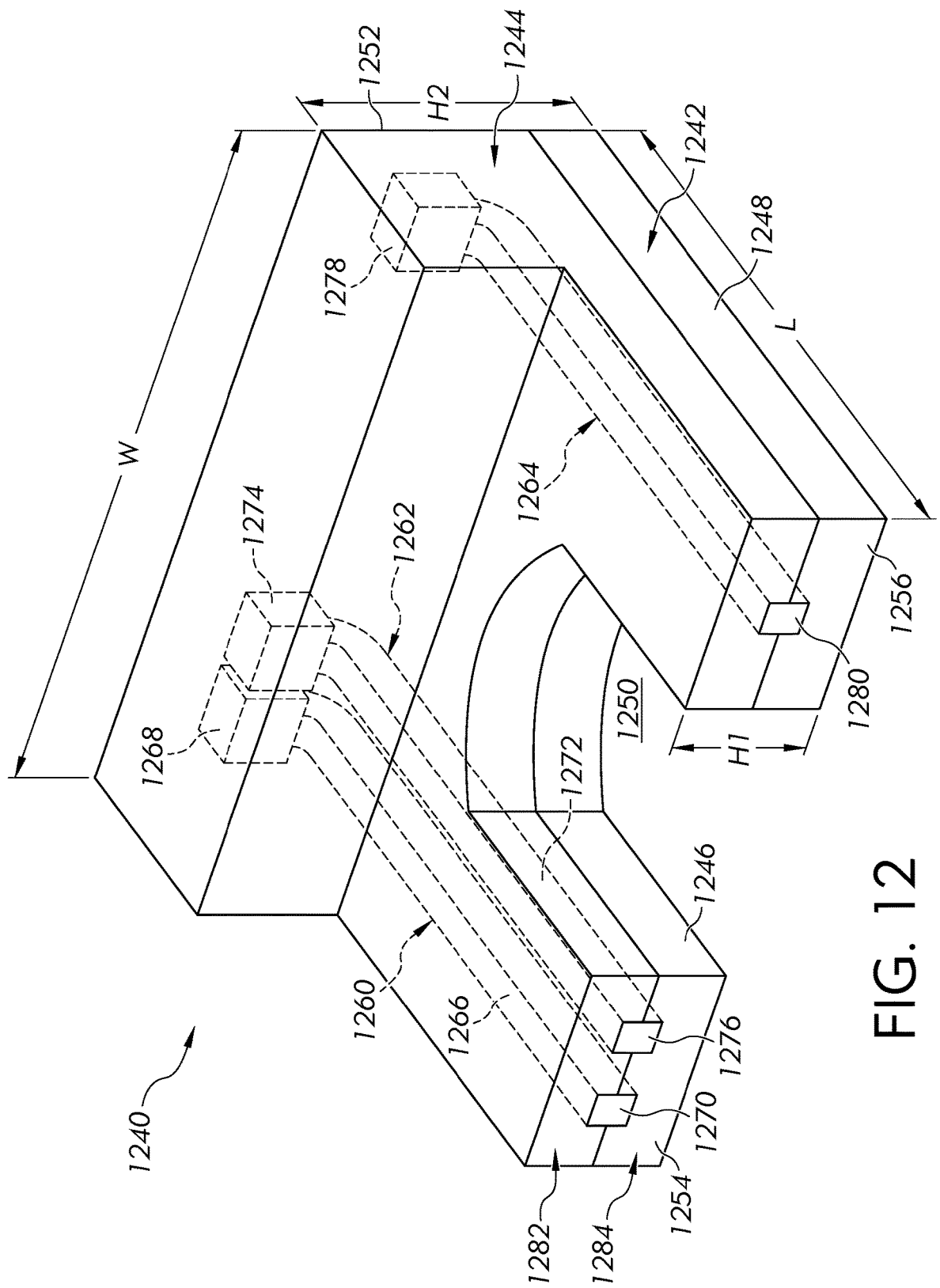
FIG. 12 is a perspective view of an exemplary embodiment of an insulation member with utility passages.

FIG. 12 illustrates another exemplary embodiment of an insulation member 1240 with integrated utilities passages (e.g. water and electrical). The insulation member 1240 is similar to the insulation member 1040 of FIGS. 10 and 11 in that the insulation member 1240 includes a first portion 1242 extending perpendicular to, or generally perpendicular to, a second portion 1244. The first portion 1242 includes a first leg 1246 and a second leg 1248 spaced apart from and extending parallel to, or generally parallel to, the first leg. The first leg 1246 is separated from the second leg 1248 by a recess 1250. The insulation member 1240 includes a rear surface 1252, the first leg 1246 includes a first front surface 1254, and the second leg 1248 includes a second front surface 1256. The insulation member 1240 has a length L, a width W, the first portion 1242 has a height H1, and the second portion 1244 has a height H2 that is greater than the height H1. In the exemplary embodiment, the height H1 is less than the height HC of the cavity 1024 (FIG. 10) such that the first portion 1242 may fit within the cavity.

The insulation member 1240 also includes a first utility passage 1260 and a second utility passage 1262 extending from the rear surface 1252 to the first front surface 1254, and a third utility passage 1264 extending from the rear surface 1252 to the second front surface 1256. The first utility passage 1260 includes a fluid conduit 1266 having an inlet 1268 at the rear surface 1252 and an outlet 1270 extending from the first front surface 1254 of the first leg 1246. The second utility passage 1262 includes a fluid conduit 1072 having an outlet 1274 at the rear surface 1252 and an inlet 1276 extending from the first front surface 1054 of the first leg 1246. The third utility passage 1264 includes an electrical line, such as for example electrical wiring, having an electrical connection 1278 at the rear surface 1252 and an electrical lead 1280 at or extending from the second front surface 1256 of the second leg 1248. In other embodiments, however, the inlet, the outlet, and the connections for each of the utility passages may be reversed or may be located in surfaces other than the rear surface and the first front surface.

The insulation member 1240, however, differs from the insulation member 1040 in that the insulation member 1240 is separated along its length L into a top portion 1282 and a bottom portion 1284.

The top portion 1282 and the bottom portion 1284 may be separate, unconnected portions or may be connected but separable, such as for example, connected by a hinge (not shown) in a clamshell arrangement. In the illustrated embodiment of FIG. 12, the top portion 1282 and the bottom portion 1284 bisect the first portion 1242 such that the height of the top portion 1282 in the first portion 1242 is ½H1 and the height of the bottom portion 1284 in the first portion 1242 is ½H1. In other embodiment, however, the top portion 1282 and the bottom portion 1284 may each have a height that is greater than or less than ½H1.

The interface between the top portion 1282 and the bottom portion 1284 intersects at least one of the utility passages 1260, 1262, 1264. In the illustrated embodiment of FIG. 12, the interface between the top portion 1282 and the bottom portion 1284 intersects all of the utility passages 1260, 1262, 1264 such that separating the top portion from the bottom portion grants access to the length of the utility passages 1260, 1262, 1264.

FIGS. 13-17 illustrate an exemplary acoustically insulated machine assembly 1300 including the dishwasher 1000, the insulation member 1040, and a cabinet or wall space 1301. The cabinet or wall space 1301 includes a rear wall 1302, a first side wall 1304, and a second sidewall 1306 that form a recess 1308 for receiving the dishwasher 1000. Extending from the cabinet or wall space 1301 are one or more utility lines. In the illustrated embodiment, a water supply line 1310, a water drain line 1312, and an electrical supply line 1314 extend from the cabinet or wall space 1301. In other embodiments, however, any number of utility lines may be associated with the acoustically insulated machine assembly 1300.

The dishwasher 1000 includes a water inlet 1320, a water outlet 1322, and an electrical power connection 1324. The water inlet 1320, the water outlet 1322, and the electrical power connection 1324 may be accessible from the cavity 1024 located between the legs 1022 and below the housing 1004 (FIG. 10).

Figure 13:
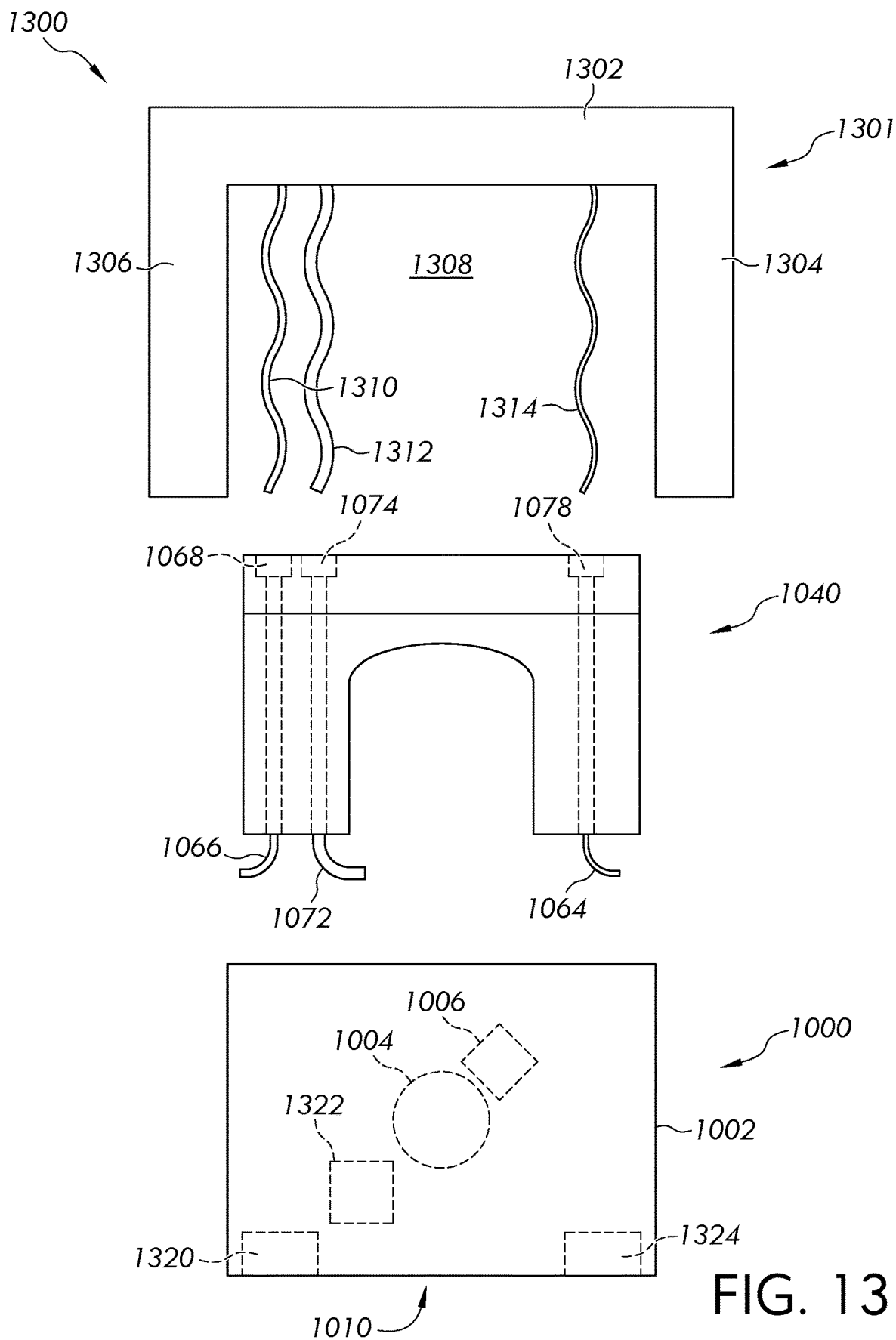
FIG. 13 is a top view of an exemplary embodiment of an acoustically insulated machine assembly in an unconnected state.
Figure 14:
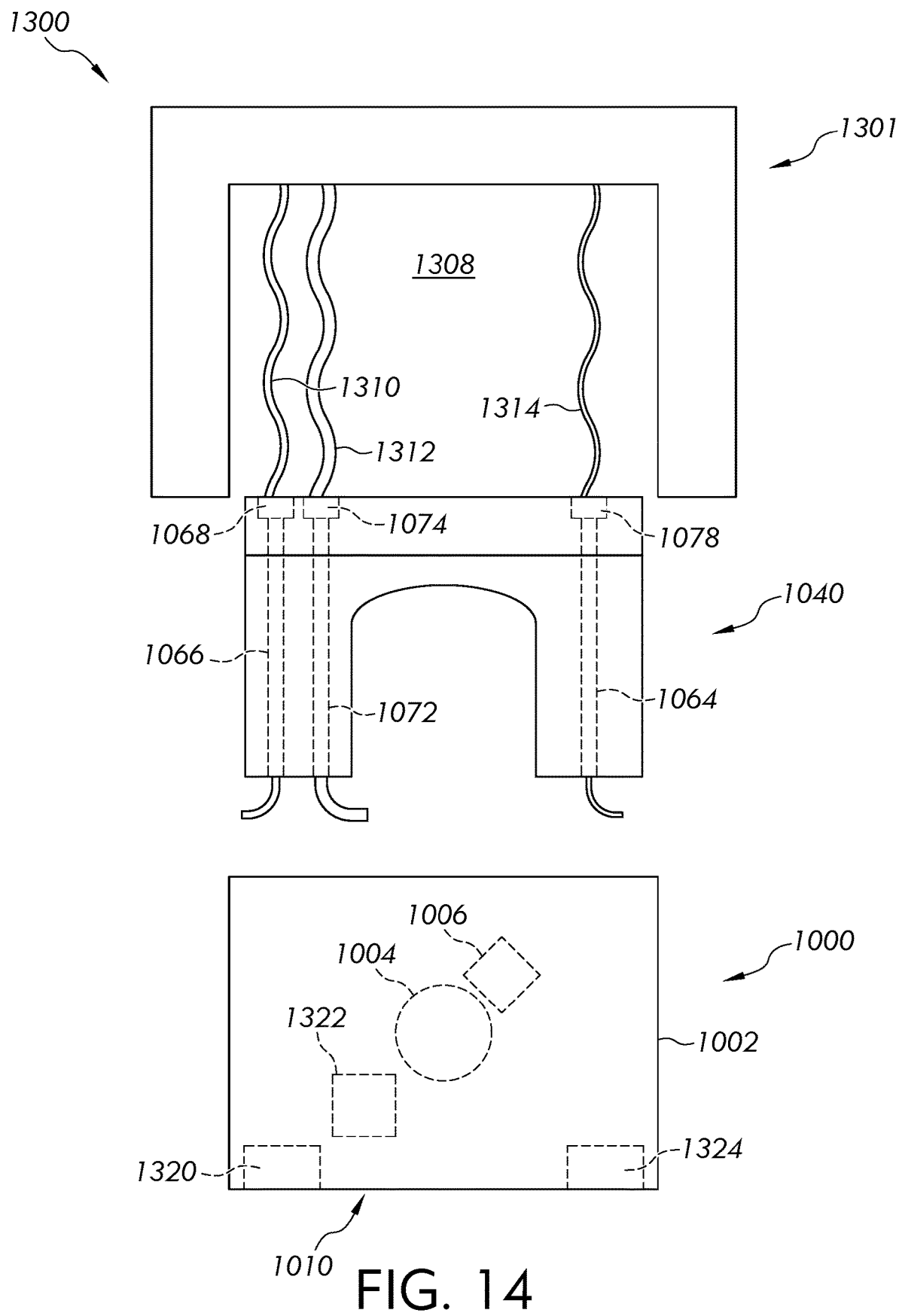
FIG. 14 is a top view of the acoustically insulated machine assembly of FIG. 13 in a partially connected state.

Referring to FIGS. 13 and 14, an exemplary assembly process for the dishwasher assembly 1300 may begin with the insulation member 1040 being connected to the one or more utility lines. In particular, the water supply line 1310 is fluidly coupled to the inlet 1068, the water drain line 1312 is fluidly coupled to the outlet 1074, and the electrical supply line 1314 is electrically connected to the electrical connection 1078 at the rear surface 1052 of the insulation member 1040. Thus, water exiting the water supply line 1310 may enter the first fluid conduit 1066 through the inlet 1068, water exiting the second fluid conduit 1072 may enter the water drain line 1312 through the outlet 1074, and electricity may be routed from the electrical supply line 1314 to the electrical conductor 1064 via the electrical connection 1078.

As shown in FIG. 15, once the water inlet 1320, the water outlet 1322, and the electrical power connection 1324 have been operatively coupled to the insulation member 1040, the insulation member 1040 may be positioned in the recess 1308 with the rear surface 1052 adjacent the rear wall 1302 and the first front surface 1054 and second front surface 1056 facing outward from the recess. In the exemplary embodiment, the first fluid conduit 1066 and the second fluid conduit 1072, and the electrical conductor 1064 extend outward from the first front surface 1054 and second front surface 1056, respectively, to facilitate being connected to the dishwasher 1000.

Figure 16:
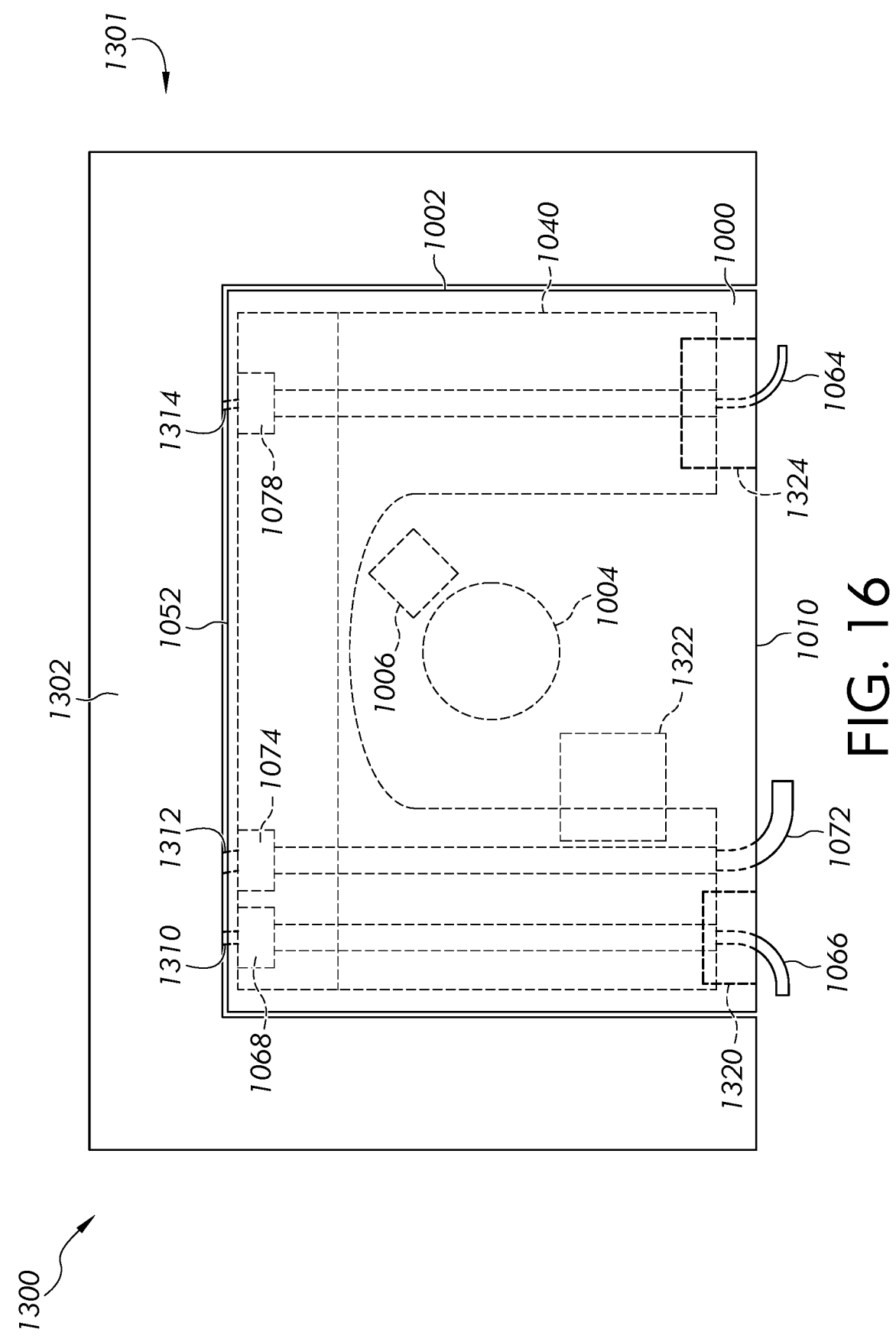
FIG. 16 is a top view of the acoustically insulated machine assembly of FIG. 13 in a partially connected state.
Figure 17:
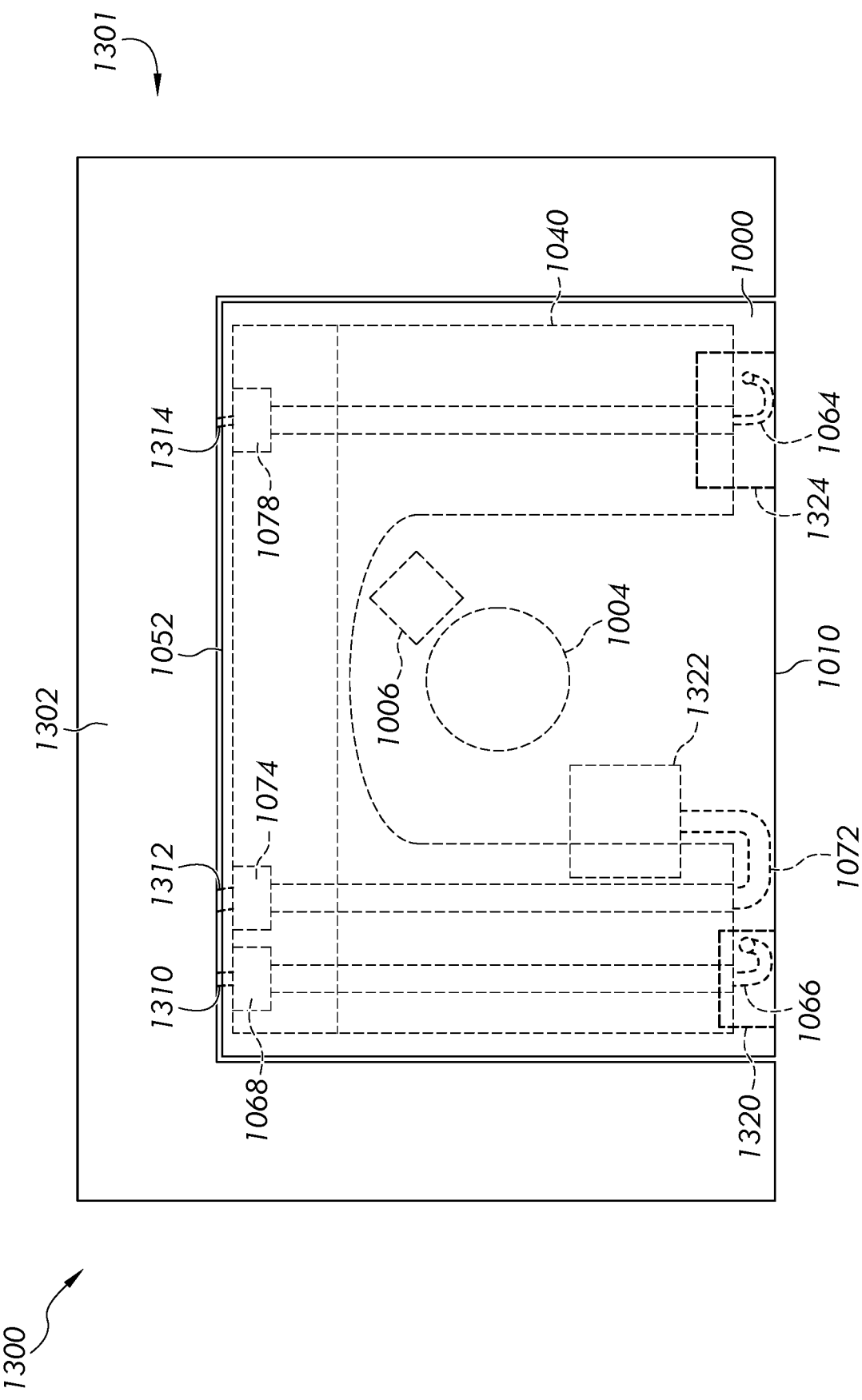
FIG. 17 is a top view of the acoustically insulated machine assembly of FIG. 13 in a connected state.

As shown in FIGS. 16 an 17, once the insulation member 1040 is positioned within the recess 1308, the dishwasher 1000 may be positioned in the recess over top of the insulation member 1040 such that the insulation member is positioned in the cavity 1024 between the legs 1022 and below the housing 1002 (FIG. 10). In this position, the first front surface 1054 and second front surface 1056 are near or adjacent the front side 1010 of the housing 1002 and the one or more insulation members 1016, when installed.

Likewise, in this position, the pump 1004 and the motor 1006 can be received in the recess 1050 between the first leg 1046 and the second leg 1048. The second portion 1044 of the insulation member 1040 may extend upward along or adjacent a portion of the back surface 1052 of the dishwasher 1000. The first fluid conduit 1066 may then be connected to the water inlet 1320, the second fluid conduit 1072 may be connected to the water outlet 1322, and the electrical conductor 1064 may be connected to the electrical power connection 1324 on the dishwasher 1000.

When installed as described, the insulation member 1040 cooperates with the one or more insulation members 1016 to fully, or at least partially, encircle the pump 1004 and the motor 1006. Thus, the insulation member 1040, along with the one or more insulation members 1016, provides effective sound absorption and provides a convenient way to route and connect utilities, such as water and electricity, to the dishwasher 1000.

Figure 18:
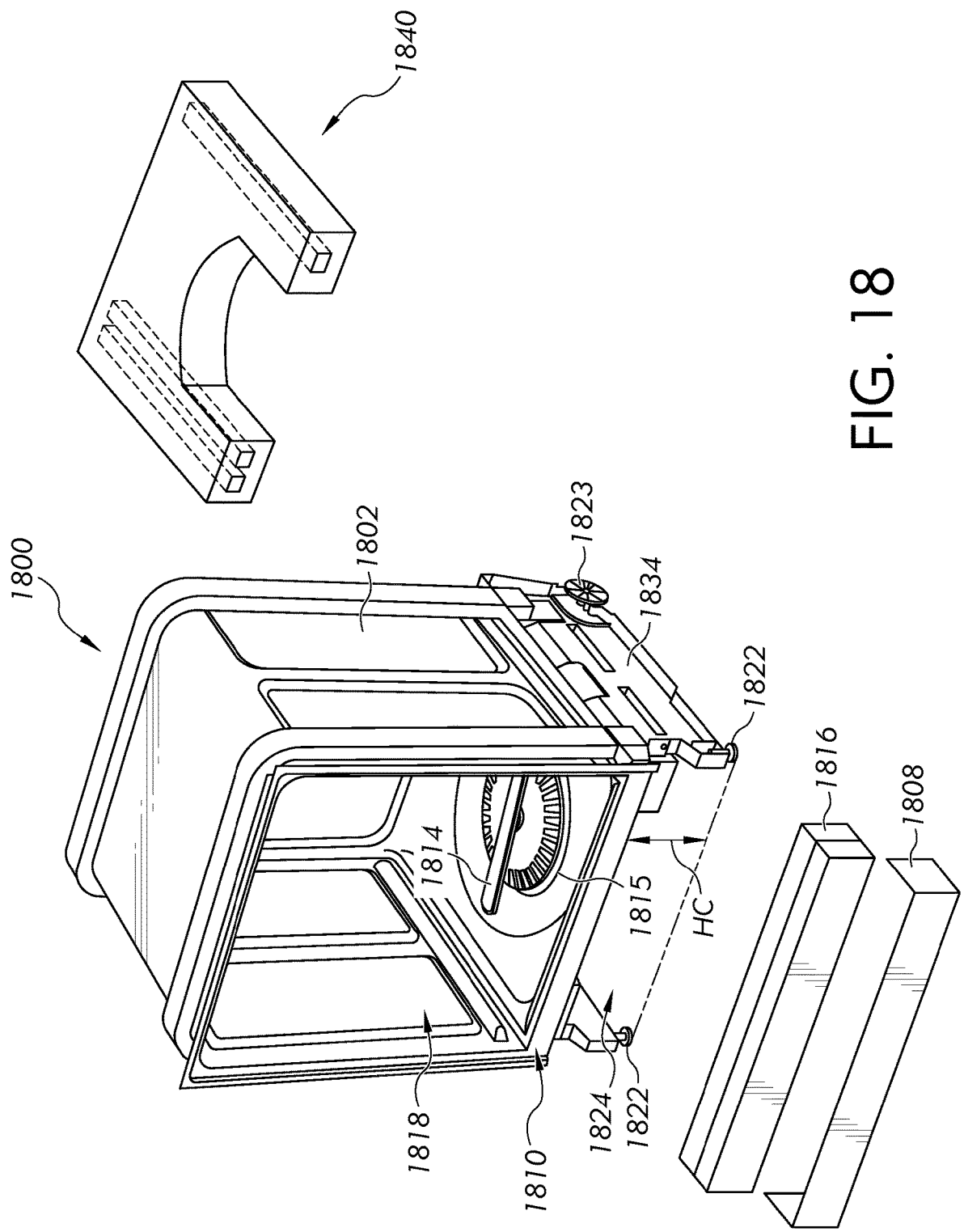
FIG. 18 is a perspective view of an exemplary embodiment of an acoustically insulated dishwasher.

Referring to FIG. 18, an exemplary embodiment of an acoustically insulated machine is an acoustically insulated dishwasher 1800. The acoustically insulated dishwasher 1800 illustrated by FIG. 18 is similar to the dishwasher 1000 of FIG. 10 in that the dishwasher includes a housing 1802, a pump 1804 and a drive motor 1806 (See FIG. 22), a plate 1808 closing a front side 1810 of the housing, a washing chamber 1818, and one or more insulation members 1816.

The dishwasher 1800 includes a base portion 1834 that is provided with a plurality of legs 1822 and/or wheels 1823 that support the housing 1802. The wheels 1823 enable an installer to easily position the dishwasher 1800 and the legs 1822 enable the installer to accurately position/level the dishwasher. The pump 1804 and drive motor 1806 (FIG. 22) are provided in a cavity 1824 between the legs 1822 and below the housing 1802. The cavity 1824 has a height HC.

The dishwasher 1800 includes a wash arm 1814 that is arranged within the washing chamber 1818 above a sump 1815. The wash arm 1814 selectively delivers jets of washing fluid onto kitchenware placed within dishwasher 1800 in a manner known in the art. The pump 1804 (FIG. 22) is connected to the sump 1815. In operation, the pump 1804 creates a circulating flow of washing fluid within the washing chamber 1818 during a washing operation.

The dishwasher 1800 also includes an insulation member 1840 with integrated utilities passages (e.g. water and electrical) that is similar to the insulation member 1040 of FIG. 10. The insulation member 1840, however, differs from the insulation member 1040 in that the insulation member 1840 is not generally L-shaped (i.e. does not include a first portion extending perpendicular to, or generally perpendicular to, a second portion). In addition, the insulation member 1840 includes an enclosed channel extending through the insulation member to receive and allow a utility line to be received in the channel and to extend through the insulation member.

Figure 19:
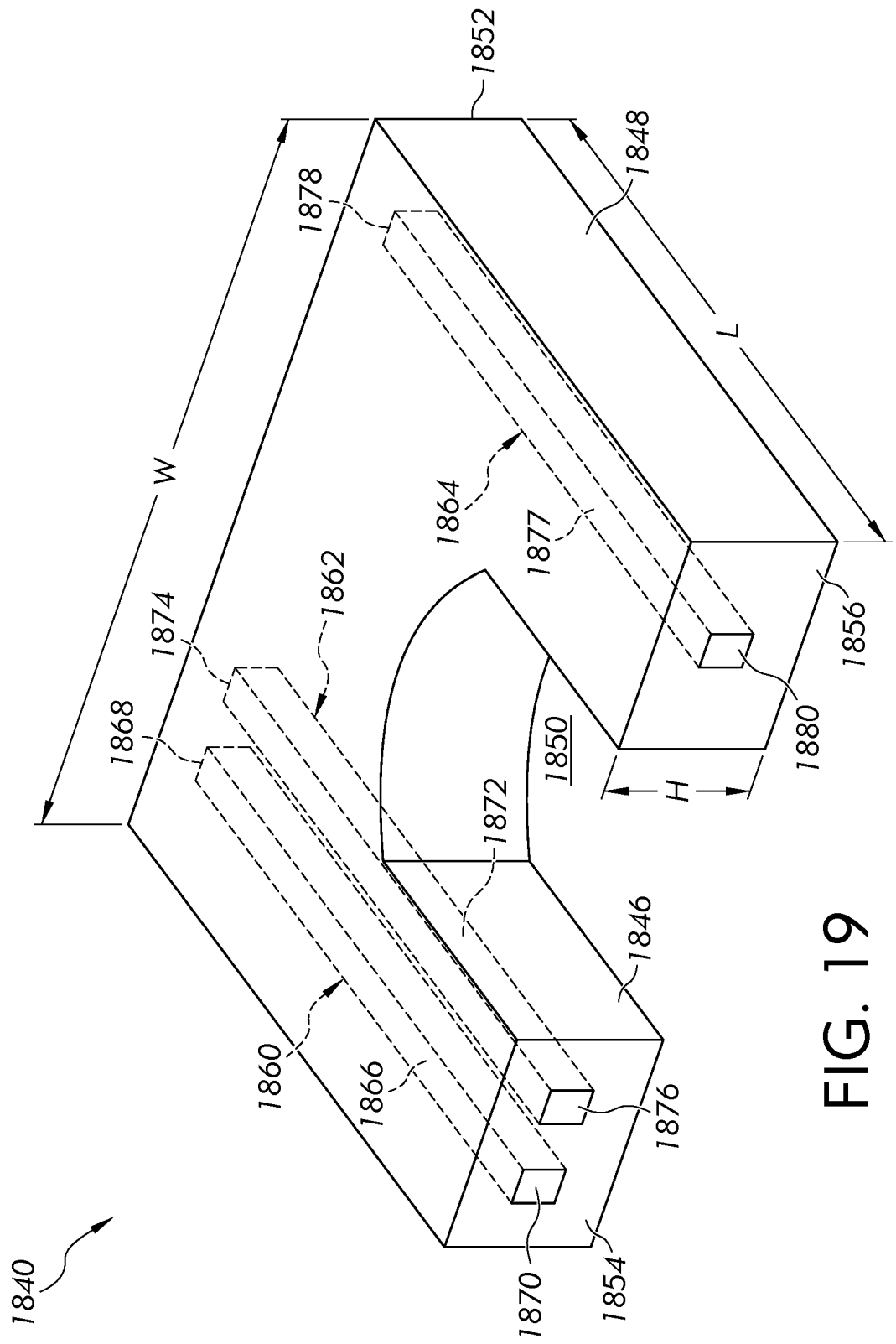
FIG. 19 is a perspective view of an exemplary embodiment of an insulation member with utility passages.

Referring to FIG. 19, the insulation member 1840 is generally planar and includes a first leg 1846 and a second leg 1848 spaced apart from and extending parallel to, or generally parallel to, the first leg. The first leg 1846 is separated from the second leg 1848 by a recess 1850. The insulation member 1840 includes a rear surface 1852, the first leg 1846 includes a first front surface 1854, and the second leg 1848 includes a second front surface 1856. The insulation member 1840 has a length L, a width W, and a height H. The height H can be less that the height HC of the cavity 1820 to allow the insulation member to fit within the cavity.

The insulation member 1840 also includes a first utility passage 1860, a second utility passage 1862, and a third utility passage 1864. The number of utility passages may vary in different embodiments of the insulation member 1840. The utility passages may be configured in a variety of ways. For example, in some embodiments, the utility passages may include fluid conduits that can connect to other fluid conduits, such as for example, a water line or hose, to allow fluid from the hose to flow into the fluid conduit, or vice versa, and be directed to another location. The utility passages may also include an electrical wire or wires that can connect to a source of electricity, such as another electrical wire or a power source, to allow electricity from the source of electricity to flow through the electrical wiring and be directed to another location. The utility passages may also include a bore or channel extending through the insulation member. The bore or channel may be configured to allow a utility line, such as for example, a fluid conduit or electrical wiring, to extend through the passage.

Figure 20:
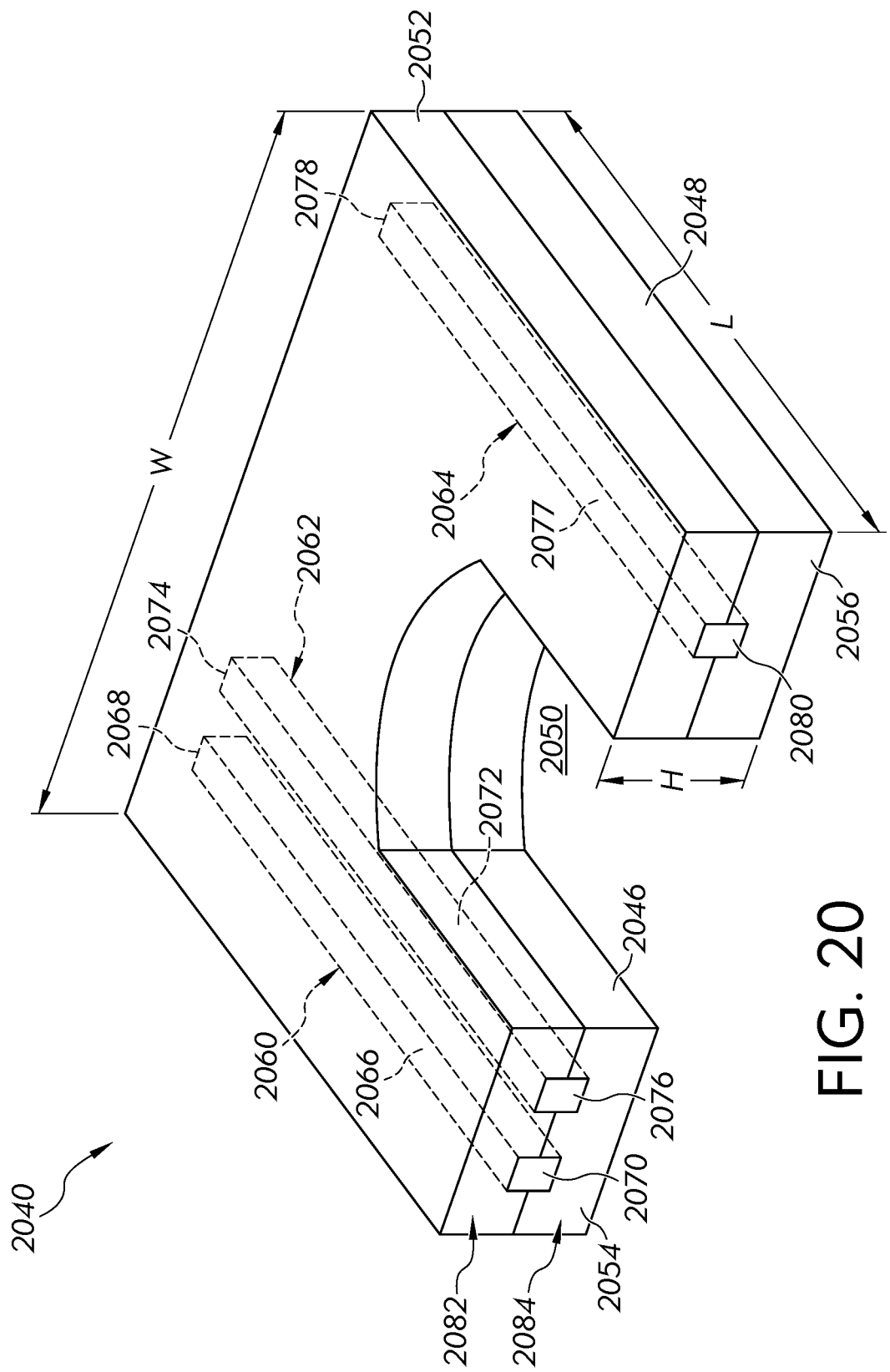
FIG. 20 is a perspective view of an exemplary embodiment of an insulation member with utility passages.

In the exemplary embodiment of FIGS. 19 and 20, the first utility passage 1860 includes an enclosed channel 1866 having an inlet 1868 at the rear surface 1852, and an outlet 1870 extending from the first front surface 1854 of the first leg 1846. In other embodiments, however, the inlet 1868 and the outlet 1870 may be reversed or may be located in surfaces other than the rear surface 1852 and the first front surface 1854, respectively.

The second utility passage 1862 includes an enclosed channel 1872 having an outlet 1874 at the rear surface 1852, and an inlet 1876 extending from the first front surface 1854 of the first leg 1846. In other embodiments, however, the outlet 1874 and the inlet 1876 may be reversed or may be located in surfaces other than the rear surface 1852 and the first front surface 1854, respectively.

The third utility passage 1864 includes an enclosed channel 1877 having an inlet 1878 at the rear surface 1852 and an outlet 1880 at the second front surface 1856 of the second leg 1848. In other embodiments, however, the inlet 1878 and the outlet 1880 may be reversed or may be located in surfaces other than the rear surface 1852 and the second front surface 1856, respectively.

FIG. 20 illustrates another exemplary embodiment of an insulation member 2040 with integrated utilities passages (e.g. water and electrical). The insulation member 2040 is similar to the insulation member 1840 of FIG. 19 in that the insulation member 2040 is planar, or generally planer, and includes a first leg 2046 and a second leg 2048 spaced apart from and extending parallel to, or generally parallel to, the first leg. The first leg 2046 is separated from the second leg 2048 by a recess 2050. The insulation member 2040 includes a rear surface 2052, the first leg 2046 includes a first front surface 2054, and the second leg 2048 includes a second front surface 2056. The insulation member 2040 has a length L, a width W, and has a height H.

The insulation member 2040 also includes a first utility passage 2060 and a second utility passage 2062 extending from the rear surface 2052 to the first front surface 2054, and a third utility passage 2064 extending from the rear surface 2052 to the second front surface 2056. The first utility passage 2060 includes an enclosed channel 2066 having an inlet 2068 at the rear surface 2052 and an outlet 2070 at the first front surface 2054 of the first leg 2046. The second utility passage 2062 includes an enclosed channel 2072 having an outlet 2074 at the rear surface 2052 and an inlet 2076 at the first front surface 2054 of the first leg 2046. The third utility passage 2064 includes an enclosed channel 2077 having an inlet 2078 at the rear surface 2052 and an outlet 2080 at the from second front surface 2056 of the second leg 2048.

The insulation member 2040, however, differs from the insulation member 1840 of FIG. 19 in that the insulation member 2040 is separated along its length L into a top portion 2082 and a bottom portion 2084, similar to the insulation member 1240 of FIG. 12. Thus, the top portion 2082 and the bottom portion 2084 may be separate, unconnected portions or may be connected but separable, such as for example, connected by a hinge (not shown) in a clamshell arrangement. The top portion 2082 and the bottom portion 2084 may bisect the insulation member 2040 such that the height of the top portion 2082 and the bottom portion 2084 is ½H. In other embodiment, however, the top portion 2082 and the bottom portion 2084 may each have a height that is greater than or less than ½H.

The interface between the top portion 2082 and the bottom portion 2084 intersects at least one of the utility passages 2060, 2062, 2064. In the illustrated embodiment of FIG. 20, the interface between the top portion 2082 and the bottom portion 2084 intersects all of the utility passages 2060, 2062, 2064 such that separating the top portion from the bottom portion grants access to the length of the enclosed channels 2066, 2072, 2077.

Figure 21:
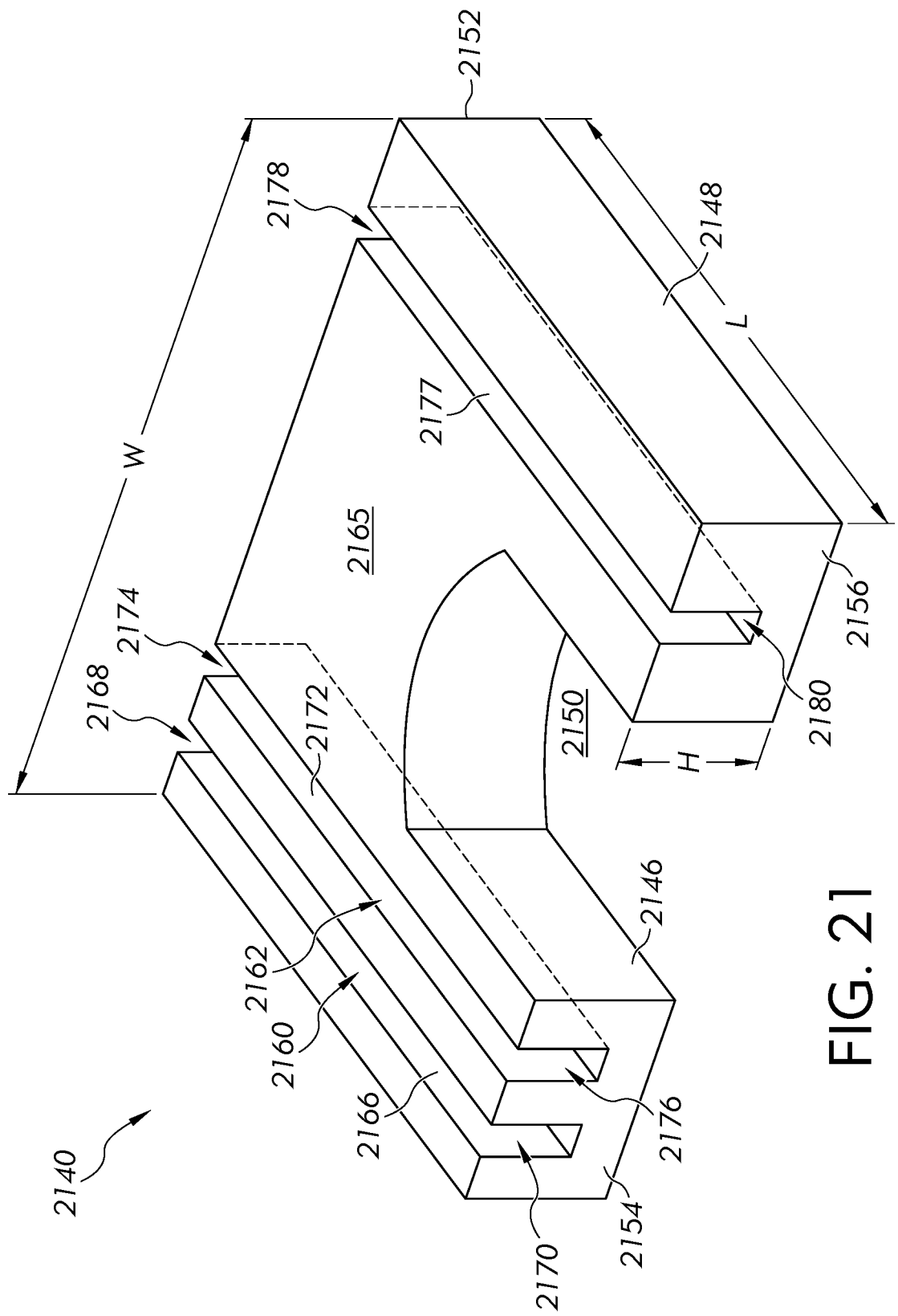
FIG. 21 is a perspective view of an exemplary embodiment of an insulation member with utility passages.

FIG. 21 illustrates another exemplary embodiment of an insulation member 2140 with integrated utilities passages (e.g. water and electrical). The insulation member 2140 is similar to the insulation member 1840 of FIG. 19 in that the insulation member 2140 is planar, or generally planer, and includes a first leg 2146 and a second leg 2148 spaced apart from and extending parallel to, or generally parallel to, the first leg. The first leg 2146 is separated from the second leg 2148 by a recess 2050. The insulation member 2140 includes a rear surface 2152, the first leg 2146 includes a first front surface 2154, and the second leg 2148 includes a second front surface 2156. The insulation member 2140 has a length L, a width W, and has a height H.

The insulation member 2140 also includes a first utility passage 2160 and a second utility passage 2162 extending from the rear surface 2152 to the first front surface 2154, and a third utility passage 2164 extending from the rear surface 2152 to the second front surface 2156.

The insulation member 2140, however, differs from the insulation member 1840 of FIG. 19 in that first utility passage 2160, the second utility passage 2162 and the third utility passage 2164 are configured as channels that are open along a top side 2165 of the insulation member 2140. In particular, the first utility passage 2160 includes an open channel 2166 having an inlet 2168 at the rear surface 2152 and an outlet 2170 at the first front surface 2154 of the first leg 2146. The second utility passage 2162 includes an open channel 2172 having an outlet 2174 at the rear surface 2152 and an inlet 2176 at the first front surface 2154 of the first leg 2146. The third utility passage 2164 includes an open channel 2177 having an inlet 2178 at the rear surface 2152 and an outlet 2180 at the from second front surface 2156 of the second leg 2148.

Figure 22:
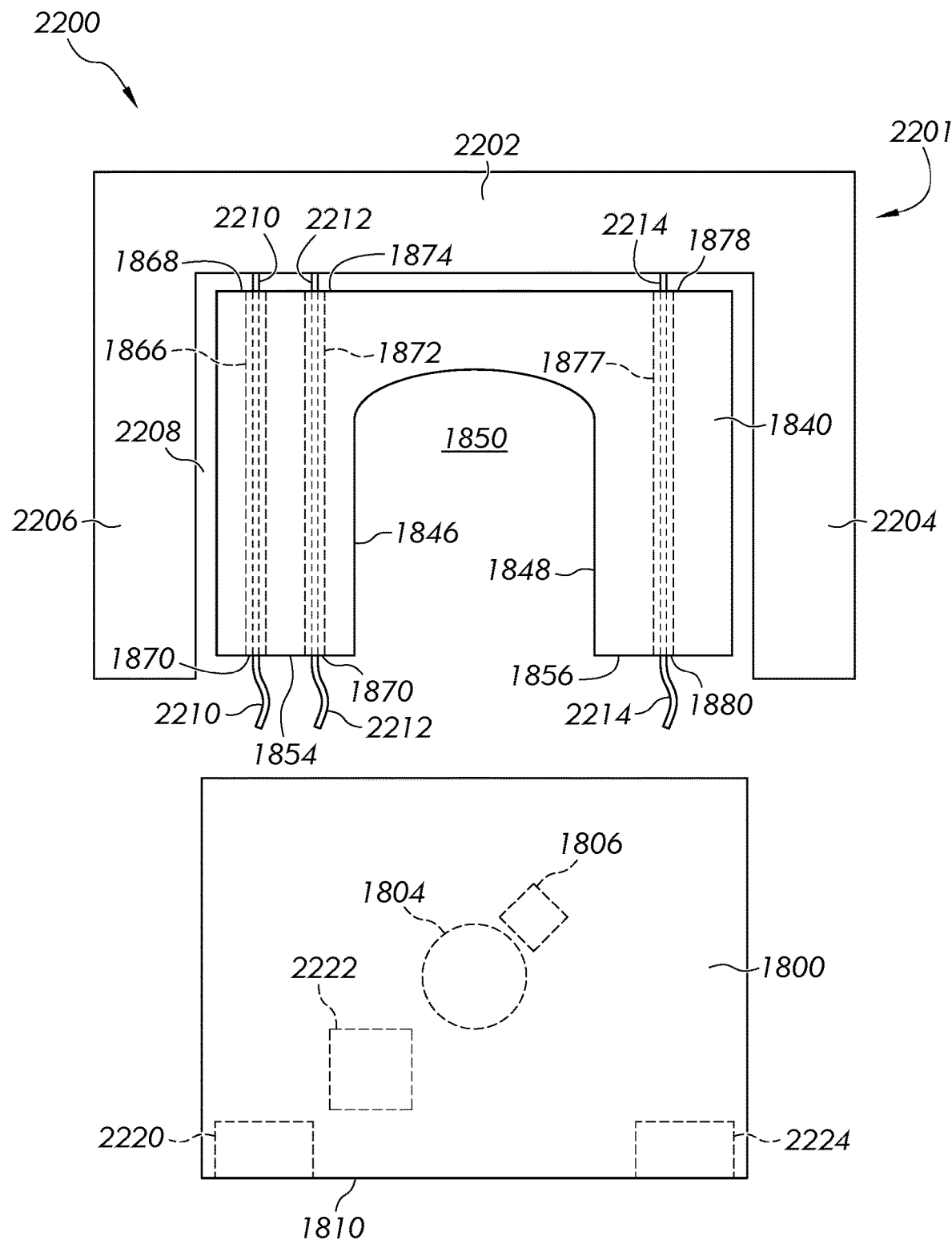
FIG. 22 is a top view of an exemplary embodiment of an acoustically insulated machine assembly in a partially connected state.
Figure 23:
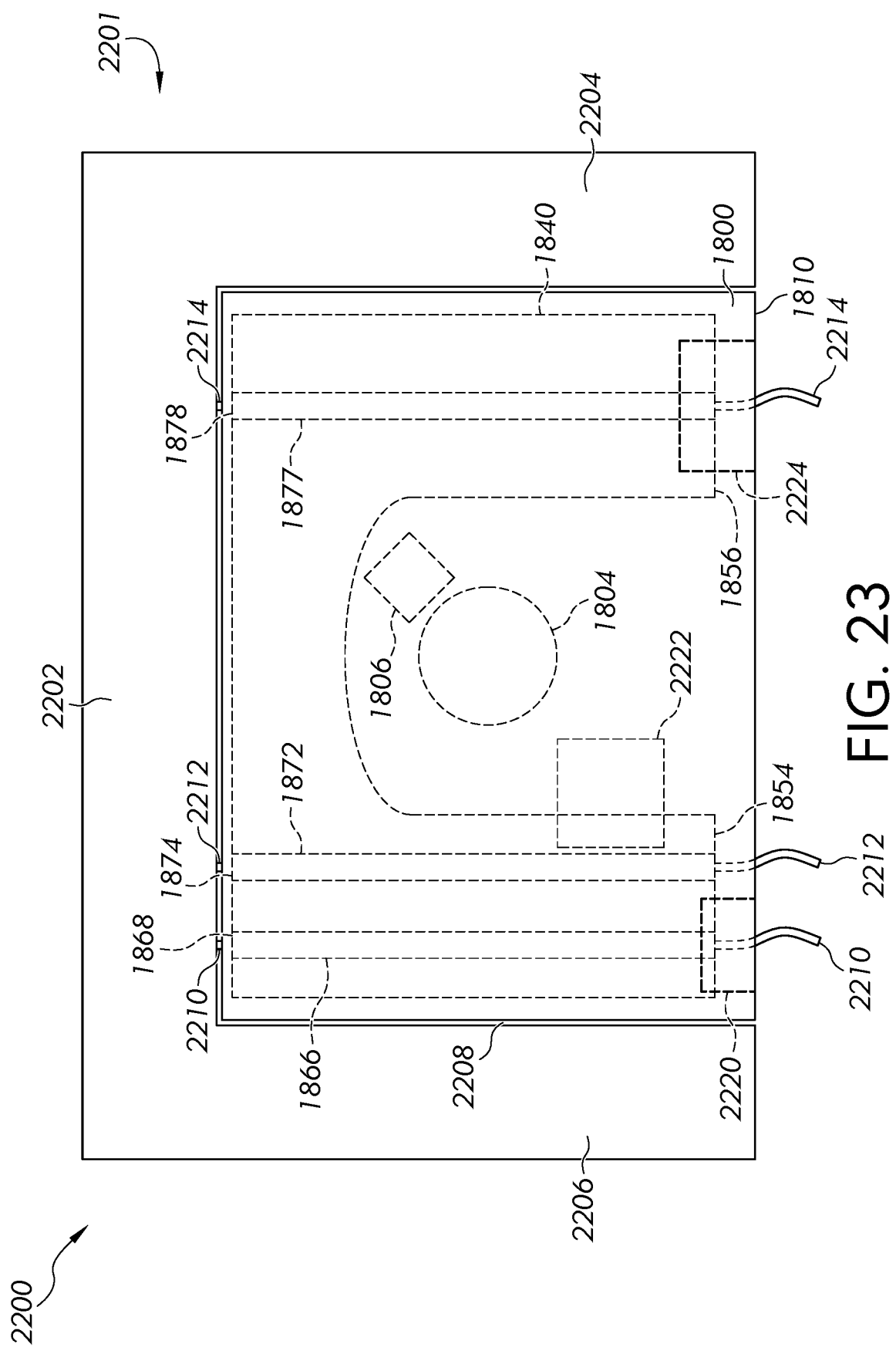
FIG. 23 is a top view of the acoustically insulated machine assembly of FIG. 22 in a partially connected state.
Figure 24:
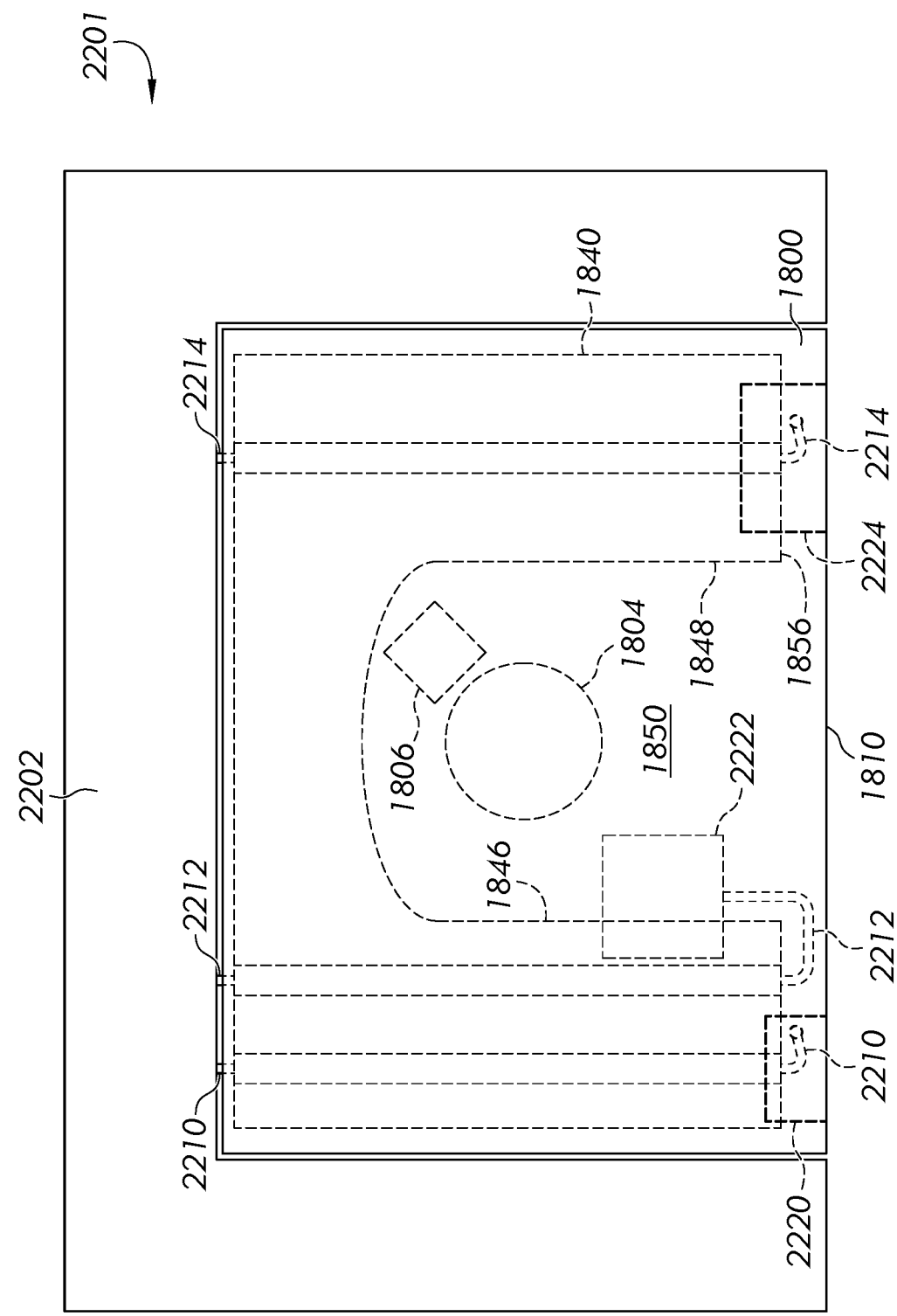
FIG. 24 is a top view of the acoustically insulated machine assembly of FIG. 22 in a connected state.

FIGS. 22-24 illustrate an exemplary acoustically insulated machine assembly 2200 including the dishwasher 1800, the insulation member 1840, and a cabinet or wall space 2201. The cabinet or wall space 2201 includes a rear wall 2202, a first side wall 2204, and a second sidewall 2206 that form a recess 2208 for receiving the dishwasher 1800. Extending from the cabinet or wall space 2201 are one or more utility lines. In the illustrated embodiment, a water supply line 2210, a water drain line 2212, and an electrical supply line 2214 extend from the cabinet or wall space 2201. In other embodiments, however, any number of utility lines may be associated with the acoustically insulated machine assembly 2200.

The dishwasher 1800 includes a water inlet 2220, a water outlet 2222, and an electrical power connection 2224. The water inlet 2220, the water outlet 2222, and the electrical power connection 2224 may be accessible from the cavity 1824 located between the legs 1822 and below the housing 1804 (FIG. 18).

Referring to FIG. 22, an exemplary assembly process for the dishwasher assembly 2200 may begin with the insulation member 1840 being positioned in the recess 2208. As the insulation member 1840 is positioned in the recess 2208, the utility lines may be received through the utility passages. In particular, the water supply line 2210 may received through the inlet 1868, extend through the first enclosed passage 1866, and extend out of the outlet 1870. The water drain line 2212 may be received by the outlet 1874, extend through the second enclosed passage 1872, and extend out of the inlet 1876. The electrical supply line 2214 may be received by the inlet 1878, extend through the third enclosed passage 1877, and extend out of the outlet 1880.

If the exemplary insulation member 2040 of FIG. 20 is used in dishwasher assembly 2200 in place of insulation member 1840, the top portion 2082 may be separated from the bottom portion 2084 providing access to the first utility passage 2060, the second utility passage 2062, and the third utility passage 2064 along the entire length of the passages. Thus, the water supply line 2210, water drain line 2212, the electrical supply line 2214 may be laid into the exposed channels, respectively, rather than fed through the passages via the inlets or outlets.

Likewise, if the exemplary insulation member 2140 of FIG. 21 is used in dishwasher assembly 2200 in place of insulation member 1840, the water supply line 2210, water drain line 2212, the electrical supply line 2214 may be laid into the open channels 2166, 2172, 2177, respectively, rather than feed through the passages via the inlets or outlets.

As shown in FIGS. 23 and 24, once the insulation member 1840 is positioned within the recess 2208, the dishwasher 1800 may be positioned in the recess over top of the insulation member 1840 such that the insulation member is positioned in the cavity 1824 between the legs 1822 and below the housing 1802 (FIG. 10). In this position, the first front surface 1854 and second front surface 1856 are near or adjacent the front side 1810 of the housing 1802 and the one or more insulation members 1816, when installed.

Likewise, in this position, the pump 1804 and the motor 1806 can be received in the recess 1850 between the first leg 1846 and the second leg 1848. The water supply line 2210 may then be connected to the water inlet 2220, the water drain line 2212 may be connected to the water outlet 2222, and the electrical supply line 2214 may be connected to the electrical power connection 2224 on the dishwasher 1800.

Figure 25:
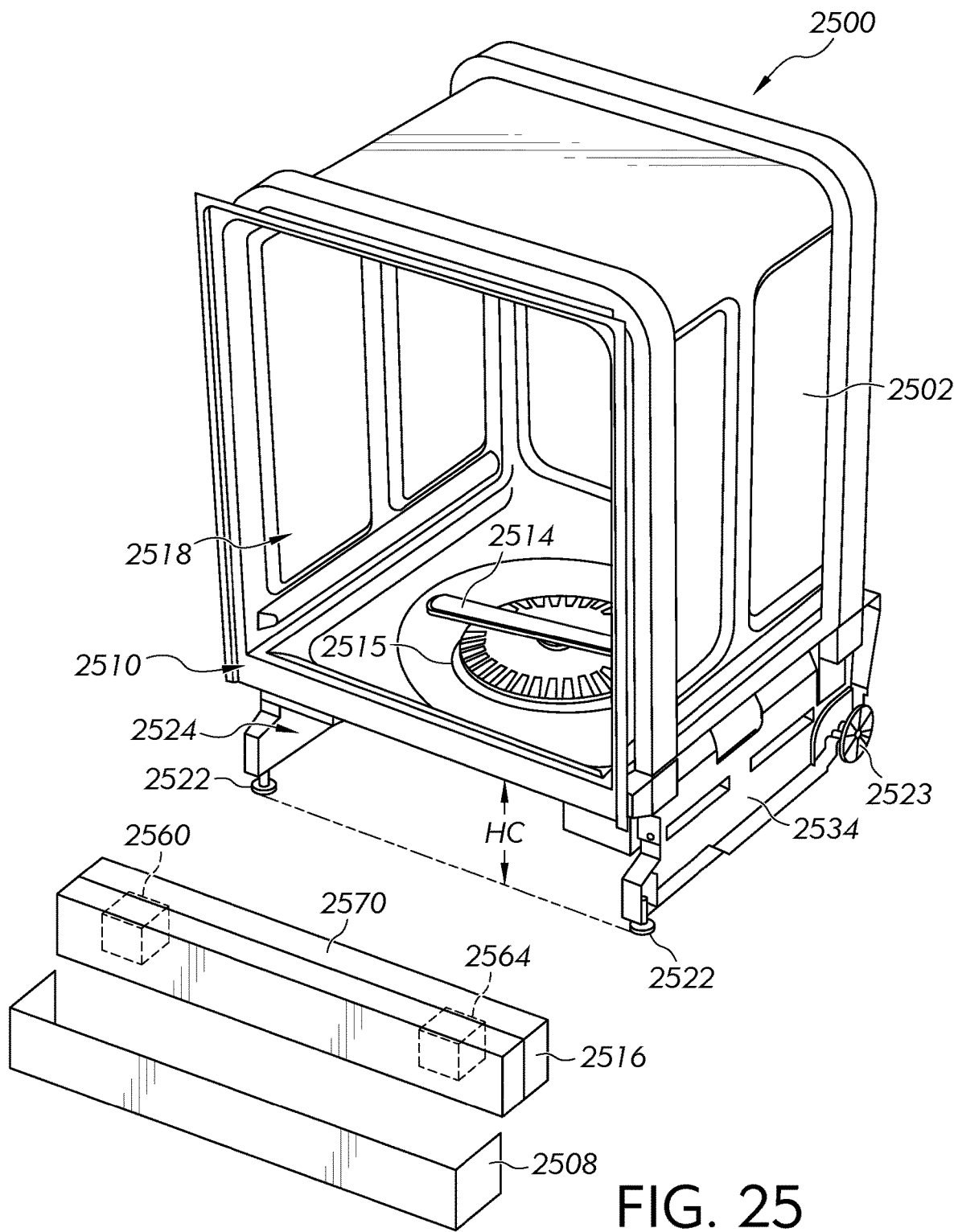
FIG. 25 is a perspective view of an exemplary embodiment of an acoustically insulated dishwasher.

Referring to FIG. 25, an exemplary embodiment of an acoustically insulated machine is an acoustically insulated dishwasher 2500. The acoustically insulated dishwasher 2500 illustrated by FIG. 25 is similar to the dishwasher 1800 of FIG. 18 in that the dishwasher 2500 includes a housing 2502, a pump 2504 and a drive motor 2506 (See FIG. 26), a plate 2508 closing a front side 2510 of the housing, and a washing chamber 2518.

The dishwasher 2500 includes a base portion 2534 that is provided with a plurality of legs 2522 and/or wheels 2523 that support the housing 2502. The wheels 2523 enable an installer to easily position the dishwasher 2500 and the legs 2522 enable the installer to accurately position/level the dishwasher. The pump 2504 and drive motor 2506 (FIG. 26) are provided in a cavity 2524 between the legs 2522 and below the housing 2502. The cavity 2524 has a height HC.

The dishwasher 2500 includes a wash arm 2514 that is arranged within the washing chamber 2518 above a sump 2515. The wash arm 2514 selectively delivers jets of washing fluid onto kitchenware placed within dishwasher 1800 in a manner known in the art. The pump 2504 (FIG. 26) is connected to the sump 2515. In operation, the pump 2504 creates a circulating flow of washing fluid within the washing chamber 2518 during a washing operation.

The dishwasher 2500 also includes one or more insulation members 2516 that is similar to the one or more insulation members 1816 of FIG. 18. The insulation members 2516, however, differ from the insulation members 1816 in that the insulation members 2516 include integrated utilities passages (e.g. water and electrical).

The insulation member 2540 includes a first utility passage 2560 and a second utility passage 2564. The number of utility passages may vary in different embodiments of the insulation member 2540. The utility passages may be configured in a variety of ways. For example, in some embodiments, the utility passages may include fluid conduits that can connect to other fluid conduits, such as for example, a hose, to allow fluid from the hose to flow into the fluid conduit, or vice versa, and be directed to another location. The utility passages may also include an electrical wire or wires that can connect to a source of electricity, such as another electrical wire or a power source, to allow electricity from the source of electricity to flow through the electrical wiring and be directed to another location. The utility passages may also include a bore or channel extending through the insulation member. The bore or channel may be configured to allow a utility line, such as for example, a fluid conduit or electrical wiring, to extend through the passage.

The insulation member 2540 may take a wide variety of different forms. In the exemplary embodiment illustrated by FIGS. 25-28, the insulation member 2540. For example, the insulation member 2540 may have any of the multi-layer configurations of the insulation members described above. For example, the insulation member 2540 may include one or more porous, sound absorbing layers and one or more dense or facing layers attached to a face or faces of one or more sound absorbing layers. In other embodiments, however, the insulation member 2540 may be configured differently.

In the exemplary embodiment of FIGS. 25-28, the insulation member 2540 is multilayered and includes a first dense or facing layer 2622a that faces toward the pump 2504 and the drive motor 2506, a first porous sound absorbing layer 2620a attached to the first dense or facing layer, a second dense or facing layer 2622b attached to the first porous sound absorbing layer 2620a, and a second porous sound absorbing layer 2620b attached to the second dense or facing layer 2622b. The first insulation member 2608 has a first length L1 and has a generally linear or planar configuration.

The first utility passage 2560 includes a channel or recess 2666, which may be open or enclosed, that extends into the insulation member 2540. For example, in the exemplary embodiment of FIGS. 26-28, first utility passage 2560 includes an inlet 2630 at the first dense or facing layer 2622a. The channel or recess 2566 extends through the first dense or facing layer 2622a, through the first sound absorbing layer 2620a, through the second dense or facing layer 2622b and into the second sound absorbing layer 2620b. In the exemplary embodiment, the channel 2566 exits the insulation member 2540 through a top surface 2570 (FIG. 25). In other embodiments, however, each of the inlet to the channel 2566 and the outlet to the channel may be formed in any surface of the insulation member 2540.

The second utility passage 2564 includes a channel or recess 2566, which may be open or enclosed, that extends into the insulation member 2540. For example, in the exemplary embodiment of FIGS. 26-28, first utility passage 2560 includes an inlet 2630 at the first dense or facing layer 2622a. The channel or recess 2566 extends through the first dense or facing layer 2622a, through the first sound absorbing layer 2620a, through the second dense or facing layer 2622b and into the second sound absorbing layer 2620b. In the exemplary embodiment, the channel 2566 exits the insulation member 2540 through a top surface 2570 (FIG. 25). In other embodiments, however, each of the inlet to the channel 2566 and the outlet to the channel may be formed in any surface of the insulation member 2540.

Figure 26:
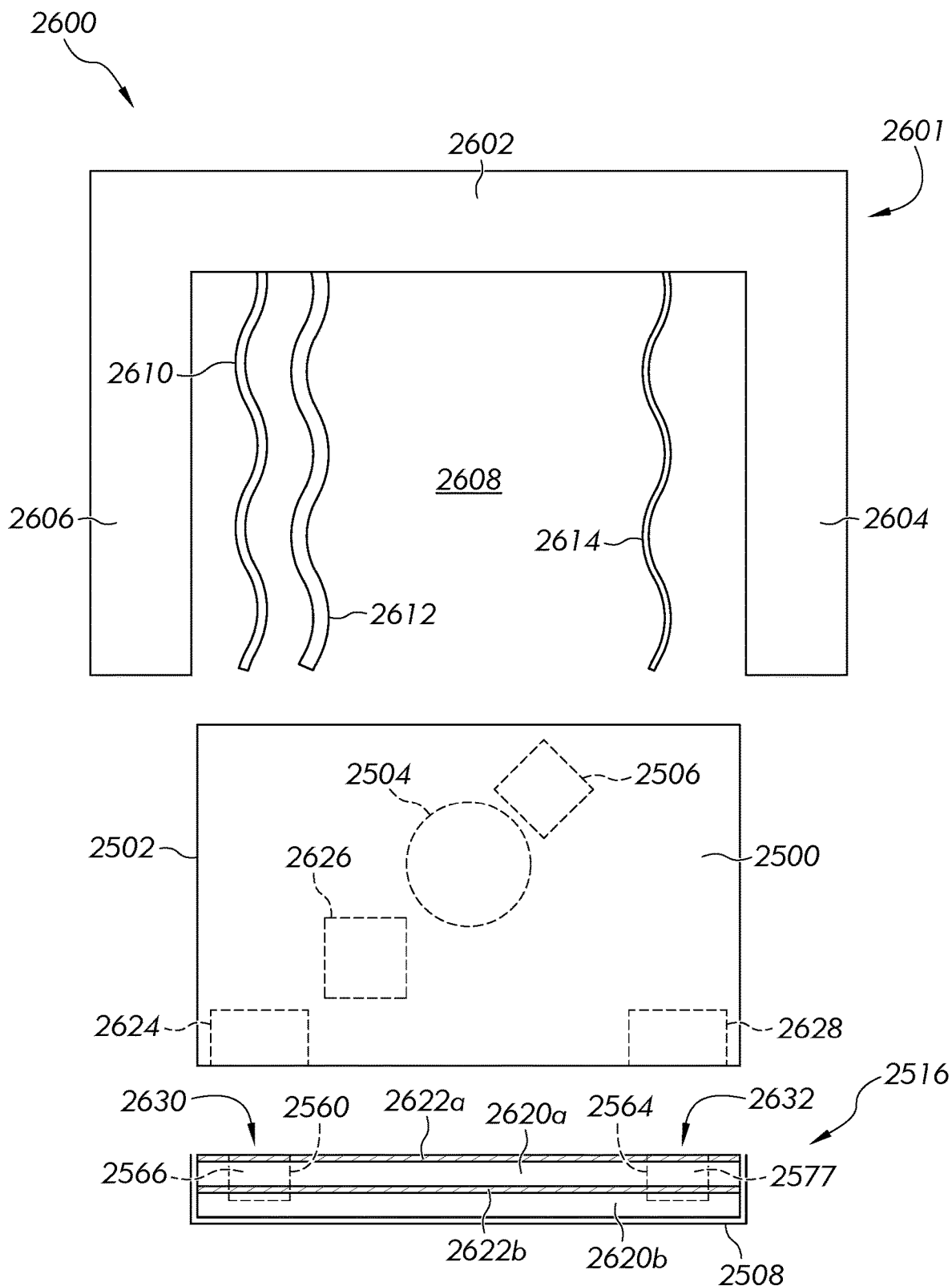
FIG. 26 is a top view of an exemplary embodiment of an acoustically insulated machine assembly in an unconnected state.
Figure 27:
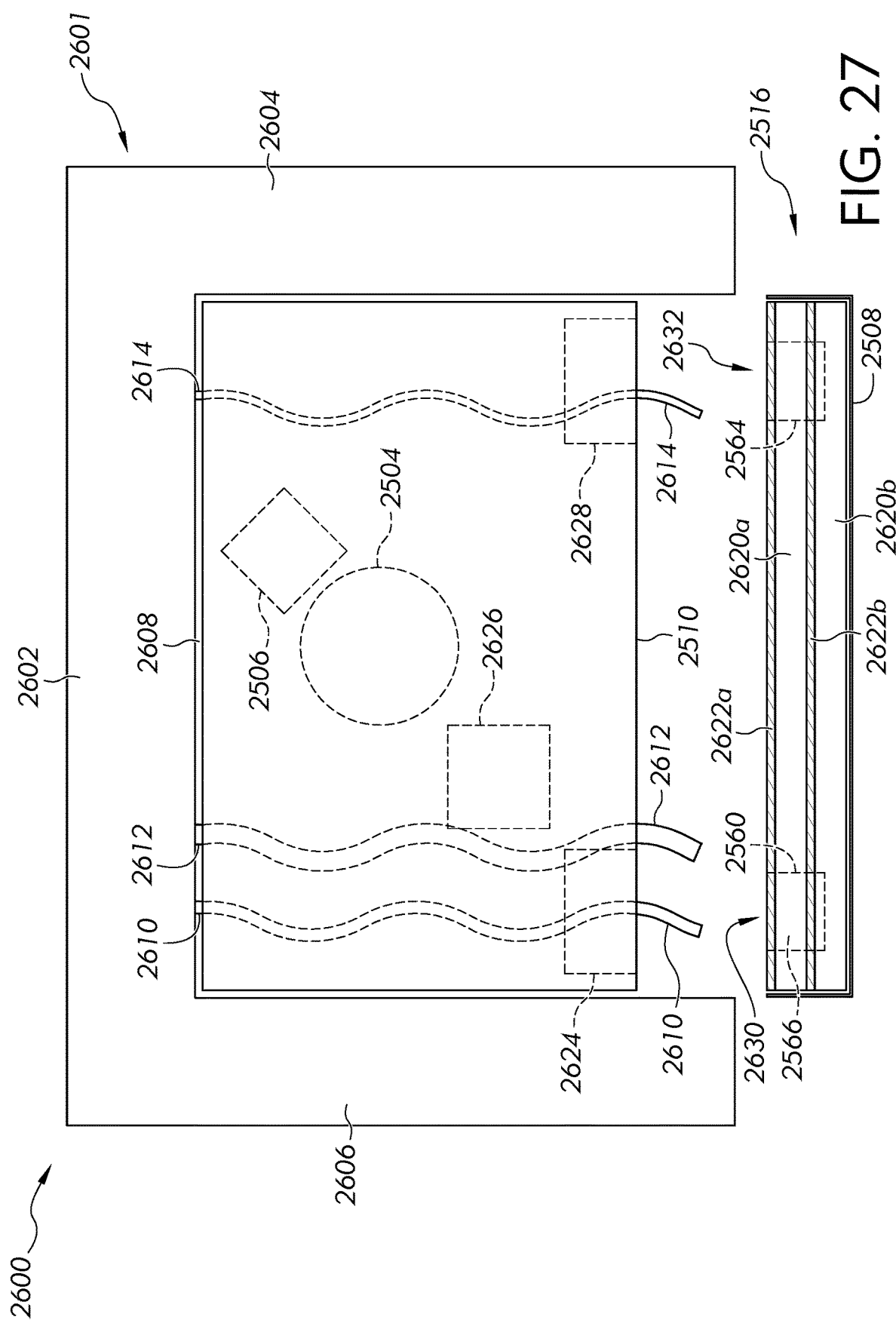
FIG. 27 is a top view of the acoustically insulated machine assembly of FIG. 26 in a partially connected state.
Figure 28:
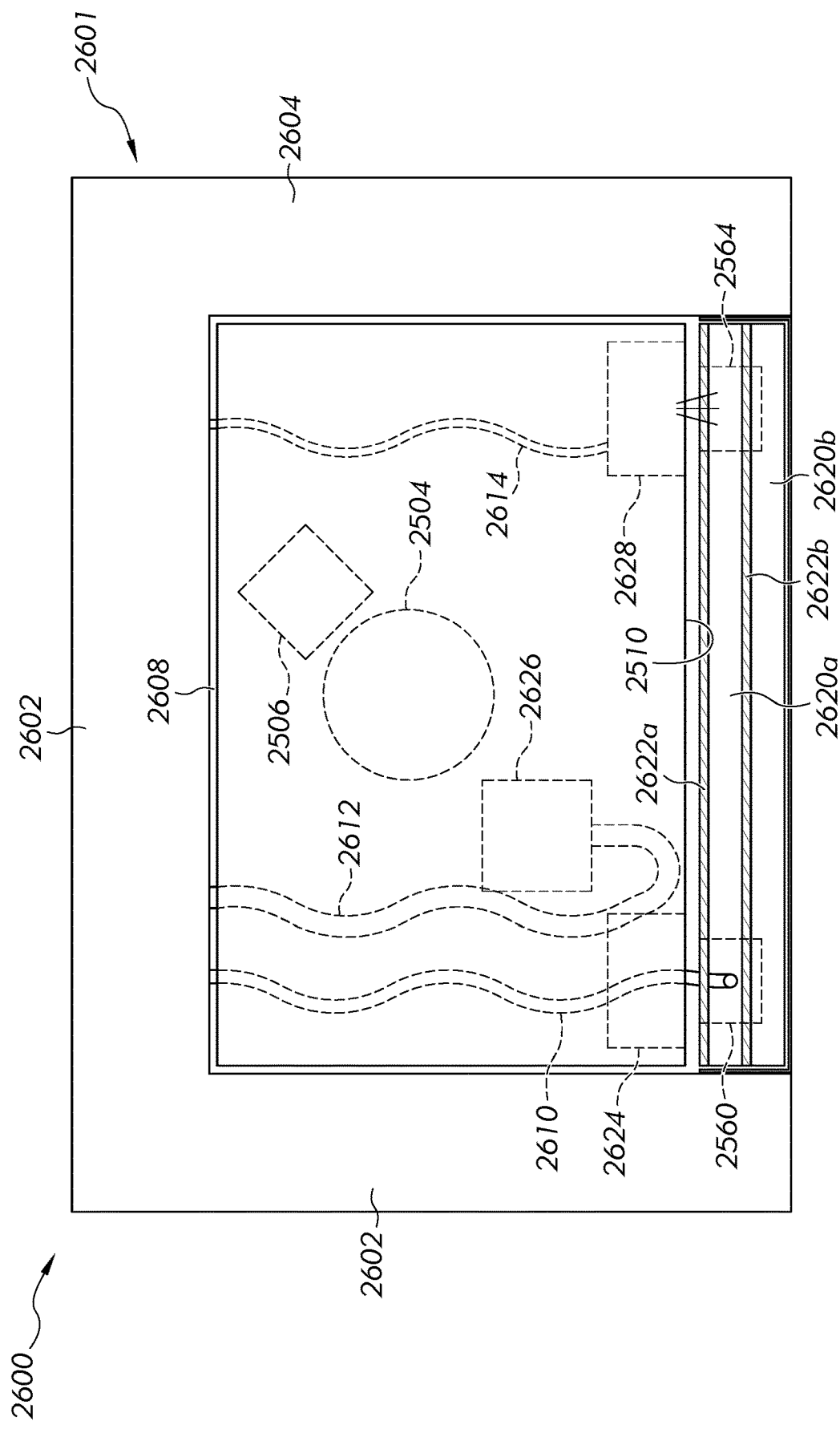
FIG. 28 is a top view of the acoustically insulated machine assembly of FIG. 26 in a connected state.

FIGS. 26-28 illustrate an exemplary acoustically insulated machine assembly 2600 including the dishwasher 2500, the insulation member 2516, and a cabinet or wall space 2601. The cabinet or wall space 2601 includes a rear wall 2602, a first side wall 2604, and a second sidewall 2606 that form a recess 2608 for receiving the dishwasher 2500. Extending from the cabinet or wall space 2601 are one or more utility lines. In the illustrated embodiment, a water supply line 2610, a water drain line 2612, and an electrical supply line 2614 extend from the cabinet or wall space 2601. In other embodiments, however, any number of utility lines may be associated with the acoustically insulated machine assembly 2600.

The dishwasher 2500 includes a water inlet 2624, a water outlet 2626, and an electrical power connection 2628. The water inlet 2624, the water outlet 2626, and the electrical power connection 2628 may be accessible from the cavity 2524 located between the legs 2522 and below the housing 2504 (FIG. 25). The cavity 2524 has a height HC.

Referring to FIG. 28-27, an exemplary assembly process for the dishwasher assembly 2600 may begin with the dishwasher 2500 being positioned in the recess 2608. The utilities lines 2610, 2612, 2614 are positioned in the cavity 2524 (FIG. 25) extending outward from the rear wall 2602 under the dishwasher 2500 and may extend outward from the front side 2510 of the housing 2502.

As shown in FIG. 28, the insulation member 2500 may then be positioned along the front side 2510 of the dishwasher or in the cavity 2524 under the housing 2502 along the front side 2510. In this position, the water supply line 2610 may be routed through the first utility passage 2560 and connected to the water inlet 2624 and the electrical supply line 2614 may be routed through the second utility passage 2564 and connected to the electrical power connection 2628.

Figure 29:
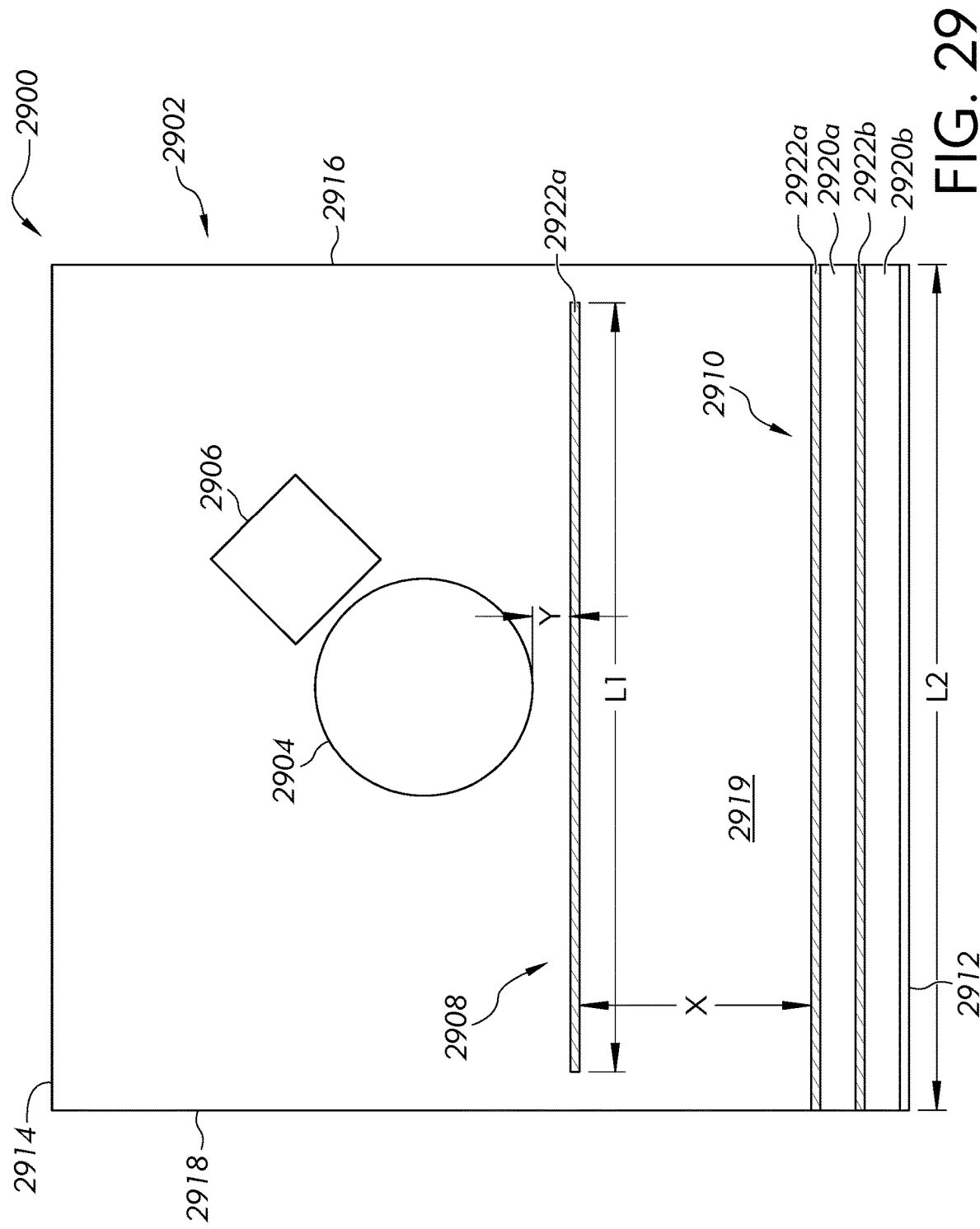
FIG. 29 is a schematic illustration of an exemplary embodiment of an acoustically insulated machine having spaced apart, multi-layer insulation members.

Referring to FIG. 29, an exemplary embodiment of an acoustically insulated machine is an acoustically insulated dishwasher 2900. The dishwasher 2900 is similar to the dishwasher 600 of FIG. 6 in that the dishwasher 2900 includes a cabinet or housing 2902, a pump 2904 and a drive motor 2906 disposed within the cabinet, a first insulation member 2908, and a second insulation member 2910. The cabinet 2902 includes a front wall 2912, a rear wall 2914 spaced apart and generally parallel to the front wall, a first side wall 2916 generally perpendicular to and connecting the front wall to the back wall, and a second side wall 2918 generally parallel to and spaced apart from the first side wall and connecting the front wall to the back wall.

As with the second insulation layer 610 of the dishwasher 600, the second insulation member 2910 may be multilayered. The first insulation layer 2908, however, includes a first dense or facing layer 2922*a* that faces toward the pump 2904 and the drive motor 2906, but does not include the first porous sound absorbing layer, the second dense or facing layer or the second porous sound absorbing layer of the first insulation layer 608 of the dishwasher 600. The first insulation member 2908 has a first length L1, has a generally linear or planar configuration, and is a distance Y from the pump 2904.

The second insulation member 2910 includes a first dense or facing layer 2922*a* that faces toward the pump 2904 and the drive motor 2906, a first porous sound absorbing layer 2920*a* attached to the first dense or facing layer, a second dense or facing layer 2922*b* attached to the first porous sound absorbing layer 2920*a*, and a second porous sound absorbing layer 2920*b* attached to the second dense or facing layer 2922*b*. The second insulation member 2908 has a second length L2, has a generally linear or planar configuration, and is a distance X from the first insulation member 2908. In the exemplary embodiment of FIG. 29, the first length L1 is smaller than the second length L2 and the distance X is greater than the distance Y. In other embodiments, however, the first length L1 may be equal to or greater than the second length L2 and the distance X may be equal to or less than the distance Y.

The first insulation member 2908 is arranged parallel, or generally parallel, to the second insulation member 2910 and the front wall 2912. In other embodiments, however, the first insulation member 2908 may be other than parallel to the second insulation member 2910 and/or the front wall 2912. The first insulation member 2908 is spaced apart from the second insulation member 2910 such that an air gap 2919 is formed between the first and second insulation members 2908, 2910.

Figure 30:
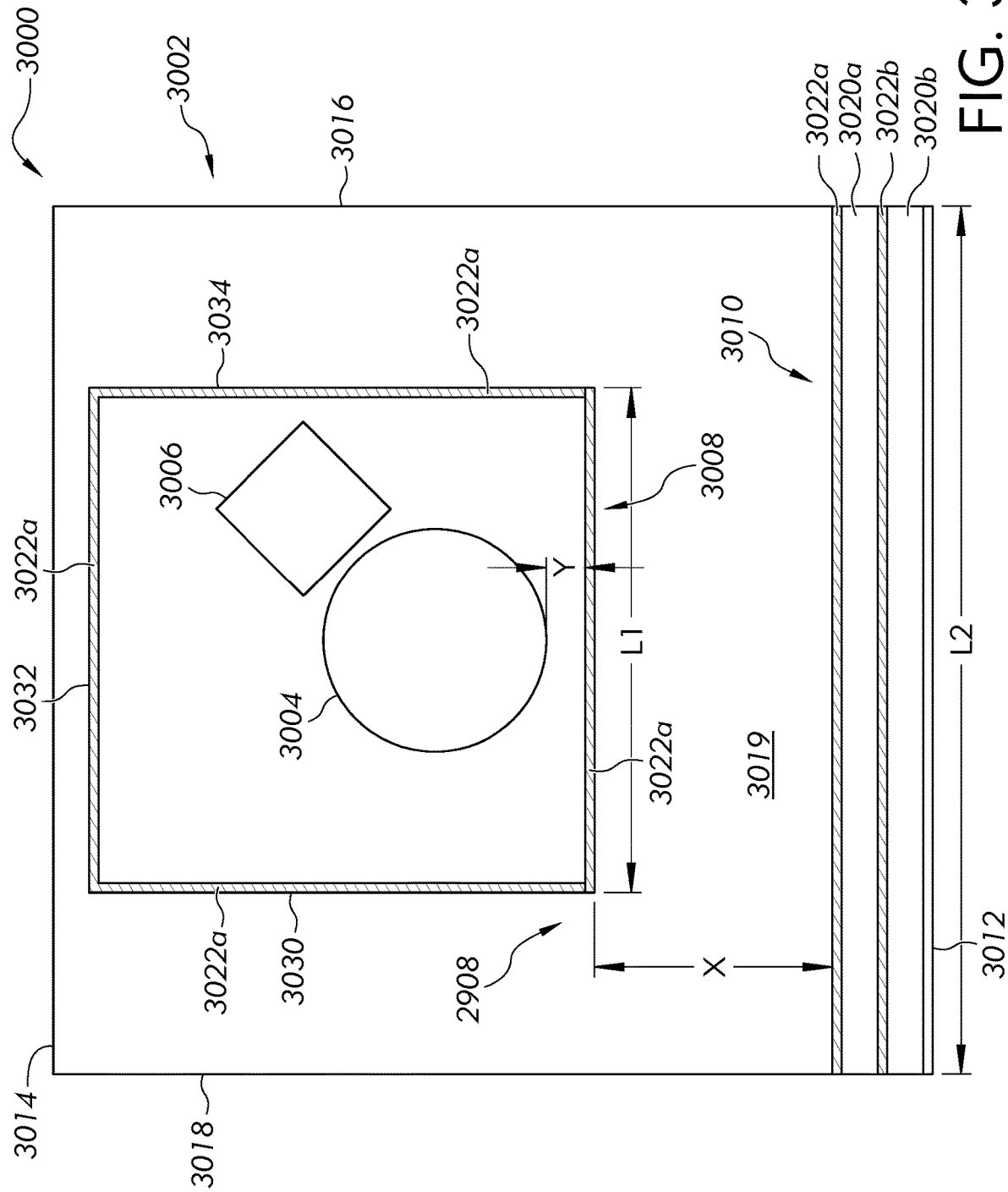
FIG. 30 is a schematic illustration of an exemplary embodiment of an acoustically insulated machine having spaced apart insulation members.

Referring to FIG. 30, an exemplary embodiment of an acoustically insulated machine is an acoustically insulated dishwasher 3000. The dishwasher 3000 is similar to the dishwasher 2900 of FIG. 29 in that the dishwasher 3000 includes a cabinet or housing 3002, a pump 3004 and a drive motor 3006 disposed within the cabinet, a first insulation member 3008, and a second insulation member 3010. The cabinet 3002 includes a front wall 3012, a rear wall 3014 spaced apart and generally parallel to the front wall, a first side wall 3016 generally perpendicular to and connecting the front wall to the back wall, and a second side wall 3018 generally parallel to and spaced apart from the first side wall and connecting the front wall to the back wall.

As with the dishwasher 2900, the second insulation member 3010 maybe multilayered and includes a first dense or facing layer 3022*a* that faces toward the pump 3004 and the drive motor 3006, a first porous sound absorbing layer 3020*a* attached to the first dense or facing layer, a second dense or facing layer 3022*b* attached to the first porous sound absorbing layer 3020*a*, and a second porous sound absorbing layer 3020*b* attached to the second dense or facing layer 3022*b*.

The first insulation layer 3008 includes a first dense or facing layer 3022*a*, but does not include the first porous sound absorbing layer, the second dense or facing layer, or the second porous sound absorbing layer of the second insulation layer 3010. The first insulation member 3008 has a first length L1, has a generally linear or planar configuration, and is a distance Y from the pump 3004.

The second insulation member 3010 has a second length L2, has a generally linear or planar configuration, and is a distance X from the first insulation member 3008. In the exemplary embodiment of FIG. 30, the first length L1 is smaller than the second length L2 and the distance X is greater than the distance Y. In other embodiments, however, the first length L1 may be equal to or greater than the second length L2 and the distance X may be equal to or less than the distance Y.

The first insulation member 3008 is arranged parallel, or generally parallel, to the second insulation member 3010 and the front wall 3012. In other embodiments, however, the first insulation member 3008 may be other than parallel to the second insulation member 3010 and/or the front wall 3012. The first insulation member 3008 is spaced apart from the second insulation member 3010 such that an air gap 3019 is formed between the first and second insulation members 3008, 3010.

The dishwasher 3000, however, differs from the dishwasher 2900 in that at least one of the pump 3004 and the drive motor 3006 are surrounded by one or more insulation members. The one or more insulation members may be configured in a variety of ways, such as, for example, but not limited to, the size, the shape, and the composition of each of the one or more insulation members, the size and the shape of the perimeter formed by the insulation members, the orientation of the one or more insulation members, and the number of insulation members used to surround the pump and/or the drive motor may vary in different embodiments. In the illustrated embodiment, a third insulation member 3030, a fourth insulation member 3032, and a fifth insulation member 3034, in conjunction with the first insulation member 3008, form a rectangular perimeter around the pump 3004 and the drive motor 3006. In other embodiments, however, more or less than four insulation members may be used and the shape of the perimeter can be other than rectangular.

In the illustrated embodiment, the third insulation member 3030, the fourth insulation member 3032, and the fifth insulation member 3034 have a length equal to the length L1 of the first insulation member 3008. In other embodiments, however, one or more of the first insulation member 3008, the third insulation member 3030, the fourth insulation member 3032, and the fifth insulation member 3034 may have a different length than any other of the insulation members. As with the first insulation member 3008, the third insulation member 3030, the fourth insulation member 3032, and the fifth insulation member 3034 includes a first dense or facing layer 3022a, but do not include a first porous sound absorbing layer, a second dense or facing layer or a second porous sound absorbing layer as the second insulation layer 3010 does. In other embodiments, however, one or more of the insulation members 3008, 3030, 3032, 3034 may have multiple layers.

Figure 31:
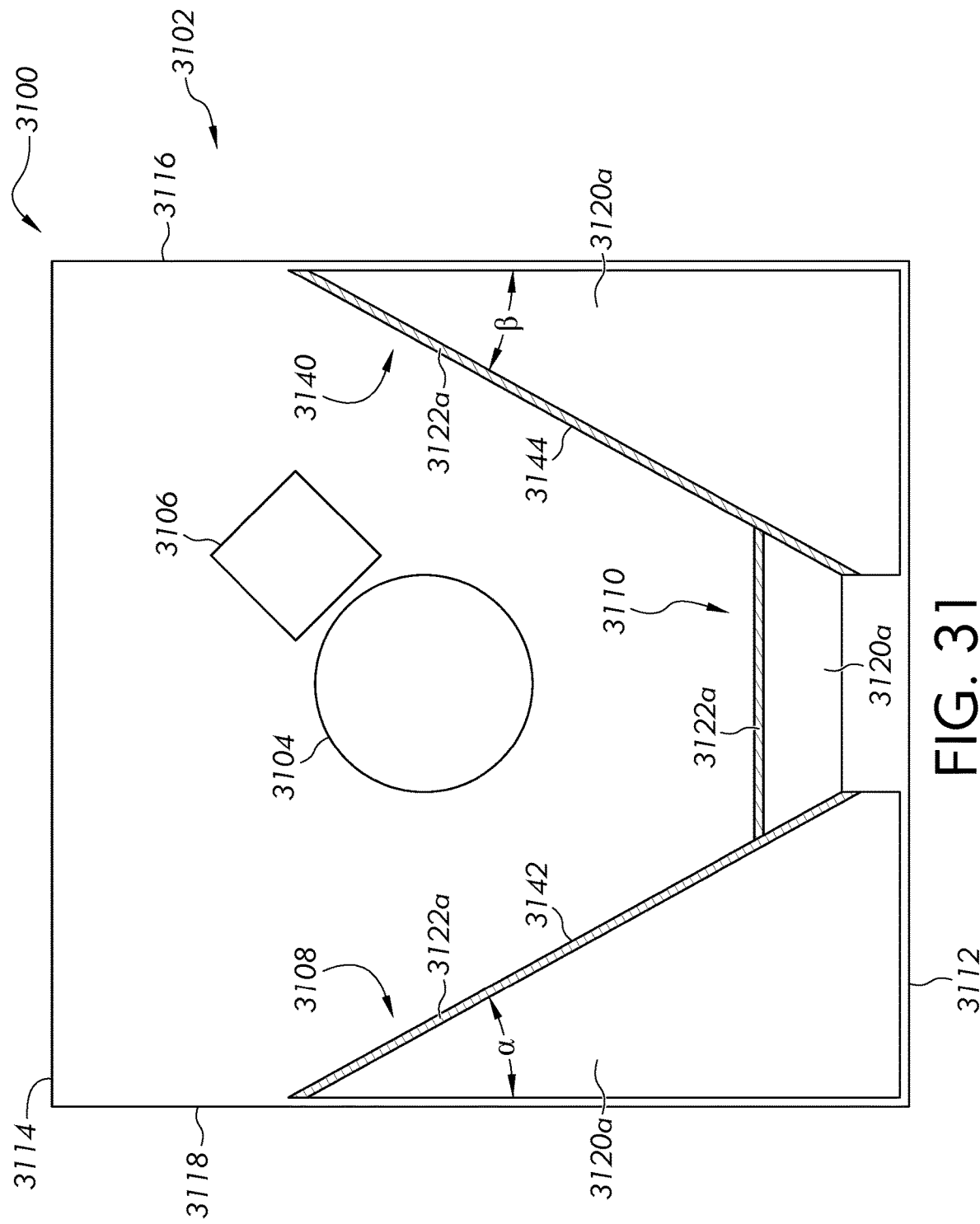
FIG. 31 is a schematic illustration of an exemplary embodiment of an acoustically insulated machine having wedge-shaped, multi-layer insulation members.

Referring to FIG. 31, an exemplary embodiment of an acoustically insulated machine is an acoustically insulated dishwasher 3100. The dishwasher 3100 is similar to the dishwasher 900 of FIG. 9 in that the dishwasher 3100 includes a cabinet or housing 3102, a pump 3104 and a drive motor 3106 disposed within the cabinet. The cabinet 3102 includes a front wall 3112, a rear wall 3114 spaced apart and generally parallel to the front wall, a first side wall 3116 generally perpendicular to and connecting the front wall to the back wall, and a second side wall 3118 generally parallel to and spaced apart from the first side wall and connecting the front wall to the back wall.

The dishwasher 3100 includes a first insulation member 3108, a second insulation member 3110, and a third insulation member 3140. Each of the first insulation member 3108, the second insulation member 3110, and the third insulation member 3140 can be multilayered. The second insulation member 3110 includes a first dense or facing layer 3122a that faces toward the pump 3104 and the drive motor 3106 and a first porous sound absorbing layer 3120a attached to the first dense or facing layer. The second insulation member 3110 has a generally linear or planar configuration and is arranged generally parallel to the front wall 3112. In the illustrated embodiment, unlike the second insulation layer 910 of the dishwasher 900, the second insulation member 3110 does not include a second dense or facing layer and a second porous sound absorbing layer. In other embodiments, however, the second insulation member 3110 can have multiple dense or facing layers and porous sound absorbing layers.

The first insulation member 3108 includes a first dense or facing layer 3122a that faces toward the pump 3104 and the drive motor 3106 and a first porous sound absorbing layer 3120a attached to the first dense or facing layer. The third insulation member 3140 includes a first dense or facing layer 3122a that faces toward the pump 3104 and the drive motor 3106 and a first porous sound absorbing layer 3120a attached to the first dense or facing layer.

The first insulation member 3108 and the third insulation layer 3140, however, differs from the first insulation member 908 and second insulation member 940 of FIG. 9 in that the first insulation member 3108 and the third insulation member 3140 do not include a second dense or facing layer or a second porous sound absorbing layer. In addition, the first insulation member 3108 and the third insulation member 3140 are wedge shaped. In other embodiments, however, the second insulation member 3108 can have multiple dense or facing layers and porous sound absorbing layers and the first insulation member 3108 and the third insulation member 3140 may be other than wedge-shaped.

In the illustrated embodiment, the first insulation member 3108 is positioned at the intersection of the front wall 3112 and the second side wall 3118, the third insulation member 3140 is positioned at the intersection of the front wall 3112 and the first side wall 3116, and the second insulation member 3110 is positioned between the first insulation member 3108 and the third insulation member 3140. In other embodiments, the insulation members 3108, 3110, 3140 may be arranged differently with respect to the cabinet 3102 and/or each other.

The first insulation member 3108 has an angled face 3142 and the second insulation member 3140 has an angled face 3144. The angled face 3142 extends at an angle α relative to the second side wall 3118 and the angled face 3144 extends at an angle β relative to the first side wall 3116. In one exemplary embodiment, the angle α is 30 degrees, or approximately 30 degrees and the angle β is 30 degrees, or approximately 30 degrees. In other embodiments, however, the angle α and/or the angle β may be greater than or less than 30 degrees. In some embodiments, the angle α and the angle β may be different from each other.

Figure 32:
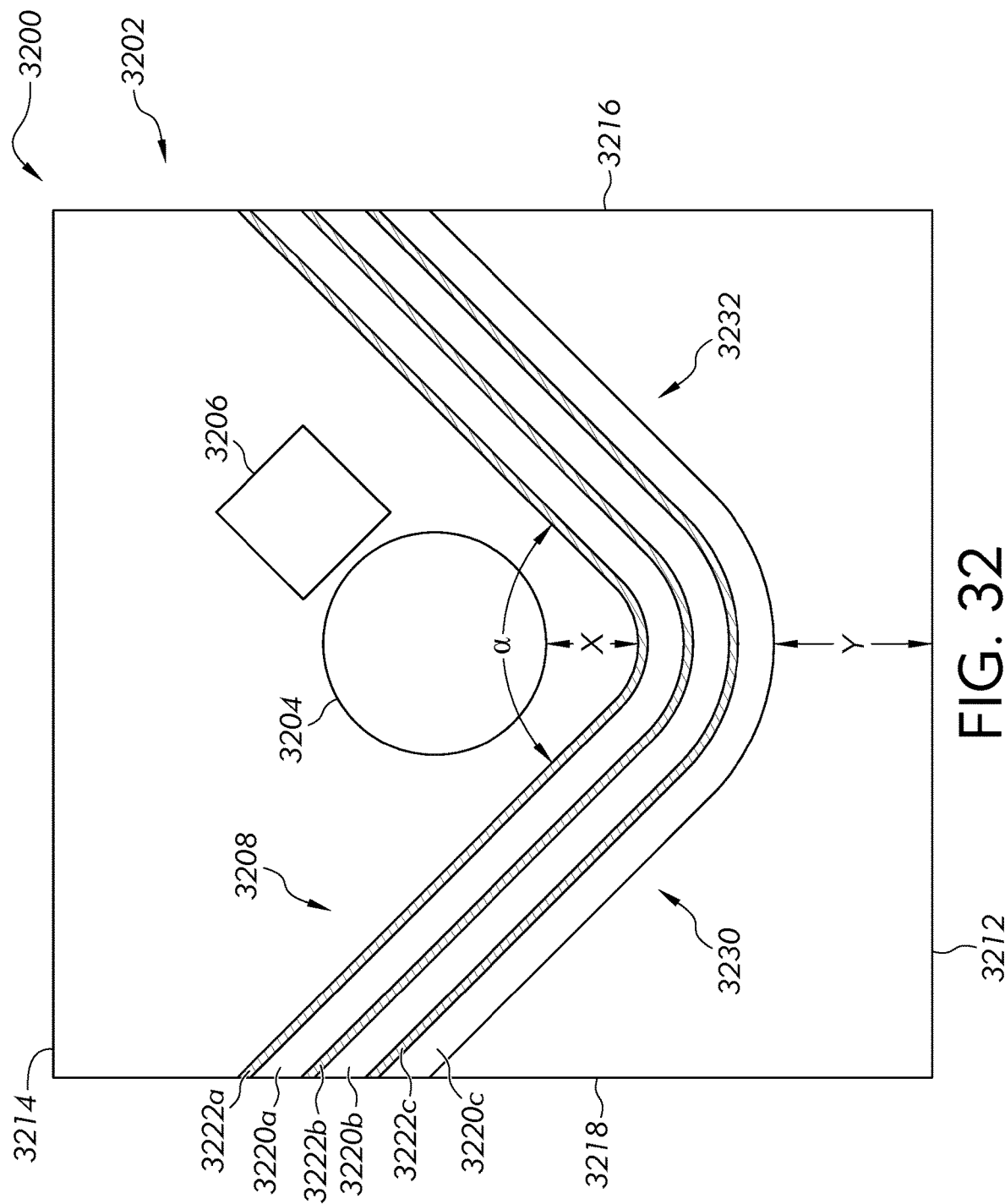
FIG. 32 is a schematic illustration of an exemplary embodiment of an acoustically insulated machine having an angled or curved, multi-layer insulation member.

Referring to FIG. 32, an exemplary embodiment of an acoustically insulated machine is an acoustically insulated dishwasher 3200. The dishwasher 3200 is similar to the dishwasher 700 of FIG. 7 in that the dishwasher 3200 includes a cabinet or housing 3202, a pump 3204 and a drive motor 3206 disposed within the cabinet. The cabinet 3202 includes a front wall 3212, a rear wall 3214 spaced apart and generally parallel to the front wall, a first side wall 3216 generally perpendicular to and connecting the front wall to the back wall, and a second side wall 3218 generally parallel to and spaced apart from the first side wall and connecting the front wall to the back wall.

The dishwasher 3200 includes a first insulation member 3208. In the exemplary embodiment, the first insulation member 3208 is multilayered, is curved or includes angled portions, and partially surrounds the pump 3204 and/or the drive motor 3206. Unlike the dishwasher 700, the dishwasher 3200 does not include a second insulation member. In other embodiments, however, the dishwasher 3200 may include multiple insulation members.

The first insulation member 3208 includes a first dense or facing layer 3222a facing the pump 3204 and/or the drive motor 3206, a first porous sound absorbing layer 3220a attached to the first dense or facing layer, a second dense or facing layer 3222b attached to the first porous sound absorbing layer 3220a, a second porous sound absorbing layer 3220b attached to the second dense or facing layer 3222b, a third dense or facing layer 3422c attached to the second porous sound absorbing layer 3220b, and a third porous sound absorbing layer 3220c attached to the third dense or facing layer 3222c.

The first insulation member 3208 is V-shaped, including a first angled portion 3230 and a second angled portion 3232. In the illustrated embodiment, the intersection between the first angled portion 3230 and the second angled portion 3232 is rounded or curved and the first angled portion 3230 and the second angled portion 3232 are planar, or substantially planar. In other embodiments, however, the first angled portion 3230 and the second angled portion 3232 may be curved and the intersection between the first angled portion 3230 and the second angled portion 3232 may be a point and/or the first angled portion 3230.

The intersection between the first angled portion 3230 and the second angled portion 3232 is positioned generally between the pump 3204 and the front wall 3212 with the first angled portion 3230 and the second angled portion 3232 extending away from the front wall 3212. In the exemplary embodiment, the first angled portion 3230 extends at an angle α from the second angled portion 3232. In one exemplary embodiment, the angle α is 90 degrees, or approximately 90 degrees. In other embodiments, however, the angle α may be greater than or less than 90 degrees. The intersection between the first angled portion 3230 and the second angled portion 3232 is a distance X from the pump 3204 and a distance Y from the front wall 3212. The distance X and the distance Y may vary in different embodiments of the dishwasher 3200. In the exemplary embodiment, the distance X is less than the distance Y. In other embodiments, however, the distance X may be the same or greater than the distance Y.

Figure 33:
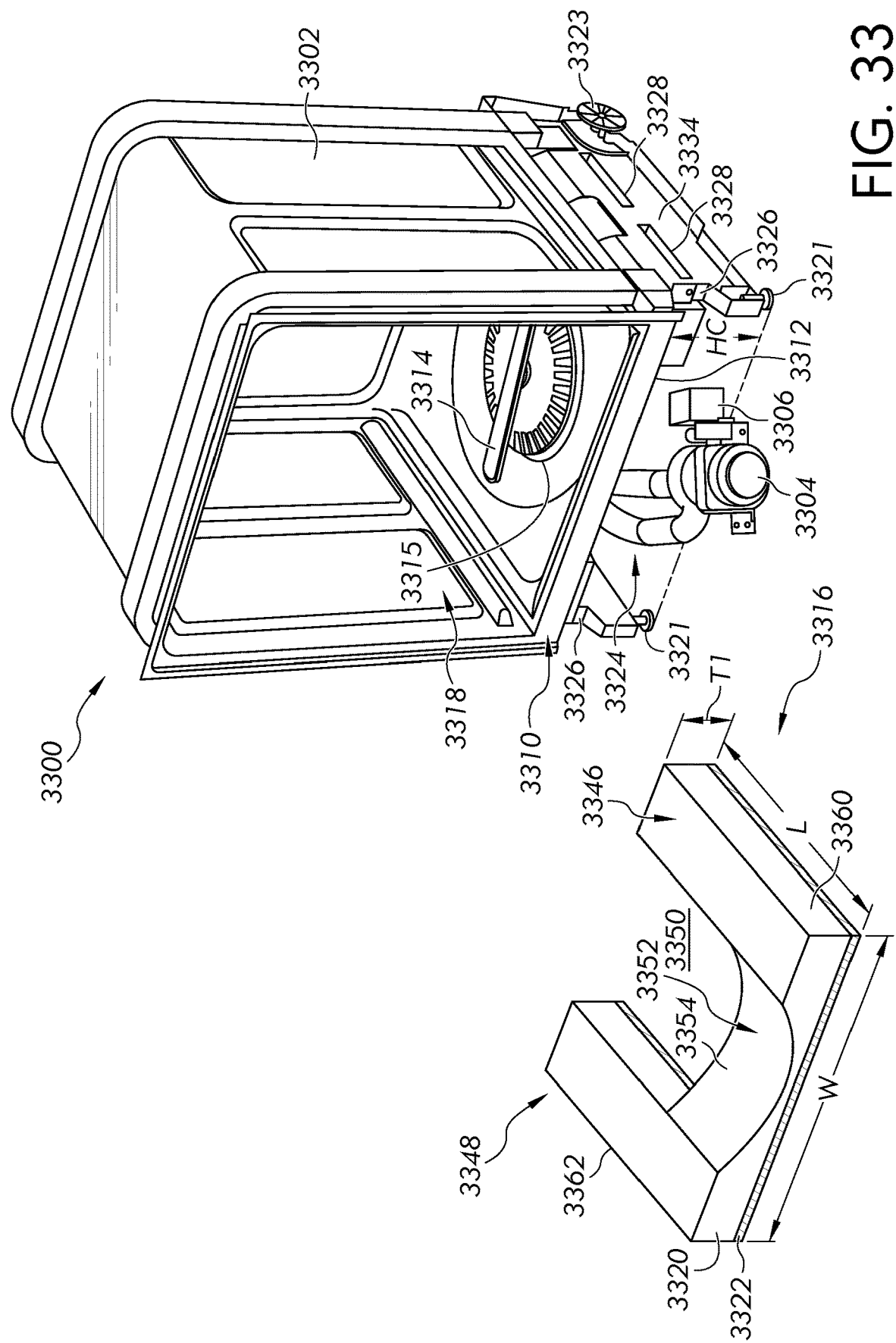
FIG. 33 is a perspective view of an exemplary embodiment of an acoustically insulated dishwasher.
Figure 34:
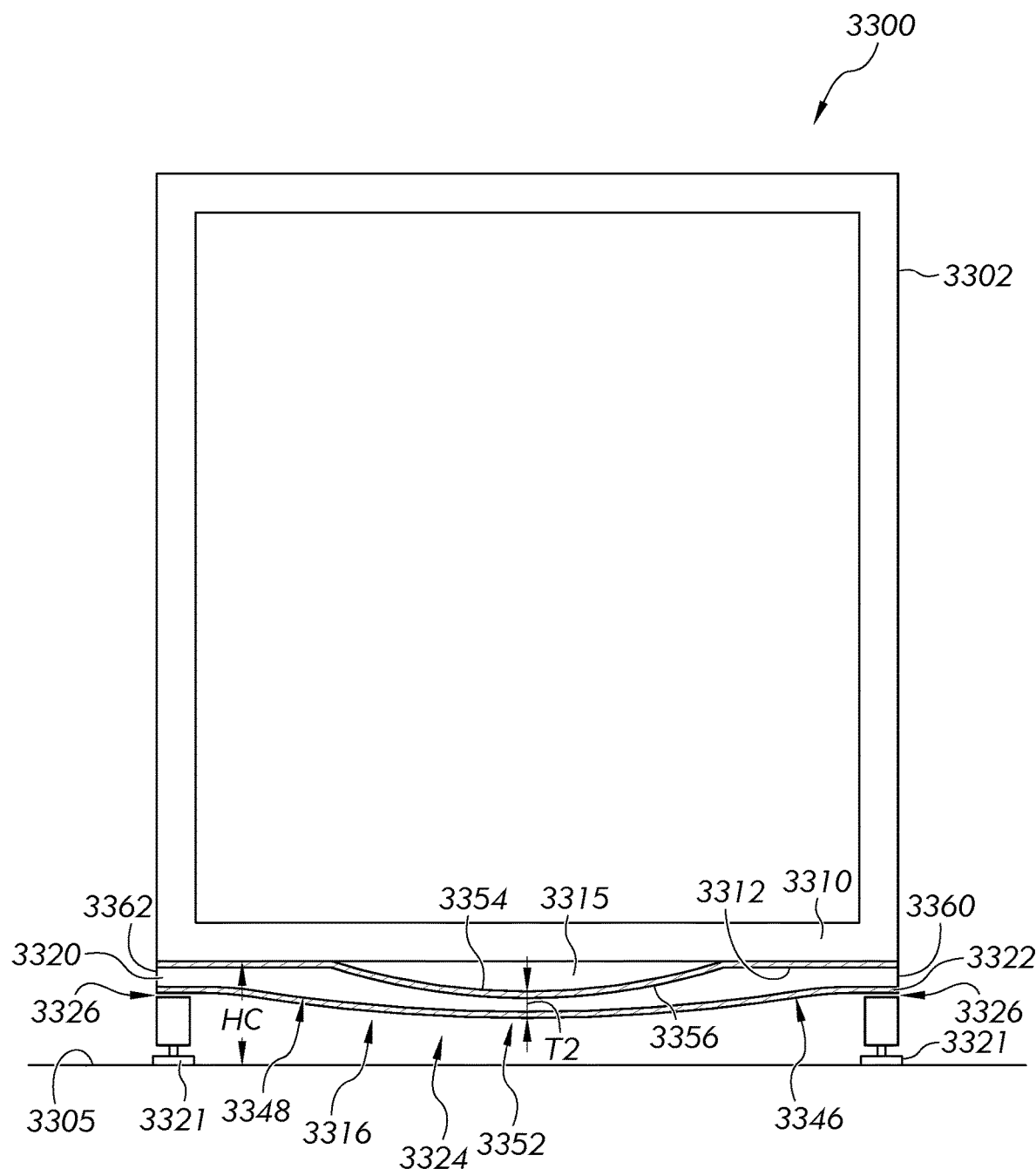
FIG. 34 is a front view of the acoustically insulated dishwasher of FIG. 33.

Referring to FIGS. 33-34, an exemplary embodiment of an acoustically insulated machine is an acoustically insulated dishwasher 3300. The acoustically insulated dishwasher 3300 illustrated by FIG. 33-34 is similar to the dishwasher 400 of FIG. 5 in that the dishwasher includes a housing 3302 having a front side 3310, a pump 3304, a drive motor 3306, a washing chamber 3318, and one or more insulation members 3316.

The dishwasher 3300 includes a base portion 3334 that is provided with a plurality of legs 3321 and/or wheels 3323 that support the housing 3302 on a surface 3305, such as a floor (FIG. 34). The wheels 3323 enable an installer to easily position the dishwasher 3300 and the legs 3321 enable the installer to accurately position/level the dishwasher. The pump 3304 and drive motor 3306 are provided in a cavity 3324 between the legs 3321 and below a bottom surface 3312 of the housing 3302. The cavity 3324 has a height HC.

The dishwasher 3300 includes a wash arm 3314 that is arranged within the washing chamber 3318 above a sump 3315. The wash arm 3314 selectively delivers jets of washing fluid onto kitchenware placed within dishwasher 3300 in a manner known in the art. The pump 3304 is connected to the sump 3315. In operation, the pump 3304 creates a circulating flow of washing fluid within the washing chamber 3318 during a washing operation. As shown in FIG. 33, the dishwasher 3300 may include structure capable of supporting one or more insulation members 3316 within or adjacent the cavity 3324. For example, the base portion 3334 or the legs 3321 may include notches 3326 or slots 3328 below the bottom surface 3312 of the housing 3302. As shown in FIG. 34, the shape of the sump 3315 may extend downward into the cavity 3324.

The insulation member 3316 is configured to be installed in the cavity 3324 and to be held in place by being received (e.g. snapping) into the notches 3326 and/or slots 3328. The insulation member 3316 may also be configured or contoured to fit around the sump 3315, the pump 3304, and/or the drive motor 3306. Furthermore, the insulation member 3316 may be configured to act as a thermal insulation in addition to acting as an acoustic insulation. The insulation member 3316 may be configured in a variety of ways. Any configuration that allows the notches 3326 and/or slots 3328 to hold the insulation member 3316 in place may be used. In the exemplary embodiment, the insulation member 3316 is illustrated as multilayered, generally planar, and U-shaped. The insulation member 3316 has a length L and a width W. In other embodiments, however, the shape, configuration, and size of the insulation member, for example may vary.

The insulation member 3316 may include a first leg 3346 and a second leg 3348 spaced apart from and extending parallel to, or generally parallel to, the first leg. The first leg 3346 is separated from the second leg 3348 by a recess 3350. As with the recess 1050 of insulation member 1040, for example, the recess 3350 may be configured to receive the pump 3304 and drive motor 3306 when the insulation member 3316 is installed under the dishwasher 3300. In the exemplary embodiment, the first leg 3346 and the second leg 3348 have an equal thickness T1 and equal length L. In other embodiments, however, the thickness and/or length of the first leg 3346 may vary from the thickness of the second leg 3348. The insulation member 3316 includes a first side edge 3360 extending along the first leg 3346 and a second side edge 3362 extending along the second leg 3348.

The insulation member 3316 includes an intermediate portion 3352 connecting the first leg 3346 to the second leg 3348. The intermediate portion 3352 may be contoured to avoid interfering with, for example, the portion of the sump 3315 that extends into the cavity 3324. In the illustrated embodiment, the intermediate portion 3352 has a thickness T2 (see FIG. 34) that is less than the thickness T1 of one or both of the first leg 3346 and second leg 3348. In other embodiments, however, the thickness T2 of the intermediate portion 3352 may be equal or greater than the thickness T1 one or both of the first leg 3346 and second leg 3348. In the illustrated embodiment, the intermediate portion 3352 has a concave upper surface 3354 to generally conform with a convex lower surface 3356 (FIG. 34) of the sump 3315.

In the exemplary embodiment, the insulation member 3316 may be multilayered including a first porous sound absorbing layer 3220 facing the bottom surface 3312 of the housing 3302 and a first dense or facing layer 3222 attached to the first dense or facing layer. In other embodiments, however, the insulation member 3316 may be single layered or include a plurality of multiple dense or facing layers and/or porous sound absorbing layers.

As shown in FIG. 34, when installed, the insulation member 3316 is positioned within the cavity 3324 such that the first dense or facing layer 3222 faces the surface 3305 and the first porous sound absorbing layer 3220 is adjacent or abutting the bottom surface 3312 of the housing 3302, including the concave upper surface 3354 generally conforming to the convex lower surface 3356 of the sump 3315. In this position, the insulation member 3316 acts as both a thermal insulation and an acoustic insulation.

The insulation member 3316 is held in place by engagement of the first side edge 3360 and the second side edge 3362 with one or more of the notches 3326 and/or slots 3328. In the illustrated embodiment, the first side edge 3360 and the second side edge 3362 are received in the one or more of the notches 3326 and slots 3328 such that the structure defining the notches and slots holds the side edges 3360, 3362 in place. In one exemplary embodiment, the side edges 3360, 3362 are compressed to fit within the one or more of the notches 3326 and slots 3328.

Figure 35:
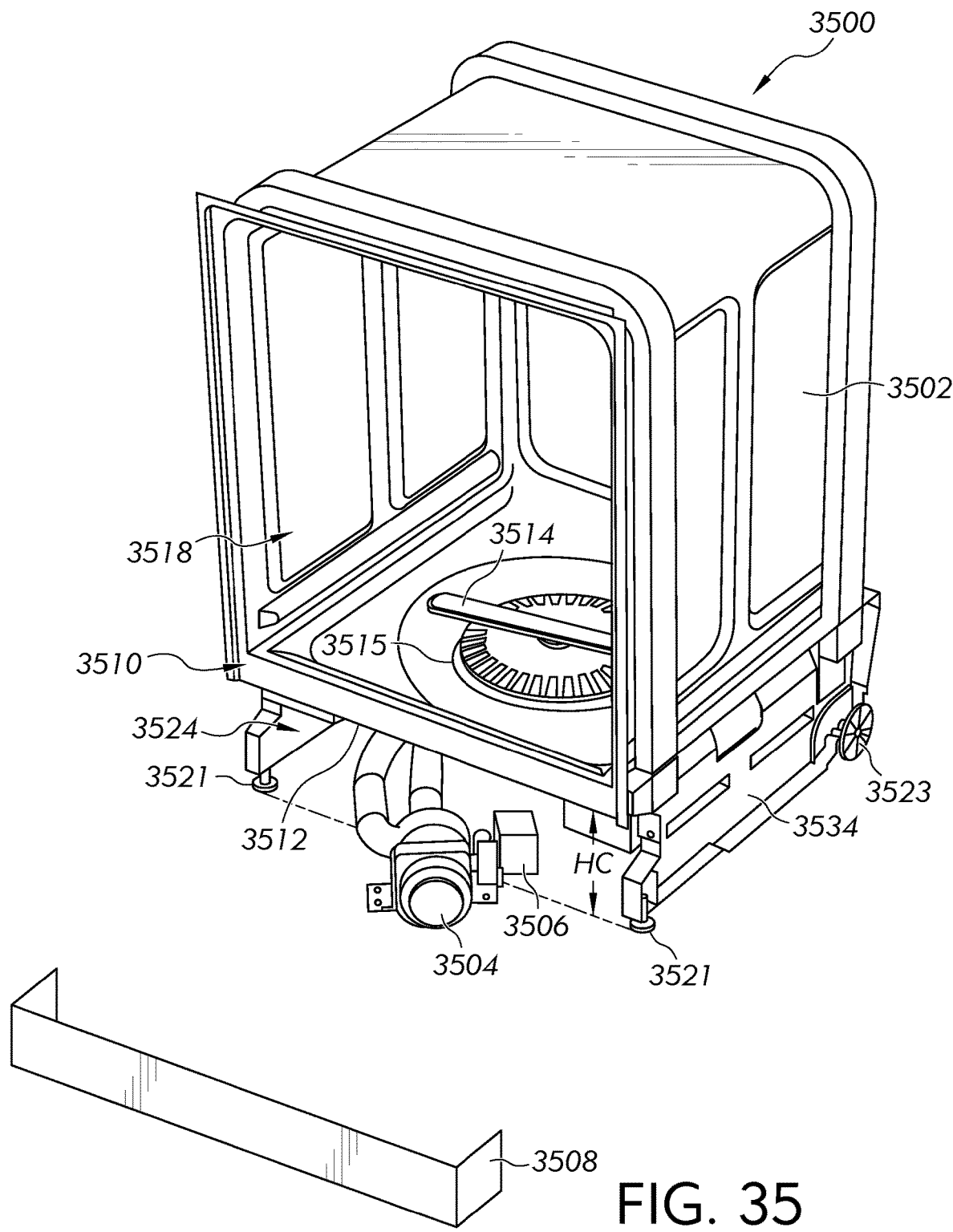
FIG. 35 is a perspective view of an exemplary embodiment of an acoustically insulated dishwasher.
Figure 36:
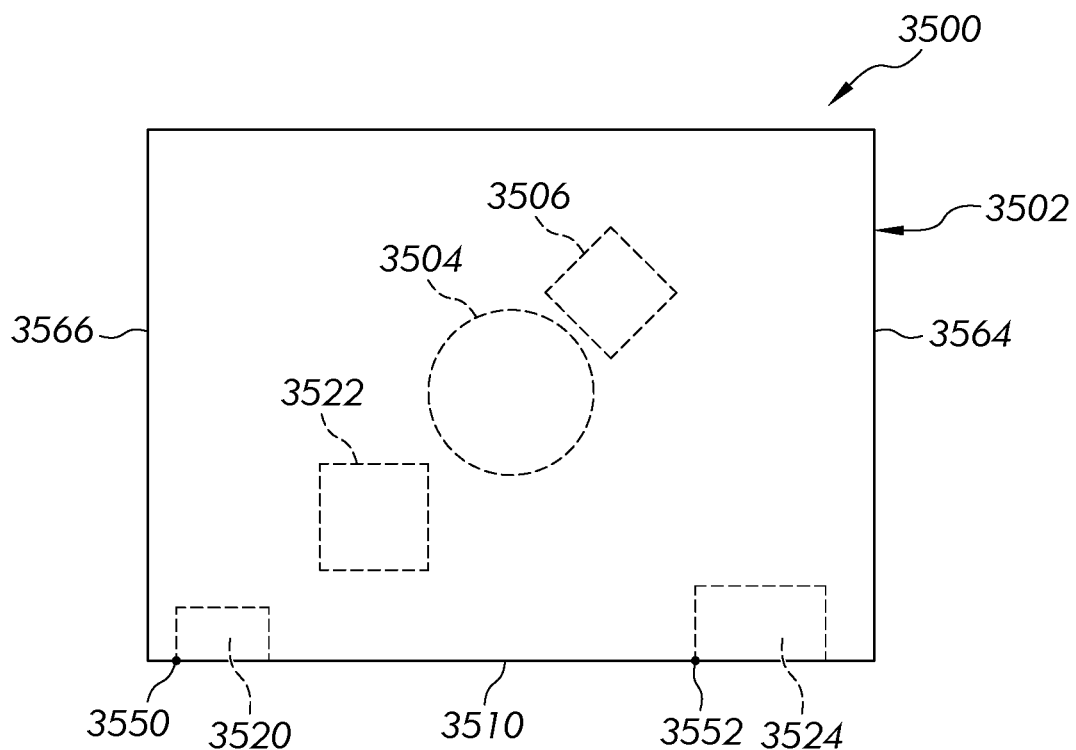
FIG. 36 is a top view of the acoustically insulated dishwasher of FIG. 35 in a first position.
Figure 37:
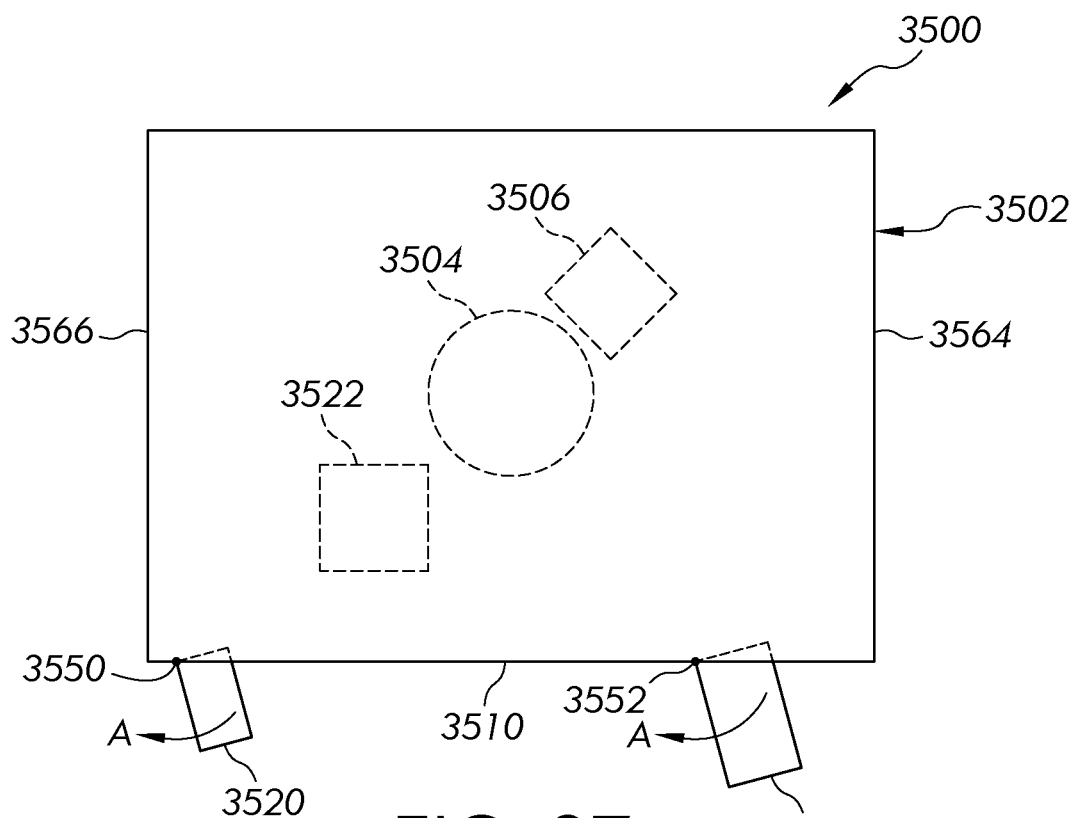

Referring to FIGS. 35-37, an exemplary embodiment of an acoustically insulated machine is an acoustically insulated dishwasher 3500. The acoustically insulated dishwasher 3500 is similar to the dishwasher 400 of FIG. 5 in that the dishwasher includes a housing 3502 having a front side 3510, a pump 3504 and a drive motor 3506 a plate 3508 (FIG. 35), closing a front side 3510 of the housing, and a washing chamber 3318.

The dishwasher 3500 includes a base portion 3534 that is provided with a plurality of legs 3521 and/or wheels 3523 that support the housing 3502. The pump 3504 and drive motor 3506 are provided in a cavity 3524 between the legs 3521 and below a bottom surface 3512 of the housing 3502. The cavity 3524 has a height HC.

The dishwasher 3500 includes a wash arm 3514 that is arranged within the washing chamber 3518 above a sump 3515. The wash arm 3514 selectively delivers jets of washing fluid onto kitchenware placed within dishwasher 3500 in a manner known in the art. The pump 3504 is connected to the sump 3515. In operation, the pump 3504 creates a circulating flow of washing fluid within the washing chamber 3518 during a washing operation.

As shown in FIGS. 36-37, and similar to the dishwasher 1000 of FIGS. 13-17, the dishwasher 3500 includes a water inlet 3520, a water outlet 3522, and an electrical power connection 3524. The water inlet 3520, the water outlet 3522, and the electrical power connection 3524 may be accessible from the cavity 3524 located between the legs 3522 and below the housing 3504 (FIG. 35).

One or more of the water inlet 3520, the water outlet 3522, and the electrical power connection 3524 may be movably mounted to the dishwasher 3500 relative to the housing 3502 to provide improved access to connect utility lines to the water inlet 3520, the water outlet 3522, and the electrical power connection 3524. The water inlet 3520, the water outlet 3522, and the electrical power connection 3524 may be movably mounted in a variety of ways. Any mounting configuration that allows at least one of the water inlet 3520, the water outlet 3522, and the electrical power connection 3524 to be moved to improve access to the at least one of the water inlet 3520, the water outlet 3522, and the electrical power connection 3524 may be used. For example, the mounting configuration may allow at least one of the water inlet 3520, the water outlet 3522, and the electrical power connection 3524 to pivot, rotate, move forward, backward, upward, downward, or sideways, or any combination thereof.

In the exemplary embodiment, the water inlet 3520 is connected to the housing 3502 by a first pivotable connection 3550 and the electrical power connection 3524 is connected to the housing 3502 by a second pivotable connection 3552. In FIG. 36, the water inlet 3520 and the electrical power connection 3524 are in a first position below the bottom surface 3512 of the housing 3502 and within the cavity 3524. As shown in the FIG. 37, the water inlet 3520 and the electrical power connection 3524 may each pivot outward (as shown by arrows A) to a second position in which at least a portion of the water inlet 3520 and the electrical power connection 3524 extend outward from the cavity 3524 past the front side 3510 of the housing 3502. The second position provides improved access to the water inlet 3520 and the electrical power connection 3524 as compared to the first position where the water inlet 3520 and the electrical power connection 3524 are in the cavity 3524 under the housing 3502.

While in the exemplary embodiment, the water inlet 3520 and the electrical power connection 3524 are positioned toward or adjacent the front side 3510 of the housing 3502, in other embodiments, at least one of the water inlet 3520, the water outlet 3522, and the electrical power connection 3524 may be positioned adjacent another side of the housing 3502. For example, the housing 3502 may include a right side 3564 and a left side 3566. At least one of the water inlet 3520, the water outlet 3522, and the electrical power connection 3524 may be movable mounted adjacent to the right side 3564 or the left side 3566 and movable between a first position and a second position where in the second position the at least one of the water inlet 3520, the water outlet 3522, and the electrical power connection 3524 extends outward from the cavity 3524 along a side of the dishwasher 3500- to provide improved access.

In another exemplary embodiment, the dishwasher 3500 may include one or more one or more insulation members (not shown) in front of the water inlet 3520, the water outlet 3522, and the electrical power connection 3524, similar to insulation member 1016 of the dishwasher 1000 of FIG. 10. The one or more insulation members (not shown) may be movably mounted to provide improved access to connect utility lines to the water inlet 3520, the water outlet 3522, and the electrical power connection 3524. In some embodiments, one or more insulation members (not shown) may be mounted to one or more of the movably mounted water inlet 3520, water outlet 3522, and electrical power connection 3524 and will move with the one or more water inlet 3520, water outlet 3522, and electrical power connection 3524.

In another exemplary embodiment, the one or more insulation members (not shown) may be movably mounted to the dishwasher 3500 relative to the housing 3502 to be moved to improve access to the at least one of the water inlet 3520, the water outlet 3522, and the electrical power connection 3524. For example, the mounting configuration of the one or more insulation members may allow the one or more insulation members pivot, rotate, move forward, backward, upward, downward, or sideways, or any combination thereof to provide improved access to the to connect utility lines to the water inlet 3520, the water outlet 3522, and the electrical power connection 3524. For example, one or more insulation members (not shown) may be connected to the housing 3502 by a pivotable connection such that the one or more insulation members may pivot outward and away from the cavity 3524.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or aiming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. An acoustically insulated machine, comprising:
 a source of noise positioned within a housing;
 a first insulation member positioned within the housing, the first insulation member including a first porous sound absorbing layer and a first dense layer attached to a face of the first porous sound absorbing layer, the first dense layer having a density greater than the density of the first porous sound absorbing layer;
 a second insulation member positioned within or attached to the exterior of the housing, the second insulation member including a second porous sound absorbing layer and a second dense layer attached to a face of the second porous sound absorbing layer, the second dense layer having a density greater than the density of the second porous sound absorbing layer;
 wherein the first insulation member is positioned closer to the internal source of noise than the second insulation member and the first insulation member is spaced apart from the second insulation member such that an air gap is formed between the first insulation member and the second insulation member; and
 wherein the distance between the first insulation member and the source of noise is less than the distance between the first insulation member and the second insulation member.

2. The acoustically insulated machine of claim 1 wherein the first dense layer faces the internal source of noise and allows a majority of airborne acoustic energy having frequencies from about 100 Hz to about 800 Hz from the internal source of noise to pass into the first insulation member.

3. The acoustically insulated machine of claim 1 wherein the machine is a dishwasher, the source of noise is a pump of the dishwasher, and the first and second insulation members are positioned between the pump and a front side of the dishwasher.

4. The acoustically insulated machine of claim 1 wherein the first dense layer and the second dense layer each has an airflow resistance between about 600 and 1400 Rayls.

5. The acoustically insulated machine of claim 1 wherein the first sound absorbing layer is 15-300 grams per square foot and has a thickness in the range of/8 inch to three inches.

6. The acoustically insulated machine of claim 1 wherein the first sound absorbing layer has a thickness in the range of ½ inch to 1½ inches.

7. The acoustically insulated machine of claim 1 wherein the first insulation member is generally parallel to the second insulation member.

8. The acoustically insulated machine of claim 1 wherein the first insulation member includes one or more angled portions that partially surround the source of noise.

9. The acoustically insulated machine of claim 1 wherein the first insulation member is V-shaped.

10. The acoustically insulated machine of claim 1 wherein the housing includes a front wall, a rear wall, a first side wall, and a second side wall and wherein a third insulation member having a third porous sound absorbing layer and a third dense layer attached to a face of the porous sound absorbing layer, is attached to or adjacent one of the rear wall, the first side wall, or the second side wall.

* * * * *